United States Patent
Lin

(10) Patent No.: US 11,795,070 B2
(45) Date of Patent: Oct. 24, 2023

(54) TREATMENT PROCESS FOR PRODUCED WATER AND BLOWDOWN WATER

(71) Applicant: West Virginia University Board of Governors on behalf of West Virginia University, Morgantown, WV (US)

(72) Inventor: Lian-Shin Lin, Morgantown, WV (US)

(73) Assignee: West Virginia University Board of Governors on behalf of West Virginia University, Morgantown, WV (US)

( * ) Notice: Subject to any disclaimer, the term of this patent is extended or adjusted under 35 U.S.C. 154(b) by 0 days.

(21) Appl. No.: 17/448,004

(22) Filed: Sep. 17, 2021

(65) Prior Publication Data

US 2022/0135443 A1    May 5, 2022

Related U.S. Application Data

(60) Provisional application No. 62/706,939, filed on Sep. 18, 2020.

(51) Int. Cl.
| | | |
|---|---|---|
| C02F 1/44 | (2023.01) | |
| C02F 9/00 | (2023.01) | |
| C02F 5/02 | (2023.01) | |
| C02F 1/00 | (2023.01) | |
| C02F 1/461 | (2023.01) | |
| C02F 101/20 | (2006.01) | |
| C02F 103/34 | (2006.01) | |

(52) U.S. Cl.
CPC ............ *C02F 1/441* (2013.01); *C02F 1/001* (2013.01); *C02F 1/4618* (2013.01); *C02F 5/02* (2013.01); *C02F 9/00* (2013.01); *C02F 2001/4619* (2013.01); *C02F 2101/20* (2013.01); *C02F 2103/34* (2013.01); *C02F 2303/20* (2013.01); *C02F 2303/22* (2013.01)

(58) Field of Classification Search
None
See application file for complete search history.

(56) References Cited

U.S. PATENT DOCUMENTS

| | | | | |
|---|---|---|---|---|
| 5,250,185 A | * | 10/1993 | Tao | C02F 1/441 210/500.38 |
| 2006/0231491 A1 | * | 10/2006 | Mukhopadhyay | B01D 61/58 423/580.1 |
| 2010/0193444 A1 | * | 8/2010 | Boodoo | F22B 29/06 210/175 |

(Continued)

OTHER PUBLICATIONS

Löwenberg et al., Comparison of pre-treatment technologies towards improving reverse osmosis desalination of cooling tower blow down, Desalination, ISSN: 0011-9164, vol. 357, p. 140-149 (2015) (Year: 2015).*

(Continued)

*Primary Examiner* — Chester T Barry
(74) *Attorney, Agent, or Firm* — Buchanan Ingersoll & Rooney PC; Craig G. Cochenour, Esq.

(57) ABSTRACT

This invention provides processes for treating a mixture of produced water and blowdown water comprising introducing produced water (PW) into blowdown water (BD) for forming a PW-BD water mixture, softening the PW-BD water mixture, subjecting the PW-BD water mixture to activated carbon filtration and reverse osmosis membrane desalination. The process generates a product water and a brine by-product.

6 Claims, 23 Drawing Sheets

(56) References Cited

U.S. PATENT DOCUMENTS

| | | | | |
|---|---|---|---|---|
| 2011/0198208 A1* | 8/2011 | Olwig | .................... | C02F 1/441 |
| | | | | 203/10 |
| 2012/0255908 A1* | 10/2012 | Duke | .................. | B01D 61/025 |
| | | | | 210/652 |
| 2014/0190817 A1* | 7/2014 | Mays | ..................... | C02F 1/045 |
| | | | | 203/10 |
| 2015/0315055 A1* | 11/2015 | Chidambaran | ......... | E21B 43/40 |
| | | | | 166/266 |

OTHER PUBLICATIONS

J. Ahmed et al., Recovery of cooling tower blowdown water through reverse osmosis (RO): review of water parameters affecting membrane fouling and pretreatment schemes, Desalination and Water Treatment, 189(2020) 9-17 (Year: 2020).*

Farahani et al., Recovery of cooling tower blowdown water for reuse: The investigation of different types of pretreatment prior nanofiltration and reverse osmosis, Journal of Water Process Engineering 10 (2016) 188-199 (Year: 2016).*

"Cost Optimization of Osmotically Assisted Reverse Osmosis" by Timothy V. Bartholomew, et al., Environmental Science & Technology, Environ. Sci. Technol. 2018, 52, 11813-11821; downloaded Jul. 15, 2022.

Filmtec™ SW30-4040 Membranes, Dow Product Information, Form No. 609-00377-0406, Jul. 19, 2022.

"Energy Use for Membrane Seawater Desalination—Current Status and Trends" by Nikolay Voutchkov; Desalination 431 (2018) 2-14; www.elsevier.com/locate/desal; available online Oct. 24, 2017.

"Experimental Evaluation on Concentrating Cooling Tower Blowdown Water by Direct Contact Membrane Distillation" by Xianguo Yu, et al.; Desalination 323 (2013) 134-141; www.elsevier.com/locate/desal; available online Feb. 28, 2013.

"Osmotically Assisted Reverse Osmosis for High Salinity Brine Treatment" by Timothy V. Bartholomew, et al. (2017); This manuscript version is made available under the Elsevier user license http://www.elsevier.com/open-access/userlicense/1.0/.

"Pilot test of UF pretreatment prior to RO for cooling tower blowdown reuse of power plant" by Jingdong Zhang, et al.; Desalination 222 (2008) 9-16; available online at www.sciencedirect.com; 2006 Published by Elsevier B.V.; doi:10.1016/j.desal.2007.01.123.

"Produced water softening using high-pH catholyte from brine electrolysis: reducing chemical transportation and environmental footprints" by Golnoosh Khajouei, et al., Journal of Water Process Engineering 40 (2021) 101911; 2021 Elsevier Ltd.; https://doi.org/10.1016/j.jwpe.2020.101911.

"Recovery of cooling tower blowdown water for reuse: The investigation of different types of pretreatment prior nanofiltration and reverse osmosis" by Mohammad Hossein Davood Abadi Farahani, et al.; Journal of Water Process Engineering 10 (2016) 188-199; www.elsevier.com/locate/jwpe; 2016 Elsevier Ltd.; http://dx.doi.org/10.1016/j.iwpe.2016.01.011.

Seawater Desalination RO Membrane Elements; AMI Membranes, Product information, www.appliedmembranes.com; Jul. 19, 2022.

Simple Technique for Measuring the Concentration Polarization Level in a Reverse Osmosis System by Iris Sutzkover, et al.; Desalination 131 (2000) 117-127; 2000 Elsevier Science B.V.

"Study of mass transfer mechanisms for reverse osmosis and nanofiltration membranes intended for desalination" by Y.A. Boussouga, et al.; Journal of materials and Environmental Sciences; JMES, 2017 vol. 8, Issue 3, p. 1128-1138; http://www.jmaterenvironsci.com/.

"Mass Transfer in the Membrane Concentration Polarization Layer Under Turbulent Cross Flow: I. Critical Literature Review and Adaptation of Existing Sherwood Correlations to Membrane Operations" by Vassilis Gekas, et al., Journal of Membrane Science, 30 (1987) 153-170; Elsevier Science Publishers B.V., Amsterdam.

"Mass transfer in Spiral Wound Pervaporation Modules" by Patrick J. Hickey, et al.; Journal of Membrane Science 92 (1994) 59-74; 1994 Elsevier Science B.V.

* cited by examiner

Top line= 0.5M; Bottom line= 1.0 M

"Mixing" top line, "Post Filtering" bottom line

"Mixing" top line, "Post Filtering" bottom line

"Mixing" top line, "Post Filtering" bottom line

"Mixing" top line, "Post Filtering" bottom line

40% Recovery-top line, 50% Recovery –second line from top, 60% recovery-third line from top, 70% Recovery-bottom line 40% Recovery-bottom line, 50% Recovery-second line from bottom, 60% Recovery-third line from bottom, 70% Recovery-top line, Burst pressure- second line from top 40% Recovery-top line, 50% Recovery-second line from top line, 60% Recovery-third line from top line, 70% Recovery-bottom line 40% Recovery-bottom line, 50% Recovery- third line from top line, 60% Recovery-second line from top line, 70% Recovery-top line, Burst Pressure-fourth line from top line RS= Row 1, column 5,6; Water recovery= Row 4, column 5, 6, and Row 7, column 7;

Unit energy consumption= Row 1, column 3, and Row 2, column 5, 6

Ratio 5:1 = top line; Ratio 7:1 = middle line; Ratio 9:1 = bottom line

Ratio 5:1 = top line; Ratio 7:1 = middle line; Ratio 9:1 = bottom line

20degrees C = top line; 30 degrees C = middle line; 40 degrees C = bottom line 20 degrees C = bottom line; 30 degrees C = middle line; 40 degrees C = top line

TREATMENT PROCESS FOR PRODUCED WATER AND BLOWDOWN WATER

CROSS-REFERENCE TO RELATED APPLICATION

This utility non-provisional patent application claims the benefit of priority to U.S. Provisional Patent Application Ser. No. 62/706,939, filed Sep. 18, 2020. The entire contents of U.S. Provisional Patent Application Ser. No. 62/706,939 is incorporated by reference into this utility non-provisional patent application as if fully rewritten herein.

STATEMENT REGARDING FEDERALLY SPONSORED RESEARCH OR DEVELOPMENT

This invention was made with government support under Grant No. DE-FE0031740 awarded by the Department of Energy. The government has certain rights in the invention.

BACKGROUND OF THE INVENTION

1. Field of the Invention

This invention provides an innovative treatment process that utilizes Produced Water (PW) to create chemical and energy synergisms in Blow Down (BD) water treatment. The method maximizes the generation of a product stream low in fouling potential for reuse and a concentrated stream of commercial value (i.e., 10-lb Brine) while reducing chemical and energy costs for the treatment. This process comprises innovative use of established treatment technologies (i.e., brine electrolysis) to enable step improvement in cost and energy requirements for BD treatment over the conventional process. Specifically, this invention provides a treatment process comprising softening, organics and suspended solids (SS) removal, reverse osmosis (RO), brine electrolysis, and thermal desalination. These treatment units are integrated to sequentially treat the PW and BD water from their raw water conditions to those of a product stream suitable for reuse and 10-lb Brine as a saleable product.

2. Background Art

Makeup water used for cooling tower operation at thermoelectric power plants imposes a significant freshwater demand for power production. The makeup water is used to compensate for evaporative and drift water losses as well as blowdown (BD) water withdrawn to maintain acceptable levels of scale-forming constituents in the recirculating water. Constituents of concerns in the recirculating water include multi-valent metals (e.g., Ca, Mg, Fe, Al, Mn, Cu), sulfate, alkalinity (e.g., bicarbonate), silicon dioxide, and suspended solids (EPRI, 2012). In addition, microorganisms in the recirculating water are prone to cause biofouling on the exchanger and cooling surfaces and need to be addressed. PW from shale gas production requires treatment because it can contain a wide variety of chemicals including organic compounds, metals, radioactive materials, and production solids (e.g., corrosion, scale and formation solids, Warner et al., 2013) in addition to its very high salt content.

Treatment of the BD water for discharge or reuse has long been studied. Chemical treatment, membrane filtration, RO, and thermal desalination are commonly used treatment methods (Winter et al., 2002). A treatment train is typically assembled to meet designed treatment goals for water disposal or reuse, and generates by-products such as chemical sludge, a concentrated wastewater stream (i.e., brine), and/or solid salt. The BD water treatment imposes chemical and energy costs on the power producers, and often is not optimized for technical and economic efficiency. For example, alkaline chemicals used for removing scale-forming cations and biocide for controlling biofouling require chemical transportation, storage, and handling facilities, which increase the environmental footprint of the treatment. Total dissolved solids (TDS) concentration of the blowdown water is typically not at a level that is energy efficient for desalination to economically generate a product of commercial value.

SUMMARY OF THE INVENTION

The present invention provides a process for treating a mixture of produced water and blowdown water comprising mixing an amount of produced water (PW) and an amount of blowdown water (BD) for forming a produced water and blowdown water mixture (PW-BD water mixture), optionally adjusting the pH of the PW-BD water mixture, subjecting the PW-BD water mixture to at least one softening agent to form a softened produced water and blowdown water mixture, subjecting the softened produced water and blowdown water mixture to an activated carbon filtration to form a filtered produced water and blowdown water mixture, and subjecting the filtered produced water and blowdown water mixture to a reverse osmosis membrane desalination to form a treated permeate product water and a reverse osmosis reject water. In certain embodiments, this process includes subjecting the reverse osmosis reject water to a thermal desalination to produce a brine by-product. In certain embodiments this process of this invention, as described above and herein, includes increasing the pH of the PW-BD water mixture for removal of at least one metal. The metal is one or more selected from the group consisting of sodium, calcium, magnesium, barium, strontium, boron, silicon, sulfur, copper, aluminum, manganese, and iron. In certain embodiments of the process of this invention, as described above and herein, the thermal desalination is a waste-heat aided thermal desalination. The softening agent is $Na_2CO_3$ or NaOH, or both. In certain embodiments of the process of this invention, as described above and herein, the blowdown water (BD) is raw cooling tower blowdown water. In a preferred embodiment of the process of this invention, as described above and herein, the ratio of the blowdown water to the produced water is from 1:1 to 10:1.

In another embodiment of this invention, a process for treating a blowdown water is provided comprising subjecting a blowdown water to at least one softening agent to form a softened blowdown water, subjecting the softened blowdown water to an activated carbon filtration to form a filtered blowdown water, and subjecting the filtered blowdown water to a reverse osmosis membrane desalination to form a treated permeate as product water and a reverse osmosis reject water. In certain embodiments of the process for treating a blowdown water of this invention includes mixing the reverse osmosis reject water with a produced water to form a reverse osmosis reject water and produced water mixture, and subjecting the reverse osmosis reject water and produced water mixture to a softening agent for forming a softened reverse osmosis reject water and produced water mixture, and subjecting the softened reverse osmosis reject water and produced water mixture to a thermal desalination to form a brine by-product. The softening agent is $Na_2CO_3$ or NaOH. In certain embodiments of this invention, the blowdown water is raw cooling tower blowdown water.

In another embodiment of this invention, a process for treating a blowdown water is provided comprising subjecting a blowdown water to a thermal desalination to produce a product water and a reject thermal desalination water, and mixing the thermal desalination reject water with a produced water to form a thermal desalination reject water and produced water mixture, and subjecting the thermal desalination reject water and produced water mixture to a softening agent to form a brine by-product. The softening agent is $Na_2CO_3$ or NaOH.

DETAILED DESCRIPTION OF THE INVENTION

Figures 7A, 7B, 7C:
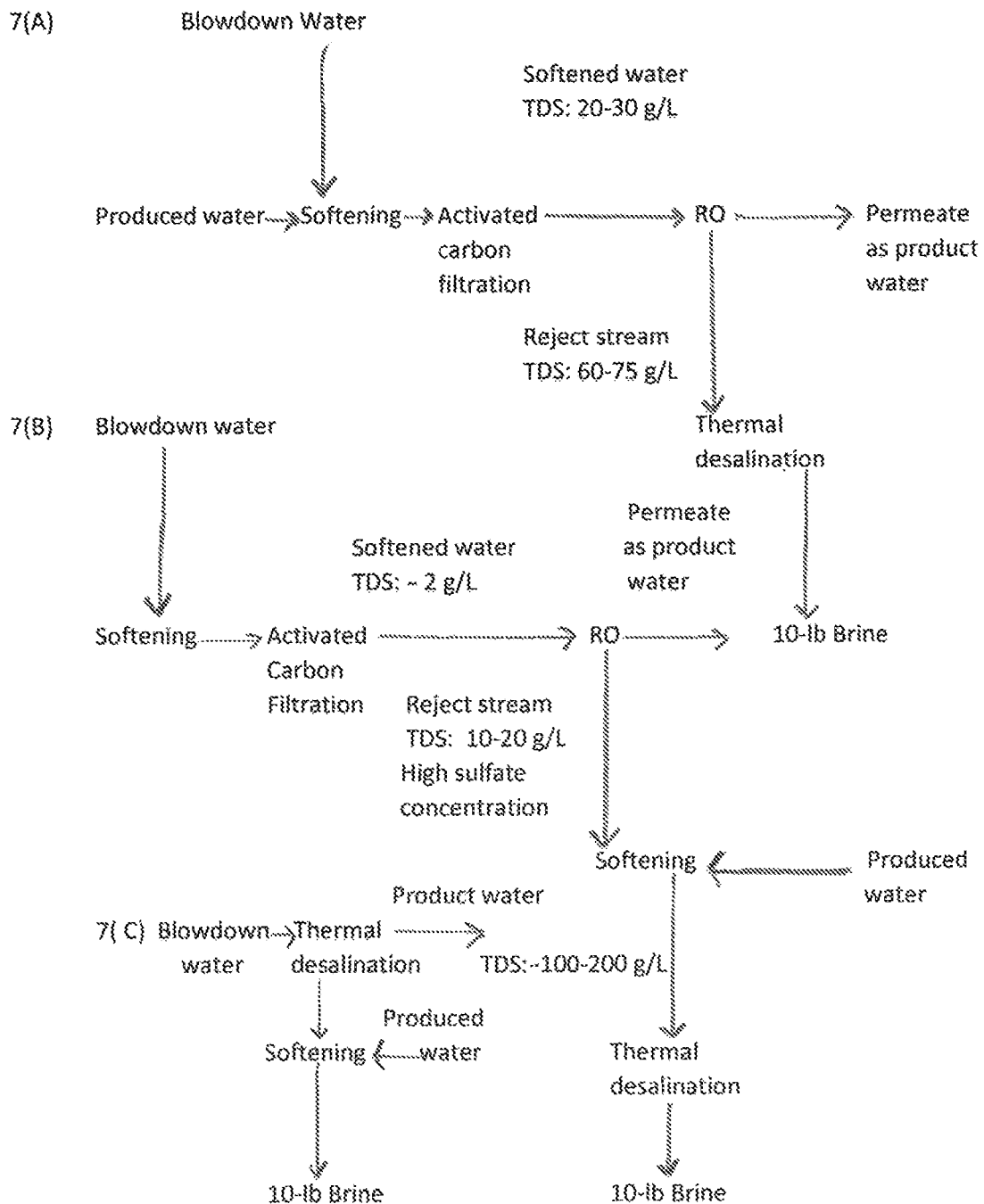
FIG. 7A shows a schematic diagram of a certain embodiment of the process of this invention.
FIG. 7B shows a schematic diagram of a certain embodiment of the process of this invention.
FIG. 7C shows a schematic diagram of a certain embodiment of the process of this invention.

Generally referring to FIG. 7A, and the descriptions set forth herein, the present invention provides a process for treating a mixture of produced water and blowdown water comprising mixing an amount of produced water (PW) and an amount of blowdown water (BD) for forming a produced water and blowdown water mixture (PW-BD water mixture), optionally adjusting the pH of the PW-BD water mixture, subjecting the PW-BD water mixture to at least one softening agent to form a softened produced water and blowdown water mixture, subjecting the softened produced water and blowdown water mixture to an activated carbon filtration to form a filtered produced water and blowdown water mixture, and subjecting the filtered produced water and blowdown water mixture to a reverse osmosis membrane desalination to form a treated permeate product water and a reverse osmosis reject water. In certain embodiments, this process includes subjecting the reverse osmosis reject water to a thermal desalination to produce a brine by-product. In certain embodiments this process of this invention, as described above and herein, includes increasing the pH of the PW-BD water mixture for removal of at least one metal. The metal is one or more selected from the group consisting of sodium, calcium, magnesium, barium, strontium, boron, silicon, sulfur, copper, aluminum, manganese, and iron. In certain embodiments of the process of this invention, as described above and herein, the thermal desalination is a waste-heat aided thermal desalination. The softening agent is $Na_2CO_3$ or NaOH, or both. In certain embodiments of the process of this invention, as described above and herein, the blowdown water (BD) is raw cooling tower blowdown water. In a preferred embodiment of the process of this invention, as described above and herein, the ratio of the blowdown water to the produced water is from 1:1 to 10:1.

Generally referring to FIG. 7B and the descriptions set forth herein, in another embodiment of this invention, a process for treating a blowdown water is provided comprising subjecting a blowdown water to at least one softening agent to form a softened blowdown water, subjecting the softened blowdown water to an activated carbon filtration to form a filtered blowdown water, and subjecting the filtered blowdown water to a reverse osmosis membrane desalination to form a treated permeate as product water and a reverse osmosis reject water. In certain embodiments of the process for treating a blowdown water of this invention includes mixing the reverse osmosis reject water with a produced water to form a reverse osmosis reject water and produced water mixture, and subjecting the reverse osmosis reject water and produced water mixture to a softening agent for forming a softened reverse osmosis reject water and produced water mixture, and subjecting the softened reverse osmosis reject water and produced water mixture to a thermal desalination to form a brine by-product. The softening agent is $Na_2CO_3$ or NaOH. In certain embodiments of this invention, the blowdown water is raw cooling tower blowdown water.

Generally referring to FIG. 7C and the descriptions set forth herein, in another embodiment of this invention, a process for treating a blowdown water is provided comprising subjecting a blowdown water to a thermal desalination to produce a product water and a reject thermal desalination water, and mixing the thermal desalination reject water with a produced water to form a thermal desalination reject water and produced water mixture, and subjecting the thermal desalination reject water and produced water mixture to a softening agent to form a brine by-product. The softening agent is $Na_2CO_3$ or NaOH.

This invention provides a modular water treatment process that utilizes PW to create chemical and energy synergisms in BD water treatment. The method maximizes the generation of a product stream low in fouling potential for reuse and a concentrated stream of commercial value (i.e., 10-lb Brine) while reducing chemical and energy costs for the treatment. This process comprises an innovative use of established treatment technologies (i.e., brine electrolysis) to enable step improvement in cost and energy requirements for BD treatment over conventional industrial processes. Specifically, this treatment process comprises softening, organics and suspended solids (SS) removal, RO, brine electrolysis, and thermal desalination. These treatment units are integrated to sequentially treat the PW and BD water from their raw water conditions to those of a product stream suitable for reuse and 10-lb Brine as a saleable product.

Figure 1:
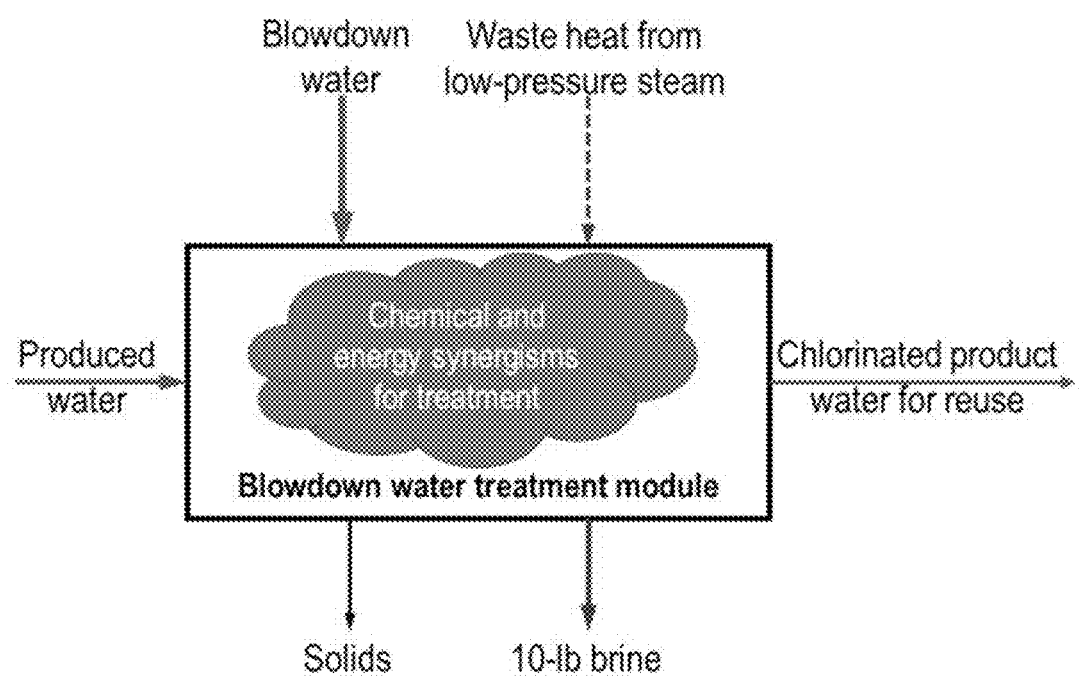
FIG. 1 shows an embodiment of the method of this invention of produced water and waste heat-aided blowdown water treatment for water reuse and concentrated brine generation.

This invention maximizes chemical and energy savings compared to conventional treatment processes by reducing the chemical and energy footprint of BD water treatment while also generating a saleable by-product. Introducing PW into BD water treatment can generate multifaceted chemical and energy synergisms because of their complementary chemistry. Specifically, BD water withdrawn from recirculating water for cooling tower operation concentrates substances that are currently used to treat PW for reuse: sulfate and carbonate. Both constituents of the BD water can form chemical precipitates with scale-forming cations in the PW (e.g., Ca, Ba, Sr) and alleviate the treatment burden of the downstream membrane process. In addition, the high salt content of PW can increase the Total Dissolved Solids (TDS) concentration of the feed stream to the downstream RO treatment, which in turn generates RO reject with higher TDS concentrations that can be more economically concentrated to the 10-lb Brine by thermal desalination. Additional products can also be created using a fraction of the brine in electrolysis (e.g., NaOH and Cl2, Khajouei et al., 2019) for BD water treatment, and for using waste heat from the low-pressure steam to reduce energy inputs to the thermal desalination. This invention provides a Produced Water (PW) and waste heat-aided blowdown (BD) water treatment process to maximize water reuse and saleable by-product generation while reducing chemical and energy costs for the treatment is described. This is an innovative and synergistic approach uses PW generated by the unconventional gas industry to reduce the chemical and energy footprints of BD water treatment and generate a saleable by-product (i.e., 10-lb Brine) while maximizing reuse of the treated water (see FIG. 1). FIG. 1 shows a schematic of this invention of produced water and waste heat-aided blowdown water treatment for water reuse and concentrated brine generation.

In particular, PW from shale gas production requires treatment because it can contain a wide variety of chemicals including organic compounds, metals, radioactive materials, and production solids (e.g., corrosion, scale and formation solids, Warner et al., 2013) in addition to its very high salt content. Introducing PW into BD water treatment generates multifaceted chemical and energy synergisms because of their complementary chemistry. Specifically, BD water withdrawn from recirculating water for cooling tower operation concentrates substances that are currently used to treat PW for reuse: sulfate and carbonate. Both constituents of the BD water can form chemical precipitates with scale-forming cations in the PW (e.g., Ca, Ba, Sr) and alleviate the treatment burden of the downstream membrane process. In addition, the high salt content of PW can increase the TDS concentration of the feed stream to the downstream RO treatment, which in turn generates RO reject with higher TDS concentrations that can be more economically concentrated to the 10-lb Brine by thermal desalination. A fraction of the brine in electrolysis can also be used to generate useful products (e.g., NaOH and $Cl_2$, Khajouei et al., 2019) for BD water treatment, and for using waste heat from the low-pressure steam to reduce energy inputs to the thermal desalination.

Figure 2:
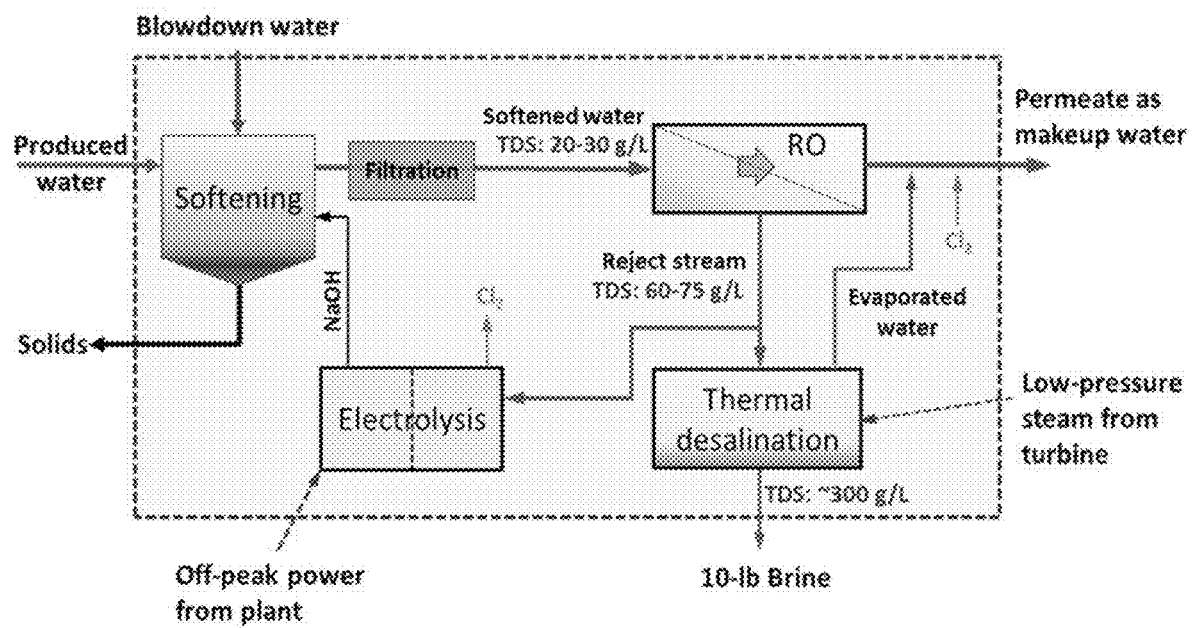
FIG. 2 shows a schematic of an embodiment of the method of this invention of the modular process for blowdown water treatment that uses produced water and waste heat at a power plant.
Figure 3:
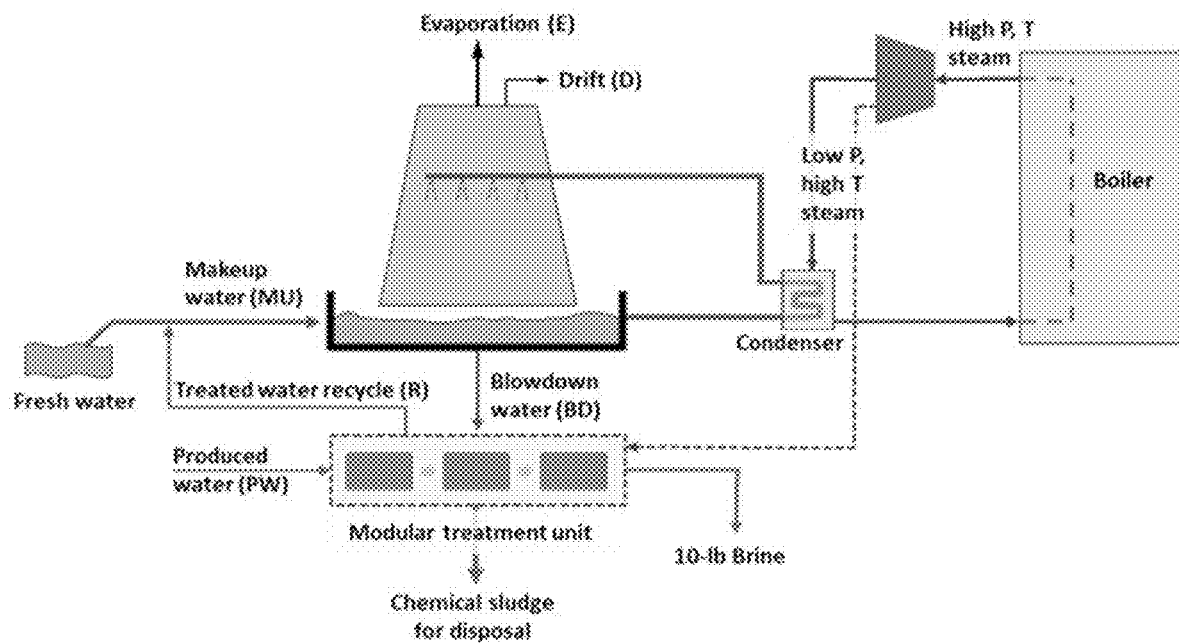
FIG. 3 shows model components of coal-fired power plant effluent water treatment and reuse system.

The treatment train comprises softening, organics and suspended solids (SS) removal, RO, brine electrolysis, and thermal desalination (see FIG. 2). FIG. 2 shows a schematic of an embodiment of the method of this invention of the modular process for blowdown water treatment that uses produced water and waste heat at a power plant. Unique features of the treatment approach include 1) PW-aided BD water softening and conditioning TDS for downstream RO treatment, 2) optimizing generation of a product water stream for reuse and a concentrated stream using RO to reduce overall energy cost of the process, 3) waste heat-aided thermal desalination to produce 10-lb Brine, and 4) brine electrolysis to generate useful products (NaOH and chlorine) for the treatment process. FIG. 3 shows a model components of coal-fired power plant effluent water treatment and reuse system.

The invention's treatment approach generates not only a product water stream for reuse, but also a concentrated stream as a saleable product (i.e., 10-lb Brine). Each treatment unit is justified and fully described by its treatment function and why it is used to contribute to the generation of the two intended products. This modular treatment process is optimized for maximizing chemical and energy savings compared to the baseline treatment process.

The invention's method utilizes PW to generate synergistic effects in BD water treatment for value creation is innovative. The utilization of PW enables the treatment process to be operated at a higher TDS level than those typical of BD water and alleviates the energy burden for generating 10-lb Brine while still generating a product stream low in fouling potential for reuse as makeup water for cooling tower operation. The use of waste heat and the innovative use of brine electrolysis further reduce the chemical and energy footprints of the treatment process.

The modular treatment process comprises of mature advanced treatment technologies (i.e., softening, filtration, RO, and thermal desalination) or innovative application of mature technology (i.e., brine electrolysis) that has been previously proven in laboratories at WVU. The novel synergistic effects of utilizing PW in BD water treatment are based on known chemistry of the two waste streams, and current scientific and engineering knowledge of the treatment methods. Integration of these individual treatment units in a modular process realize the synergistic benefits of chemical and energy savings and revenue generation.

The novelty of the treatment process centers on utilizing PW to generate synergistic effects of chemical and energy savings in BD water treatment. PW is typically processed in an oil-liquid separator and stored temporally onsite at the gas production well to allow solid settlement and removal before transportation to a facility for treatment or disposal. The PW-aided BD water treatment process takes advantage of the respective chemistry of the two waste streams to maximize the generation of the two intended products (i.e., product water and concentrated brine). Rationale and treatment function of each treatment unit of the proposed process are described in the following paragraphs:

1. Softening to Remove Scale-Forming Constituents

BD water typically contains a significant level of sulfate that can be used to form precipitates with barium (Ba) and strontium (Sr), radium (Ra) from PW due to their low solubilities (Table 1, Ziemkiewicz and He, 2015). The (Bi) carbonate alkalinity in BD can be used to remove carbonate hardness (i.e., Ca and Mg) in both water streams by raising pH. Our previous study on PW softening showed $CaCO_3$ precipitate can also effectively facilitate removal of Ba and Sr through co-precipitation (Khajouei et al, 2019). In the softening treatment, organics can sorb to $Mg(OH)_2$ precipitates and be removed together with the chemical sludge (Matson and Harris, 1979). A caustic soda solution (NaOH) generated from brine electrolysis (to be described later) can be added to the PW-BD mixture in the softening unit to raise the pH and a carbonate material (e.g., $Na_2CO_3$) is supplemented if necessary to fully remove total hardness. The softening treatment can also remove $SiO_2$.

TABLE 1

The Effect of Shifting the Dominant Anion from Chloride to either Sulfate or Carbonate on Mineral Solubility.

| chlorides | | sulfates | | carbonates | |
|---|---|---|---|---|---|
| mineral | solubility (mg/L) | mineral | solubility (mg/L) | mineral | solubility (mg/L) |
| a) NaCl | 360,000 | a) $Na_2SO_4$ | 281,000 | a) $Na_2CO_3$ | 307,000 |
| a) $MgCl_2$ | 560,000 | a) $MgSO_4$ | 357,000 | a) $MgCO_3$ | 390 |
| a) $CaCl_2$ | 813,000 | a) $CaSO_4$ | 2,505 | b) $CaCO_3$ | 5.8 |
| a) $SrCl_2$ | 547,000 | b) $SrSO_4$ | 108 | b) $SrCO_3$ | 3.5 |
| a) $BaCl_2$ | 370,000 | b) $BaSO_4$ | 2.4 | b) $BaCO_3$ | 10.0 |
| a) $RaCl_2$ | 245,000 | b) $RaSO_4$ | 2.1 | c) $RaCO_3$ | insoluble | a) from solubility table
b) derived from $K_{sp}$
c) Reported insoluble, no $K_{sp}$ available 2. Filtration to Remove Organics and Suspended Solid Residues A filtration unit is used to remove residual organics and SS in the effluent from the softening unit to minimize its fouling in the downstream RO treatment. Activated carbon filtration can remove both organics and SS under the high pH and salinity conditions of the PW-BD mixture. A commercial nanofiltration unit can be used to enhance overall filtration performance.

3. RO (Reverse Osmosis) Treatment

The high salt content of the PW and the caustic soda from the brine electrolysis can increase the TDS concentration of the feed stream to the RO unit. The RO treatment is used to optimize the generation of a product water stream for reuse and the concentrated stream for further processed in the downstream thermal desalination. Given that the RO treatment cost ($0.78-1.33/m$^3$) is substantially lower than those of thermal desalination methods ($2-8/m$^3$, Miller, 2003), the optimization considers both maximizing water recovery and the TDS of the RO reject to reduce the concentration factor of the thermal desalination for energy saving. Although the increase in TDS of the RO feed stream can increase energy inputs for the RO treatment (Graves and Choffel, 2012), the benefit of energy saving in the thermal treatment can outweigh the increased energy inputs to the RO.

4. Thermal Desalination

The thermal desalination treats the RO reject to further concentrate the salt content to generate 10-lb Brine as a saleable product. Both multi-effect distillation (MED) and vapor compression distillation (VC) can be used for the treatment (Rinker, 2014). In general, the thermal energy needed is available from three sources: (1) a resister heater converting electricity to heat; (2) a furnace burning natural gas, propane or coal, and (3) low-pressure steam sampled from steam turbine. Among these, the low-pressure steam is low quality thermal energy capable of providing the energy needed to evaporate the liquid water with acceptable minor impact on the electricity generation at the power plant. The sampling of low-pressure steam has very minimum impact on electricity production at night when electricity demand is low. A two-stage MED system equipped with energy recovery mechanisms can be used to further reduce energy consumption.

Desalination through Water-Evaporation Process may be used in this process comprising one or more of Multi-effect distillation (MED or Mechanical Vapor Recompression (MVR, as know by those persons skilled in the art. Thermal energy provided by low quality waste heat from a steam turbine may be used.

5. Brine Electrolysis for NaOH and $Cl_2$ Generation

We have operated a brine electrolysis cell at room temperature and achieved NaOH generation with over 90% faradaic efficiency and chlorine generation with 30% faradaic efficiency (Khajouei et al., 2019). Briefly, the brine electrolysis results in generation of NaOH according to cathodic reaction 1 if the cathode is a gas-impermeable metal. We have recently used a proprietary gas-permeable electrode from an industrial partner which efficiently reduces molecular oxygen from air to hydroxide (reaction 2). Reaction 2 avoids the production of hydrogen gas and more efficiently generates NaOH. A cation exchange membrane (CEM) permits the passage of hydrated sodium ions from the anode compartment to the cathode compartment where sodium hydroxide is produced.

$$2H_2O+2e^- \rightarrow H_2+2OH^- \quad (1)$$

$$2O_2+2H_2O+4e^- \rightarrow 4OH^- \quad (2)$$

Chlorine and hypochlorous acid in the anode compartment (reactions 3 and 4) are generated according to the following reactions:

$$2Cl^- \rightarrow Cl_2+2e^- \quad (3)$$

$$Cl_2+H_2O \rightarrow HOCl+Cl^-+H^+ \quad (4)$$

A fraction of the current at the anode drives water oxidation:

$$2H_2O \rightarrow O_2+4H^++4e^- \quad (5)$$

The electrolysis cell is optimized with respect to brine concentration, concentration of the base, rate of base and chlorine production, and power consumption. Sources of the brine can be from RO reject. The generated chlorine treats the RO permeate or the recirculating cooling water to control biological fouling in the recirculating water system.

6. Process Modeling and Simulations

Process model simulations optimize the synergistic treatment process in terms of chemical and energy footprints, as well as operational flexibility. The condenser and cooling tower models are included in the process model to optimize the treatment operation at plant baseload/partial load and during plant cycling to minimize the operating costs (FIG. 3). The experimental results of treatment performance, chemical and energy requirements of each treatment unit are used in the process model simulations to optimize the configuration and operating conditions and quantify the economic impact of the technology. The analysis also considers transportation costs for PW and chemicals. FIG. 3 shows model components of coal-fired power plant effluent water treatment and reuse system.

Figure 4:
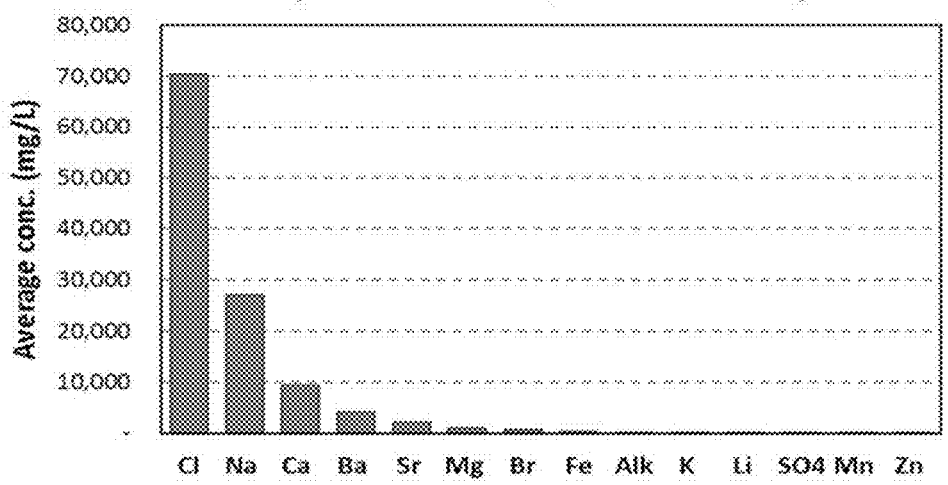
FIG. 4 shows a graph of the average concentrations of produced water chemical constituents from the MSEEL gas production well.
Figure 5:
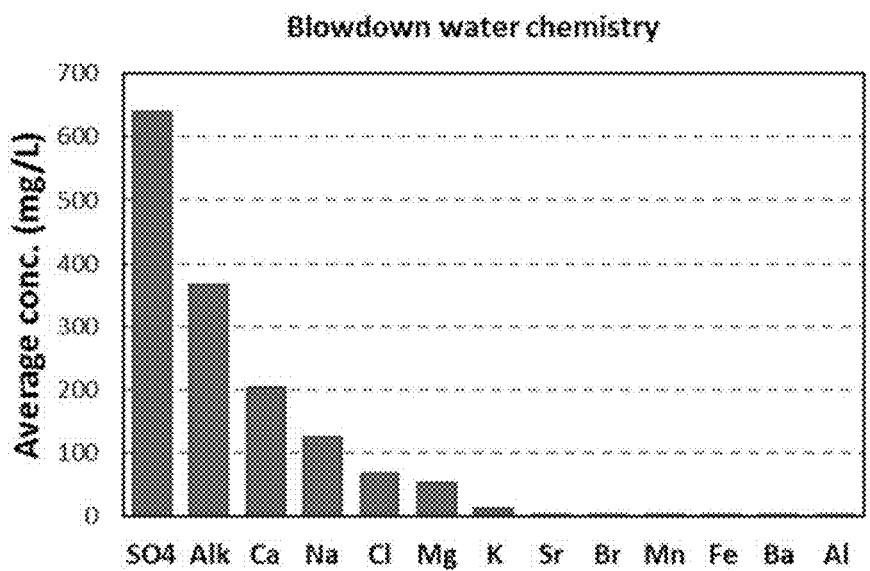
FIG. 5 shows chemical concentrations of blowdown water characteristic of pulverized coal units burning northern Appalachian coal.

This method uses our cumulated research expertise and knowledge built by an ongoing DOE/NETL funded project, Marcellus Shale Energy and Environmental Laboratory (MSEEL). Previous monitoring at the MSEEL gas production well has shown that the high TDS concentration (~100 g/L) of the PW was mostly due to chloride and sodium, and at significantly smaller amounts, Ca, Ba, Sr and Mg (FIG. 4). In contrast, BD water contains has high sulfate and carbonate, followed by Ca, Na, Cl and Mg (FIG. 5). A stoichiometric analysis using these data showed that a mixing ratio of 1:9 (PW:BD) provided a sufficient amount of sulfate from the BD water to form precipitates with Ba and Sr from the PW. Our NSF/EPSCoR-funded study showed that caustic soda solutions (NaOH, pH>12) can be consistently generated from brine electrolysis with reasonable power inputs and successfully used for PW softening. In this work, the electrolytically generated NaOH solution is used to raise pH of the PW-BD mixture in the softening unit and $Na_2CO_3$ is added to supplement carbonate if necessary to remove hardness. Proper mixing ratios of these streams results in an effluent low in multivalent ions (both cations and anions), and carbonate alkalinity.

The same PW:BD mixing ratio (i.e., 1:9) results in ~10 g/L NaCl without the NaOH solution from the brine electrolysis, and salt content is higher with the NaOH and $Na_2CO_3$ additions. Activated carbon and nanofiltration systems are tolerant to high pH conditions (Zubot et al., 2012; Daems et al., 2018) including that of the softened effluent and effectively remove residual organics and SS. FIG. 4 shows average concentrations of produced water chemical constituents from the MSEEL gas production well. FIG. 5 shows chemical concentrations of blowdown water characteristic of pulverized coal units burning northern Appalachian coal.

Figure 6:
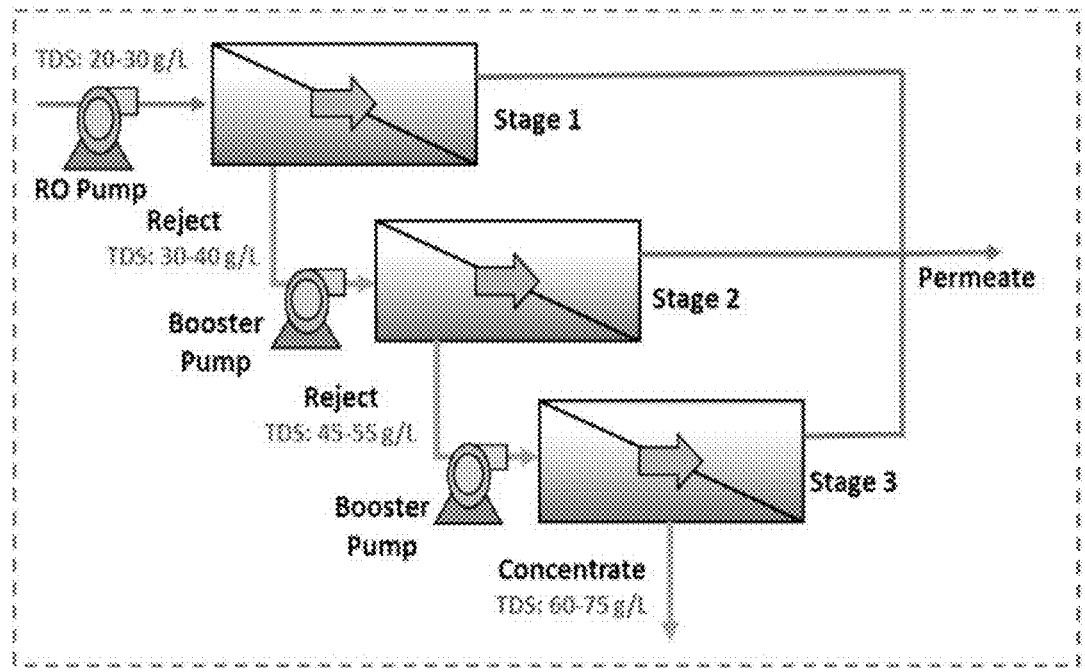
FIG. 6 shows a three-stage reverse osmosis treatment flow diagram.

The RO unit processes a feed stream containing 20-30 g/L TDS with low concentrations of multivalent ions, carbonate, and organics (i.e., low fouling potential). A multi-stage RO can treat seawater (TDS: 38-38.5 g/L) and achieve more than 40% water recovery and 65.2 g/L TDS in the RO reject (Greenlee et al., 2009). This method uses a three-stage RO treatment is used to generate a product stream low in fouling potential and a concentrate stream containing 60-75 g/L TDS (see FIG. 6). FIG. 6 shows a three-stage reverse osmosis treatment flow diagram.

The RO reject stream is further concentrated by evaporating water in the MED system using the low-quality thermal energy in the low-pressure steam sampled from steam turbine. The temperature of the low-pressure steam sampled from steam engine (e.g., 104° C.) is sufficient to evaporate the liquid water from the RO reject (Zhao et al., 2011). A two-stage MED can be used to reduce more than 70% of thermal energy required by a single stage MEM system. The two-stage MED treatment can achieve a TDS concentration factor of 4-5.

The treatment process comprises only mature treatment methods and an innovative application of mature technology (i.e., brine electrolysis). The multiplicative synergistic effects from using PW and waste heat in the BD water treatment with process optimization creates step-change improvement in cost and energy over the baseline treatment process consisting of chemical treatment, nanofiltration, RO and MVR. It achieves this through process intensification (i.e., operating the treatment at higher salt content by introducing PW) and optimization.

The treatment process can sequentially treat the PW-BD mixture from their raw water conditions to those of a product stream for reuse and 10-lb Brine. The process can be operated continuously or periodically when power demand is low. A bench process is used to determine the size of each individual treatment unit at flow rates in the range of 0.01 to 1 gpm and integrated in a modular process for a cumulative flow rate (i.e., 0.5 gpm).

PW samples from the MSEEL production well and BD water from Longview Power Plant are used to provide exemplary conditions for this process. Exemplary energy and chemical savings are determined using the experimental results generated with the PW and BD water.

The invention provides a cooling tower blowdown (BD) water treatment process utilizing produced water (PW) and low grade heat to maximize water reuse and saleable by-product generation while reducing chemical and energy footprints of the treatment. The treatment process comprises of softening, organics and suspended solids removal, reverse osmosis (RO), brine electrolysis, and thermal desalination.

These treatment units are integrated to sequentially treat the PW and BD water from their raw water conditions to those of a product stream suitable for reuse and 10-lb brine as a saleable product. Three treatment trains (FIG. 1) were developed and to be tested to compare their production of product water for reuse and brine solution, as well as their chemical and energy footprints.

The project team has completed the softening and activated carbon treatment (Tasks 2 and 3), and set up a three-stage RO treatment unit of the first treatment train (Task 4). In addition, a two-compartment electrolytic cell was constructed and tested using lab-prepared salt solutions to produce sodium hydroxide and chlorine as useful by-products of the treatment process (Task 6). Commercial software including OLI Flowsheet (OLI Systems Inc.) and Aspen Plus (Aspen Tech Inc.) were evaluated in terms of the availability of unit models and future connectivity with optimization algorithms (Task 8). Based on the evaluation and current budget constraints, purchasing the license for the OLI Engine in Aspen Plus (Aspen Tech, Inc.) is being pursued. Also, the model development for softening, filter and RO (reverse osmosis) units has been initiated.

Task 2.0—Produced Water-Aided Blowdown Water Treatment with Caustic Soda from Brine Electrolysis This process provides a produced water-aided blowdown water treatment with softening. A range of volumetric mixing ratios of the PW and BD water samples was subjected to Jar tests to measure pH changes and the removal efficiency of scale-forming constituents. The NaOH solution was used to raise to the pH of the PW-BD water mixtures to different end points for further removal of scale-forming constituents. The softening treatment was also conducted with soda ash ($Na_2CO_3$) addition for comparison. The softened effluents were analyzed, and the softening efficiency were quantified as a function of pH end points of the mixture. The softening treatment was conducted in both batch mode.

Results and Discussion

FIG. 7B shows treatment trains to be compared for their chemical and energy footprints including PW-BD mixture treatment, and FIG. 7B shows BD alone treatment before downstream mixing with PD water and thermal desalination, and FIG. 7C shows thermal desalination of BD water before downstream mixing with PW water and softening. For treatment train A (FIG. 7A), the PW and BD samples were mixed at BD:PW volumetric ratios of 5:1 and 10:1 and for treatment train B (FIG. 7B), BD water was treated with alkaline chemicals in a softening unit.

By introducing PW to BD, without any chemical addition, high sulfate content of BD formed precipitates with Ba and resulted in 100% Ba removal at ratio BD:PW=10:1. This volumetric ratio was selected for further downstream activated carbon filtration and RO membrane desalination. The softening treatment to further remove scale-forming ions (e.g., Ca and Mg) was conducted by increasing pH of the solution to pH~12 using NaOH (5M) or NaOH from brine electrolysis (~0.1M at volumetric ratio of NaOH:sample=1:1) and adding sodium carbonate (sodium carbonate: sample total hardness molar ratio=1:1). The results showed >90% removal of metals was achieved by the softening of PW-BD mixture (treatment train A, FIG. 7A) and BD alone (treatment train B, FIG. 7B) (Table 2).

TABLE 2

Characteristic of raw produced water, raw blowdown water, PW-BD mixture (BD:PW = 10:1) and BD alone after softening and activated carbon.

| | Row water | | | After softening | | After activated carbon | |
|---|---|---|---|---|---|---|---|
| Parameter | Produced water (PW) | Blow down water (BD) | After mixture BD:PW = 10:1 | Scenario A BD:PW = 10:1 | Scenario B BD alone | Scenario A BD:PW = 10:1* | Scenario B BD alone* |
| TDS (g/L) | 230 | 2 | | 20 | 2 | | |
| TSS (g/L) | 0.3 | 0.02 | | 0.0 | 0.0 | 0.0 | 0.0 |
| TOC (mg/L) | 13 | 23 | | 15 | 20 | 1.3 | 0.0 |
| pH | 5.7 | 8 | | ~12 | ~12 | 7.0 | 8.0 |
| Alkalinity | 17 | 89 | | — | — | | |
| Acidity | 224 | 5.0 | | 0.0 | 0.0 | | |
| Sulfate (mg/L) | 4 | 900 | | 136 | 1450 | 410 | 650 |
| Ammonium (mg/L) | 145 | 0.0 | | 7.6 | | | |
| Silica ($SiO_2$) (mg/L) | 18 | 30 | | 12 | 8.5 | 9.6 | 6.4 |
| Chloride (mg/L) | 113,000 | 160 | | 10,400 | 175 | 8600 | 518 |
| Metals (mg/L) Sodium (Na) | | 215 | | NA | NA | NA | NA |
| Calcium (Ca) | 13,800 | 170 | 1950 | <0.001 | 3.0 | <0.001 | 0.72 |
| Magnesium (Mg) | 1600 | 53.5 | 200 | <0.001 | 0.2 | <0.001 | 0.18 |
| Barium (Ba) | 9226 | 1 | 0.73 | 0.8 | 0.02 | <0.05 | <0.05 |
| Strontium (Sr) | 4093 | 2 | 286 | 3 | 0.3 | <0.05 | <0.05 |
| Boron (B) | 18 | 1 | | 2 | 0.98 | 0.12 | 0.13 |
| Silicon (Si) | 8 | 14 | | 5.5 | 4.0 | 4.5 | 3.0 |
| Sulfur (S) | 5 | 377 | | 90 | 380 | 126 | 212 |
| Copper (Cu) | <0.007 | <0.007 | | <0.007 | <0.007 | <0.007 | <0.007 |
| Aluminum (Al) | <0.007 | <0.007 | | <0.007 | <0.007 | <0.007 | <0.007 |
| Manganese (Mn) | <0.007 | <0.007 | | <0.007 | <0.007 | <0.007 | <0.007 |
| Iron (Fe) | 80 | <0.01 | | <0.001 | <0.001 | <0.001 | <0.001 |

Task 3.0—Removal of Organics and Suspended Solids Using Filtration

We used activated carbon (AC) filtration in this task to remove residual organics and SS from the softening treated effluent. Total organic carbon (TOC), SS, TDS, and scale-forming constituents were measured to quantify the treatment efficiency. These measurements were used to determine if the filtered effluent meet the criteria for RO treatment (e.g., silt density index, pH).

TOC removal was negligible in the softening treatment. An AC filter (ARIES filterworks, VP series cartridges, D=3.38"×L=17.0", Volume=134.2 cu.in) was used for organics removal. The treated water from the softening unit was pumped into AC filtration under 5 psig. The water was treated in multiple cycles until TOC was reduced to <3 ppm to meet the downstream RO feed water criteria. The results showed >90% TOC removal after 7 cycles for treatment train A and 5 cycles of filtration for treatment train B (FIG. 7B). The AC filter is designed to treat the effluent from the softening unit in one cycle, and the effect of AC treatment on pH is examined.

Task 4.0: Product Water and Brine Generation Using Reverse Osmosis

We used a three-stage RO system to further concentrate the TDS from 20-30 g/L to 60-75 g/L and generate a permeate stream for reuse. Commercially available RO units (e.g., Dow FILMTEC™ BW30LE-4040) were used in this task. The actual operating conditions (e.g., hydraulic pressure, TDS, water flows) were measured in a preliminary test run. Additional parameters (e.g., water fluxes, water recovery, and TDS concentration factor) will be calculated.

Results and Discussion

Figure 8:
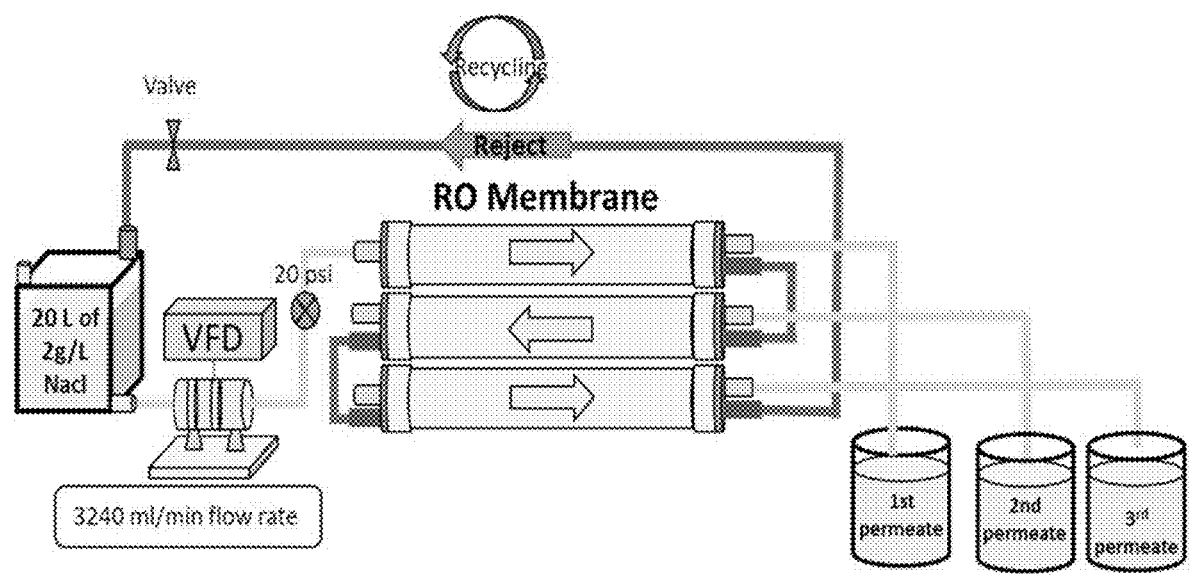
FIG. 8 shows a schematic diagram of a reverse osmosis process.
Figure 9:
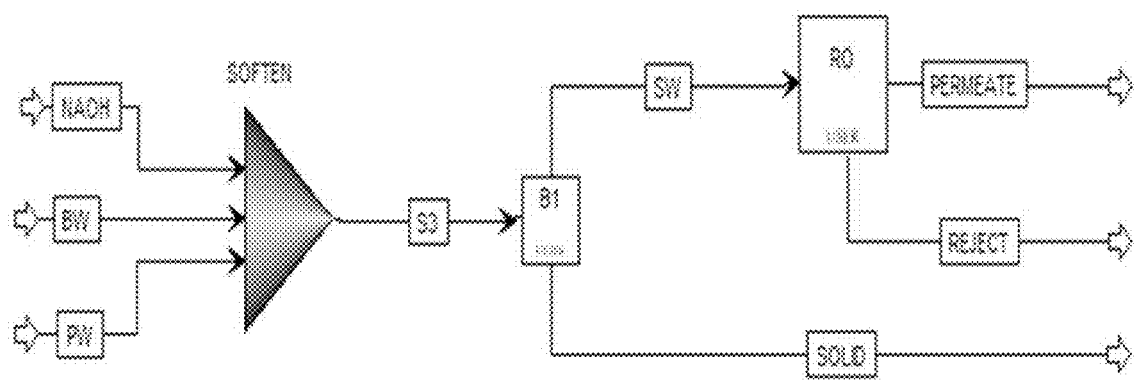
FIG. 9 shows the Aspen flowsheet for softening, filter, and RO units of the process of this invention.

A three-stage RO system was set up in a laboratory at WVU to generate permeate and rejected water (for further 10-lb brine production) (FIG. 8). Initially, a sodium chloride solution (2 g/L) was tested at a flow rate 3.24 L/min and 20 psig. Water quality parameters including pH, conductivity, total dissolved solid (TDS), sodium (Na) and chloride (Cl) of each permeate water and rejected water were measured (Table 3). FIG. 8 shows a schematic diagram of the three stage RO treatment system.

TABLE 3 pH, Conductivity, Na, Cl of three permeate waters and final rejected water from the RO treatment.

|  | pH | Conductivity(µS/cm) | Sodium (Na) (mg/L) | Chloride (Cl) (mg/L) |
|---|---|---|---|---|
| Initial | 5.5 | 4437 | 1155 | 863 |
| $1^{st}$ permeate | 6.2 | 41.36 | 8.8 | 7.2 |
| $2^{nd}$ permeate | 6.2 | 71.72 | 15.5 | 12.5 |
| $3^{rd}$ permeate | 6.2 | 82.74 | 18.5 | 14.5 |
| Rejected water | 6.1 | 5182 | 1386 | 13030 |

We will measure treatment performance and energy consumption of the RO process. Results will be used to compare chemical and energy footprints of the two treatment configurations and product yields. A cost analysis will be conducted according to the following Treatment Layout Chart:

| | Treatment layout | | | | | |
|---|---|---|---|---|---|---|
| | A | | | B | | |
| Chemical consumption | Amount (kg/L) | Unit price ($/kg) | Cost ($/L) | Amount (kg/L) | Unit price ($/kg) | Cost ($/L) |
| Sodium carbonate 99.5% | 0.006 | 72.40 | 0.432 | 0.0006 | 72.40 | 0.043 |
| | Amount (L) | Unit price ($/L) | cost ($/L) | Amount (L) | Unit price ($/L) | cost ($/L) |
| Sodium hydroxide (5M) | 0.011 | 0.056 | 0.0006 | 0.004 | 0.056 | 0.0002 |
| Total cost | | | 0.4326 | | | 0.0432 |

| | Treatment layout | | | | | |
|---|---|---|---|---|---|---|
| | A | | | B | | |
| Energy consumption | Energy consumption (KW/L) | Unit price ($/kw) | Cost ($/L) | Amount (kg/L) | Unit price ($/kg) | Cost ($/L) |
| Softening | | | | | | |
| Activated carbon filtration | | | | | | |
| RO desalination | | | | | | |

| | Treatment layout | |
|---|---|---|
| | A | B |
| Transportation | | |

Task 5.0: Waste Heat-Aided Thermal Desalination to Generate 10-Lb Brine

This task designs and fabricates a bench-scale two-stage MED unit to evaporate the liquid water in the RO reject to generate 10-lb brine. Specifically, key customized components (e.g., MED system housing, heat exchangers, condensers, connectors and valves) will be designed at this task. Low-pressure steam will be generated by a commercial electrical steam generator. The two-stage system will be equipped with waste energy recovery mechanisms to improve the energy efficiency of the treatment. Specifically, the steam produced in the $1^{st}$ stage will be used to evaporate water in the $2^{nd}$ stage at a lower temperature. This will recover the majority of the thermal energy consumed in the $1^{st}$ stage. The vapor formed in the $2^{nd}$ stage will be recovered to heat the RO reject before entering the $1^{st}$ stage.

Results and Discussion

The project has (1) conducted an analysis and system design of the MED system; (2) analyzed the energy consumption of the MED system; (3) evaluated the sampling location of the low quality waste heat in steam turbine and its impact on turbine power output.

Task 6.0—Brine Electrolysis for Caustic Soda and Chlorine Production

A two-cell electrolysis cell was used to generate sodium hydroxide and chlorine and will be optimized to obtain (a) high faradaic efficiency, and (b) minimization of power requirements. A locally constructed electrolysis cell was used to convert brine into chlorine/hypochlorite and sodium hydroxide. The cell contains a dimensionally stabilized anode (DSA), an Oxygen Depolarizing Electrode (ODE) from Covestro as the cathode, a cation exchange membrane (CEM) which separates the cell into the anode and the cathode compartments, ports for pumping solutions through the two compartments, clamping end plates, spacers and sealing gaskets. The working area of the cell is 24 cm2 and the distance between electrodes, including the CEM, is approximately 0.5 cm. The cell is connected to a peristaltic pump and reservoirs for the catholyte and anolyte. Electrochemical measurements are obtained using a Solartron system (potentiostat/galvanostat and frequency response analyzer). Galvano-dynamic scans are used to determine if the current was limited by mass transfer (formation of depletion layers); galvanostatic experiments generated the products, and electrochemical impedance spectroscopy (EIS) was used to determine the ohmic resistance of the cell at open circuit conditions. The selected catholyte was 0.5 M NaCl (29.2 g/L), and the selected anolyte was 0.5 M NaCl+0.2 M $NaHCO_3$ (16.8 g/L). The purpose of the sodium bicarbonate is to neutralize any acid generated in the anolyte, whether from water oxidation or ionization of hypochlorous acid (HOCl), so that H+ does not migrate through the CEM to neutralize generated hydroxide (OH¬) in the catholyte. The high pH (~8 to 9) of the bicarbonate solution causes chlorine (Cl2) to convert to HOCl and the HOCl to ionize to hypochlorite (OCl—), which avoids evaporation of volatile chlorine from the anolyte before analysis. Immediately following electrolysis, the anolyte was titrated with thiosulfate in the presence of excess iodide to determine the yield of hypochlorite, and the catholyte was titrated with hydrochloric acid to determine the yield of hydroxide. The Faradaic efficiency was calculated based on the theoretical yield of these products using the total charge passed through the cell (Faraday's Law: 1 electron generates 1 OH—, 2 electrons generates 1 OCl—). Four CEMs were donated to the project by Chemours. Two of the CEMs were evaluated in this quarter: N2100WX and N982WX. The electrolysis was performed at a current density of 80 mA/cm2 and the time of the electrolysis (1200 s) was selected to generate a catholyte of approximately 0.1 M NaOH. From the galvano-dynamic scans, this current density did not induce any depletion layers, so cell voltages were dictated by the ohmic resistance of the cell and the electrode overpotential. Similarly, the galvanostatic experiments exhibited essentially constant voltage during the electrolysis.

Results and Discussion

Table 4 contains the metrics for brine electrolysis with the two membranes. The faradaic efficiencies for hypochlorite generation are essentially identical. The N2100WX membrane appears to be superior in terms of a lower cell ohmic resistance (Cell R), a higher faradaic efficiency for generation of hydroxide, and lower specific energies for generation of hydroxide and hypochlorite.

TABLE 4

Metrics for brine electrolysis

| Membrane | Cell R ohm cm² | Faradaic efficiency hydroxide | Faradaic efficiency hypochlorite | Specific energy kWh/mol hydroxide | Specific energy kWh/mol hypochlorite |
|---|---|---|---|---|---|
| N2100WX | 12 | 97% | 71% | 0.0802 | 0.226 |
| N982WX | 17 | 67% | 72% | 0.152 | 0.282 |

The remaining two membranes are tested under the same conditions as the first two membranes. Next, the effect of current density is explored. A lower current density is expected to decrease the specific energies. Also, a higher brine concentration (60 g/L) will be tested; this change is anticipated to improve the faradaic efficiency for hypochlorite generation.

Task 7.0: Integration of Treatment Units

The treatment units developed in Tasks 2-6 will be integrated into a single, packaged prototype module in order to demonstrate overall treatment feasibility. The integrated module will be used to process a combined flow of PW and BD waters to produce an RO permeate flow in the range of 0.1-1 gpm. Given the different kinetics and capacities of the individual treatment units, an intermediate container will be used to hold the treated water as a flow equalizer between two units that have significantly different treatment capacities. The operating conditions of the treatment units developed in the previous tasks will be further optimized in this task. Energy and chemical footprints and manufacturing/capital costs of the integrated process will be documented and used in the techno-economic analysis (Task 8.0).

Task 8.0—Process Modeling and Simulations

Commercial software such as OLI Flowsheet (OLI Systems, Inc.) or Aspen Plus (Aspen Tech, Inc.) is used to simulate the proposed process model. Specifically, condenser and cooling tower models are simulated to estimate the water loss by evaporation and drift during different operating scenarios. These models are employed to calculate the blowdown and makeup water flowrates in order to maintain the appropriate concentration. Different scenarios are considered for acquiring produced water. For example, one scenario is to pay for transportation costs to truck the water from the well and have the produced water available at no cost. Another possible scenario is be to pay for water transportation, but also receive compensation for taking the water. For the proposed modular treatment process, the unit model is developed using mass and energy balances based on available experimental data or first-principles models from the commercial software. Also, an economic model is coupled with the process model to estimate the capital and operating costs based on economic assumptions and the Aspen Process Economic Analyzer tool (Aspen Tech, Inc.). With the proposed process and economic models, a MILP (mixed-integer linear programming) optimization problem is formulated to determine the optimal configuration/number of RO (reverse osmosis) units needed and the optimal concentration of the RO reject stream to minimize capital and operating costs. The TEA considers addition of a 4th, higher-pressure RO unit that can handle higher TDS to further concentrate the RO concentrate from the three-stage RO treatment (Task 4.0). Disposal options and costs for the generated sludge materials including NORM, if detected, is proposed and included in the TEA. To solve this optimization problem, MILP tools are explored, such as the solvers available in the Optimization toolbox in MATLAB (Mathworks, Inc.) and GAMS (GAMS Development Corporation), if needed for higher complexity. In addition, based on the developed model and optimization algorithm, a TEA is conducted to estimate the manufacturing cost and operating performance of the proposed modular unit with the ultimate goal of obtaining the most cost-effective modular design.

Results and Discussion

Evaluation of different software platforms (OLI Flowsheet+Stream Analyzer vs. OLI Engine in Aspen Plus) was conducted to test the software capabilities for modeling and techno-economic analysis (TEA). Based on the evaluation of different software capabilities and budget constraints, it was determined that the OLI Engine in Aspen Plus has advantages over the other OLI platforms. Also, investigations have been conducted to initiate the process modeling via Aspen Plus, and a literature review on RO (reverse osmosis) model development has been performed. In particular, for the software evaluation, both platforms (OLI Flowsheet or Aspen Plus) can easily access the OLI thermodynamic property database for simulating the chemical and physical behavior of aqueous-based systems. OLI Flowsheet has advantages for process modeling as its built-in library includes most of the units that are in our process flowsheet, such as neutralizer, filter, RO, etc. However, OLI Flowsheet is limited for TEA and optimization studies due to its lack of flexibility to connect with other software that will be used to perform these tasks (e.g., MATLAB). OLI Engine in Aspen Plus allows the user to take advantage of existing capabilities in Aspen Plus, such as the Aspen Process Economic Analyzer tool and the Aspen flexibility to connect with other software. However, there are only a limited number of unit models from our process available in the Aspen library. To overcome this disadvantage, unit models (e.g., RO, thermal desalination, electrolysis) can be developed in Aspen Custom Modeler (ACM) and then exported to Aspen Plus. For the initial model development in Aspen Plus, mixer and filter models in the built-in library of Aspen were used for predicting the characteristics of different wastewater sources (e.g., produced water and blowdown water) after softening and filter steps. FIG. 3 shows the schematic process flowsheet for the softening, filter and RO units in Aspen Plus. Currently, this RO unit is a component separator but it will be replaced with a rigorous RO model once it is developed in Aspen Custom Modeler. Also, experimental data from softening and filter unit operations have been collected from Prof. Lin's lab. A more detailed comparison between the modeling and experimental results will be done once the new license for OLI Engine in Aspen Plus is purchased. FIG. 8 shows the Aspen flowsheet for softening, filter, and RO units.

Regarding the literature review, many of the existing RO models use the Spiegler-Kedem-Katchalsky model which was developed for ion transport through a membrane for ionic solutions. This model provides the basic flux equations for the RO unit, as shown below in Equations 1 and 2 (Boussouga et al., 2017).

$$J_v = L_p(\Delta P - \sigma \Delta \pi) \tag{1}$$

$$J_s = P_s(C_m - C_p) + (1-\sigma)J_v C_m \tag{2}$$

Equation 1 is used to calculate the water flux rate in the feed solution ($J_v$) as a function of the hydraulic permeability ($L_p$), transmembrane pressure ($\Delta P$), coefficient of reflection ($\sigma$), and the osmotic pressure ($\Delta \pi$). Equation 2 is used to calculate the solute (salt) flux ($J_s$) as a function of the salt permeability ($P_s$), salt concentration at the membrane surface ($C_m$), and permeate salt concentration ($C_p$), as well as several other parameters. The hydraulic permeability is membrane specific and can be calculated from experimental data by measuring the pure water (0 TDS water) flux across the membrane. This simplifies Equation 1 into Equation 3 and allows the hydraulic permeability to be calculated (Boussouga et al., 2017).

$$(J_v)_{H_2O} = L_p(\Delta P) \tag{3}$$

The salt concentration at the membrane wall varies from the bulk concentration due to polarization of the fluid as it approaches the membrane wall. This polarization is often characterized using the film model shown in Equation 4 (Sutzkover et al., 2000).

$$J_s = C_p \cdot J_v = C \cdot J_v - \frac{dC}{dy} \tag{4}$$

This equation can be used in the RO model development, but must first be converted to a more useful form as shown in Equation 5 (Sutzkover et al., 2000).

$$\frac{C_m - C_p}{C_b - C_p} = \exp\left(\frac{J_v}{k}\right) \tag{5}$$

Equation 5 introduces the mass transfer coefficient (k) which is defined as the ratio of the solute diffusion coefficient (D) to the boundary layer thickness ($\sigma$). This equation can also be expressed in a more useful form for modeling purposes, Equation 6, by introducing the real rejection fraction (R) and the observed rejection fraction ($R_o$), as defined in Equations 7 and 8, respectively (Sutzkover et al., 2000).

$$\frac{1-R_o}{R_o} = \frac{1-R}{R}\exp\left(\frac{J_v}{k}\right) \tag{6}$$

$$R = \frac{C_m C_p}{C_b} \tag{7}$$

$$R_o = \frac{C_b - C_p}{C_b} \tag{8}$$

Of these rejection fractions, the observed rejection fraction is significantly easier to derive from experimental data as it does not require the salt concentration at the membrane wall to be known. This fact does not prevent the real rejection from being used, as literature has suggested the real rejection fraction can also be defined using Equation 9 (Boussouga et al., 2017).

$$R = \frac{\sigma\left(1 - \exp\left(\frac{-(1-\sigma)}{P_S}J_v\right)\right)}{1 - \sigma\exp\left(\frac{-(1-\sigma)}{P_S}J_v\right)} \tag{9}$$

Equation 9 introduces another parameter into model, the salt permeability ($P_s$). By utilizing this alternative form of the real rejection fraction, Equation 10 is ultimately derived (Boussouga et al., 2017).

$$R_{obs} = \frac{1}{\frac{(1-\sigma)\exp\left(\frac{J_v}{k}\right)}{\sigma\left(1-\exp\left(\frac{-(1-\sigma)}{P_S}J_v\right)\right)}+1} \quad (10)$$

Although Equation 10 contains 3 unknown parameters ($\sigma$, k, $P_s$), experimental data can be used along with nonlinear parameter estimation to derive values for these parameters (Boussouga et al., 2017). To improve the accuracy of this model, the mass transfer coefficient (k) should be replaced with a function to account for possible changes in the physical properties of the fluid (e.g., temperature, viscosity) or process parameters (e.g., velocity). Numerous correlations exist for the mass transfer coefficient and generally follow the form shown in Equation 11 (Gekas and Hallström, 1987).

$$Sh = \frac{kd_h}{D} = (\text{constant})Re^a Sc^b \quad (11)$$

Regardless of the specific correlation being used, the Reynolds number (Re), Schmidt number (Sc), and Sherwood number (Sh) are required. Due to the possibility of non-tubular geometry, the hydraulic diameter ($d_h$) can be substituted into the correlation. Literature is available to estimate the hydraulic diameter of specific membrane structures such as spiral wound designs (Schock and Miguel, 1987). Therefore, experimental data can be used to derive the missing model parameters. Then, the membrane model for RO can be validated against a set of experimental data. If the model does not sufficiently reflect the behavior of the unit, different correlations for the mass transfer coefficient will be explored.

Summary II:

This invention provides a cooling tower blowdown (BD) water treatment process utilizing produced water (PW) and low grade heat to maximize water reuse and saleable by-product generation while reducing chemical and energy footprints of the treatment. The proposed treatment process consists of softening, organics and suspended solids removal, reverse osmosis (RO), brine electrolysis, and thermal desalination. These treatment units are integrated to sequentially treat the PW and BD water from their raw water conditions to those of a product stream suitable for reuse and 10-lb brine as a saleable product. Specifically, we continued the activated carbon filtration work which achieved >90% TOC removal (Task 3). The AC treatment achieved TOC removal that conditions the effluent to meet the inflow requirements for the downstream RO treatment. This task has been completed. We used a new one-stage RO setup for concentrating TDS in the effluent from the AC filtration and for producing product stream for reuse (Task 4). The RO treatment achieved 75% water recovery with 98% salt rejection. The team continued brine electrolysis (Task 6) and tested four cation exchange membranes form Chemours (N2100WX, N982WX, N2050WX & N966WX) with a dimensionally stabilized anode (DSA) and a gas diffusion cathode (GDC). The metrics used to evaluate the cell and the membranes include ohmic and polarization resistances of the membrane, faradaic current efficiencies for generating hydroxide and hypochlorite, and specific energies (kWh/mole) for production of hydroxide and hypochlorite. Three of the membranes yielded approximately equivalent metrics, while the metrics of the fourth membrane (N966WX) were significantly poorer. The water softening part of the project flowsheet was modeled in Aspen Plus using the OLI Engine add-on (Task 8). The developed model considers different blowdown to produced water mixing ratios and appropriately simulates the precipitation of multivalent salts from the addition of NaOH and $Na_2CO_3$. The results from this model were used in Dow DuPont's Water Application Value Engine (WAVE) software to initially model the RO part of the flowsheet employing simulated data.

Task 2.0—Produced Water-Aided Blowdown Water Treatment with Caustic Soda from Brine Electrolysis This invention provides a produced water-aided blowdown water treatment with softening. A range of volumetric mixing ratios of the PW and BD water samples will be subjected to Jar tests to measure pH changes and the removal efficiency of scale-forming constituents. The NaOH solution used to raise to the pH of the PW-BD water mixtures to different end points for further removal of scale-forming constituents. The softening treatment will also be conducted with soda ash ($Na_2CO_3$) addition for comparison. The softened effluent will be analyzed, and the softening efficiency will be quantified as a function of pH end points of the mixture. The softening treatment will be conducted in both batch and continuous modes. Settling characteristics of the chemical precipitates will be examined for designing a continuous softening unit.

Results and Discussion;

For the first treatment train (see FIG. 7A: the PW/BD samples were mixed at BD:PW volumetric ratios of 5:1 and 10:1 and FIG. 7B: for the second treatment train, BD water was treated with alkaline chemicals in a softening unit. By introducing PW to BD, without any chemical addition, high sulfate content of BD formed precipitates with Ba and resulted in 100% Ba removal at ratio BD:PW=10:1. This volumetric ratio was selected for further downstream activated carbon filtration and RO membrane desalination. The softening treatment to further remove scale-forming ions (e.g., Ca and Mg) was conducted by increasing pH of the solution to pH~12 using NaOH (5M) or NaOH from brine electrolysis (~0.1M at volumetric ratio of NaOH:sample=1:1) and adding sodium carbonate (sodium carbonate: sample total hardness molar ratio=1:1). The results showed >90% removal of metals was achieved by the softening of PW-BD mixture (treatment train A) and BD alone (treatment train B) (Table 5).

TABLE 5

Characteristic of raw produced water, raw blowdown water, PW-BD mixture (BD:PW = 10:1) and BD alone after softening and activated carbon.

| | Raw water | | | After softening | | After activated carbon | |
|---|---|---|---|---|---|---|---|
| Parameter | Produced water (PW) | Blow down water (BD) | After mixture BD:PW = 10:1 | Scenario A BD:PW = 10:1 | Scenario B BD alone | Scenario A BD:PW = 10:1* | Scenario B BD alone* |
| TDS (g/L) | 230 | 2 | | 20 | 2 | | |
| TSS (g/L) | 0.3 | 0.02 | | 0.0 | 0.0 | 0.0 | 0.0 |
| TOC (mg/L) | 13 | 23 | | 15 | 20 | 1.3 | 0.0 |
| pH | 5.7 | 8 | | ~12 | ~12 | 7.0 | 8.0 |
| Alkalinity | 17 | 89 | | — | — | | |
| Acidity | 224 | 5.0 | | 0.0 | 0.0 | | |
| Sulfate (mg/L) | 4 | 900 | | 136 | 1450 | 410 | 650 |
| Ammonium (mg/L) | 145 | 0.0 | | 7.6 | | | |
| Silica ($SiO_2$) (mg/L) | 18 | 30 | | 12 | 8.5 | 9.6 | 6.4 |
| Chloride (mg/L) | 113,000 | 160 | | 10,400 | 175 | 8600 | 518 |
| Metals (mg/L) Sodium (Na) | NA | 215 | | NA | NA | NA | NA |
| Calcium (Ca) | 13,800 | 170 | 1950 | <0.001 | 3.0 | <0.001 | 0.72 |
| Magnesium (Mg) | 1600 | 53.5 | 200 | <0.001 | 0.2 | <0.001 | 0.18 |
| Barium (Ba) | 9226 | 1 | 0.73 | 0.8 | 0.02 | <0.05 | <0.05 |
| Strontium (Sr) | 4093 | 2 | 286 | 3 | 0.3 | <0.05 | <0.05 |
| Boron (B) | 18 | 1 | | 2 | 0.98 | 0.12 | 0.13 |
| Silicon (Si) | 8 | 14 | | 5.5 | 4.0 | 4.5 | 3.0 |
| Sulfur (S) | 5 | 377 | | 90 | 380 | 126 | 212 |
| Copper (Cu) | <0.007 | <0.007 | | <0.007 | <0.007 | <0.007 | <0.007 |
| Aluminum (Al) | <0.007 | <0.007 | | <0.007 | <0.007 | <0.007 | <0.007 |
| Manganese (Mn) | <0.007 | <0.007 | | <0.007 | <0.007 | <0.007 | <0.007 |
| Iron (Fe) | 80 | <0.01 | | <0.001 | <0.001 | <0.001 | <0.001 |

Task 3.0—Removal of Organics and Suspended Solids Using Filtration

An activated carbon (AC) filtration unit was used in this task to remove residual organics and SS from the softening treated effluent. Total organic carbon (TOC), SS, TDS, and scale-forming constituents were measured to quantify the treatment efficiency. These measurements were used to determine if the filtered effluent meet the criteria for RO treatment (e.g., silt density index, pH).

Results and Discussion

TOC removal was negligible in the softening treatment. An AC filter (ARIES filterworks, VP series cartridges, D=3.38"×L=17.0", Volume=134.2 cu.in) was used for organics removal from the effluent from the softening unit. The softened effluent was pumped into the AC filter under 5 psig. The water was treated in multiple cycles until TOC was reduced to <3 ppm to meet the downstream RO feed water criteria. The results showed >90% TOC removal after 7 cycles for treatment train A, and 5 cycles of filtration for treatment train B. Results of softening were supported by SEM-EDS analysis. SEM micrographs showed more particles attached to the surface of probably carbon particles after softening. According to EDS analysis, an increased abundance of Mg after softening is highly significant.

Task 4.0: Product Water and Brine Generation Using Reverse Osmosis

We used a one-stage RO system to further concentrate the TDS from 20 g/L and generate a permeate stream for reuse. Commercially available RO units (e.g., Dow FILMTEC™ BW30LE-4040) were used in this task.

Results and Discussion

Figure 10:
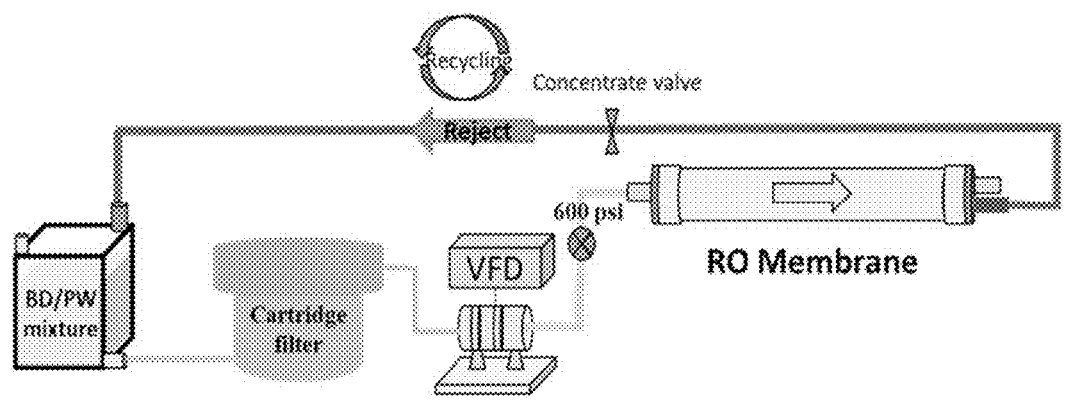
FIG. 10 shows a schematic diagram of the one-stage RO (reverse osmosis) treatment system.

A new setup of reverse osmosis desalination system was used (FIG. 10) and preliminary experiments using 20 g/L NaCl solution which mimicked the BD/PW mixture at a volumetric ratio of 10:1 was conducted. The RO treatment achieved a high water recovery (75%) with a salt rejection of 98%. FIG. 10 shows a schematic diagram of the one-stage RO treatment system.

Task 5.0: Waste Heat-Aided Thermal Desalination to Generate 10-Lb Brine

A bench-scale two-stage MED unit is provided to evaporate the liquid water in the RO reject to generate 10-lb brine. Specifically, key customized components (e.g., MED system housing, heat exchangers, condensers, connectors and valves) are designed at this task. Low-pressure steam is generated by a commercial electrical steam generator. The two-stage system is to be equipped with waste energy recovery mechanisms to improve the energy efficiency of the treatment. Specifically, the steam produced in the $1^{st}$ stage is used to evaporate water in the $2^{nd}$ stage at a lower temperature. This recovers the majority of the thermal energy consumed in the $1^{st}$ stage. The vapor formed in the $2^{nd}$ stage is recovered to heat the RO reject before entering the $1^{st}$ stage.

Task 6.0—Brine Electrolysis for Caustic Soda and Chlorine Production

This invention provides treatment methods for blowdown water (water used in cooling towers of power plants) to optimize reuse of the water. This water becomes more concentrated with salts, both soluble and scaling, during recirculation. Among the treatment protocols are addition of sodium carbonate and sodium hydroxide to precipitate the scaling cations (calcium, magnesium and iron) and addition of hypochlorite solutions as a biocide to inhibit bacterial and algae growth. To reduce the need for shipping and storing hazardous chemicals, on-site brine electrolysis is proposed as a means of generating sodium hydroxide and sodium hypochlorite on an as-needed basis. This objective differs from the customary objective of brine electrolysis, the commercial production of chlorine and sodium hydroxide. Since the solutions generated become part of the desalination stream, the brine concentrations used in this study (29 g/L & 58 g/L, 0.5 M & 1.0 M) are lower than the typical values used in commercial brine electrolysis (200-300 g/L).

A typical brine electrolysis cell is composed of a dimensionally stabilized anode (DSA), a metal plate cathode, and a cation exchange membrane (CEM). We are using a gas diffusion electrode (GDE) as the cathode. This electrode replaces the cathode reaction from reduction of water with the evolution of hydrogen gas to the reduction of oxygen from the air, with no gaseous by-products. It also lowers the cell voltage because of the less negative standard potential for oxygen reduction vs water reduction. In unbuffered anolytes, the oxidation of chloride is accompanied by the concomitant oxidation of water to oxygen; the latter half-reaction generates protons (W) and lowers the pH. The low pH drives the equilibrium between chlorine ($Cl_2$) and hypochlorite ($OCl^-$) towards the volatile chlorine. The protons can move across the cation exchange membrane to neutralize the hydroxide ($OH^-$) generated in the catholyte, lowering faradaic efficiency for NaOH. Rather than trapping chlorine gas in an external solution of sodium hydroxide, sodium bicarbonate (0.2 M, 17 g/L) is added to the anolyte. The bicarbonate keeps the pH of the anolyte above 6, pushing the $Cl_2/OCl^-$ equilibrium towards the non-volatile $OCl^-$ and keeping the $H^+$ concentration low in the anolyte. Currently, all experiments are conducted at room temperature (22-23° C.). Future work will include experiments at elevated temperatures.

We have evaluated all four Nafion CEMs from Chemours: N2100WX, N2050WX, N982WX and N966WX.

Experimental Details

The electrolysis cell consists of the DSA and GDE, two end plates with ports and holes for bolts, gaskets between the electrodes and the end plates, gaskets defining the diagonal solution flow across the electrodes, and pairs of Teflon and silicone gaskets for holding and sealing the CEM. The effective membrane area is 24.2 $cm^2$. The approximate distance between each electrode and the CEM is 0.25 cm (~6 mL volume on each side). The cell is connected to an anolyte and a catholyte reservoir via silicone tubing and a peristaltic pump. The reservoirs are stirred using magnetic stir bars. The pumping speed is approximately 1 mL/s. The cell is flushed with the anolyte and catholyte and a galvanodynamic scan is performed from 0 to 1.93 (80 mA/$cm^2$) to 0 A at 20 mA/s. The solutions are replaced with 250 mL each of the respective anolyte and catholyte and a galvanostatic experiment (constant current for a fixed time) is performed. In all the experiments in this report, the current was 80 mA/$cm^2$ (800 A/$m^2$). The charge passed through the cell (current×time) is determined by the goal of producing a catholyte with ~0.1 M hydroxide concentration. After the galvanostatic experiment, samples of anolyte and catholyte are collected for analysis. Before and after the galvanodynamic scan and galvanostatic experiments, the electrochemical impedance of the cell is measured between 100 kHz and 100 Hz. See FIG. 4 for an example of typical impedance data. The smallest in-phase impedance (which occurs between 100 kHz and 10 kHz) is used as the ohmic resistance of the cell. The electrochemical system consists of a Solartron potentiostat and frequency response analyzer.

Figure 11:
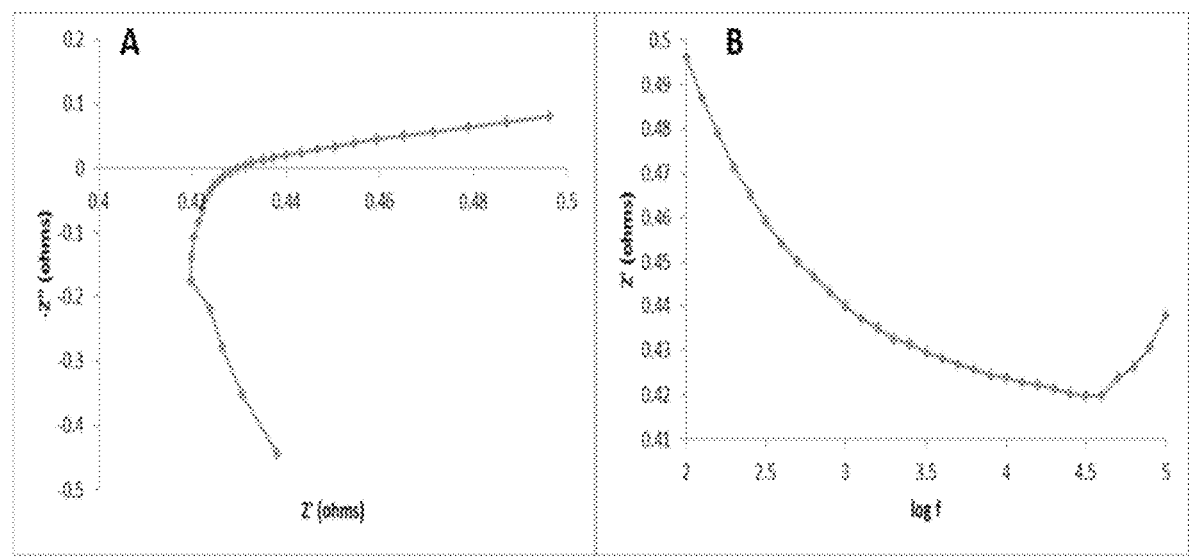
FIG. 11A shows a Nyquist plot for a cell with a N982WX membrane.
FIG. 11B shows a Bode plot for the cell with a N982WX membrane.

FIG. 11A shows a Nyquist plot and FIG. 11 B shows a Bode plot for the cell with the N982WX membrane, 0.5 M NaCl catholyte and 0.5 M NaCl+0.2 M $NaHCO_3$ anolyte. The minimum Z' value of 0.420 ohms (10.2 ohm $cm^2$) occurs at log f=4.6 (40 kHz). Hypochlorite concentration in the anolyte is determined by adding potassium iodide and excess hydrochloric acid and titrating the generated tri-iodide with a calibrated thiosulfate solution and a starch indicator. Hydroxide concentration in the catholyte is determined by titration with a hydrochloric acid standard using phenolphthalein indicator. Any bicarbonate leakage from the anolyte to the catholyte is determined by continuing the catholyte titration to the methyl orange indicator endpoint.

Analyses:

The metrics used to evaluate the cell and the membranes include ohmic and polarization resistances of the membrane, faradaic efficiencies for generating hydroxide and hypochlorite, and specific energies for production of hydroxide and hypochlorite. From the titration data, the moles of hydroxide and hypochlorite are calculated and compared to the moles of electrons passed through the cell; for 1200 s at 1.936 A, Q=2323.7 coul=0.024083 mol $e^-$ yielding theoretical concentrations of 0.0963 M NaOH (3.9 g/L) in the catholyte and 0.0482 M NaOCl (3.6 g/L) in the anolyte. Faradaic efficiencies are defined as the yield of product expressed as a percentage of the theoretical amount.

The work energy is the integral of the product of voltage and current over the period of the galvanostatic experiment. Specific energies are calculated as kilowatt hours (kWh) per mole of product. Specific energies combine both of the factors (faradaic efficiency and work energy) and can be used to estimate costs of production from the cost of electricity ($/kWh).

While ohmic resistances are readily obtained from the impedance measurements, polarization resistances of the membrane are a bit trickier. Static resistances of the membranes are obtained using the measured ohmic resistances of the cell with and without a membrane at zero DC current. Dynamic polarization resistances are estimated from the voltage in the galvanostatic experiments after correction for voltage of the electrodes and the iR drop of the solutions.

Results and Discussion

Detailed results are shown for the N2050WX membrane. Then summaries of data and comparisons of membranes are discussed. Finally, additional analyses of membrane resistances and voltages are provided. Galvanodynamic scans for the two solution compositions are shown in FIGS. 12A and 12B. The voltage rises sharply at first and then almost linearly up to the maximum current. On the return scan, the voltage tracks the rising scan values closely. This behavior indicates that depletion layers are not forming at the electrodes or the surfaces of the CEM. To assist analyses, the voltage vs current above 500 mA is fit to a quadratic equation (plotted as the orange line). The slight downward curvature (negative quadratic coefficient) is expected for changes in the electrode voltages with respect to current.

Figure 12:
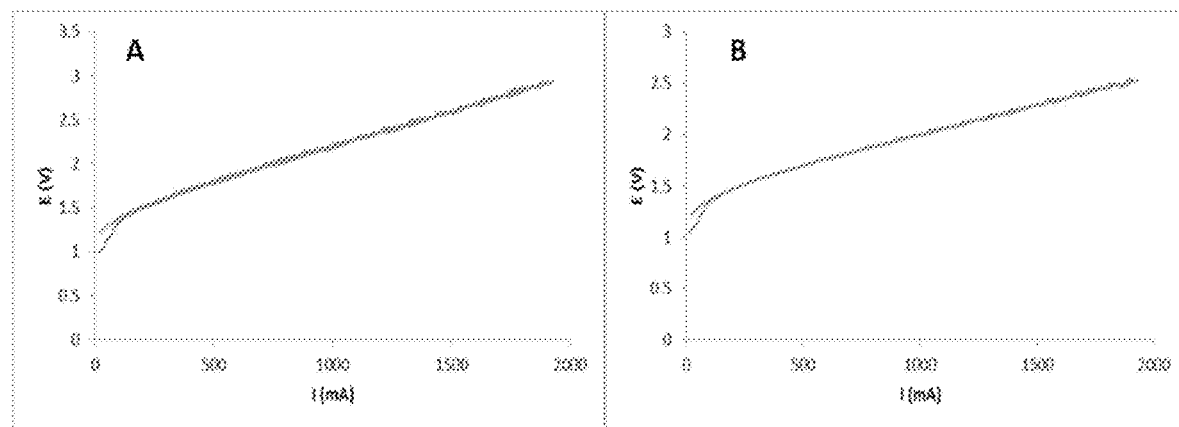
FIG. 12A shows galvanodynamic scan for the cell with the N2050WX membrane, 0.5 M NaCl catholyte, 0.5 M NaCl+0.2 M $NaHCO_3$ anolyte.
FIG. 12B shows galvanodynamic scan for the cell with the N2050WX membrane 1.0 M NaCl catholyte, 1.0 M NaCl+0.2 M $NaHCO_3$ anolyte.

FIG. 12 A shows galvanodynamic scan for the cell with the N2050WX membrane, 0.5 M NaCl catholyte, 0.5 M NaCl+0.2 M $NaHCO_3$ anolyte; and FIG. 12 B shows galvanodynamic scan for the cell with the N2050WX membrane, 1.0 M NaCl catholyte, 1.0 M NaCl+0.2 M $NaHCO_3$ anolyte. Scan from 0 to 1930 to 0 mA at 20 mA/s. The lines show data, and quadratic fits of voltage to current above 500 mA. Quadratic equations are (A) $E(V)=(-0.00328)I^2+(0.8046)I+(1.398)$ and (B) $E(V)=(-0.01442)I^2+(0.6137)I+(1.400)$.

Figure 13:
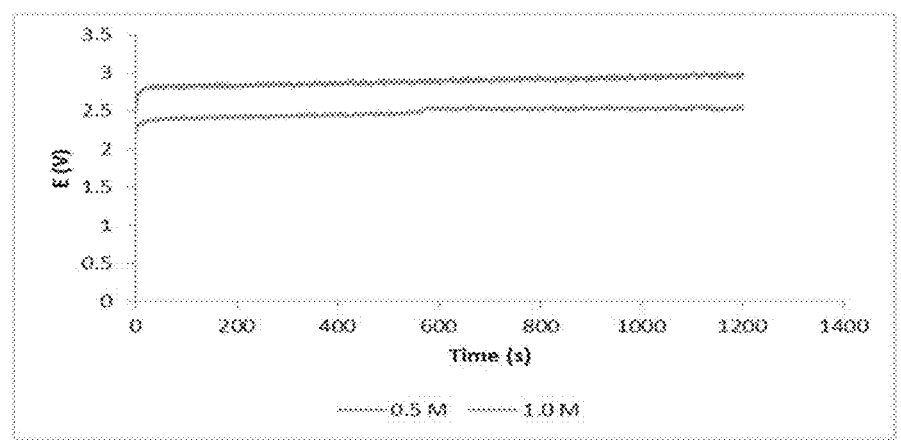
FIG. 13 shows the galvanostatic plots of voltage vs time for the N2050WX membrane in two sets of solutions using a current of 1.936 A (80 $mA/cm^2$).
Figure 14:
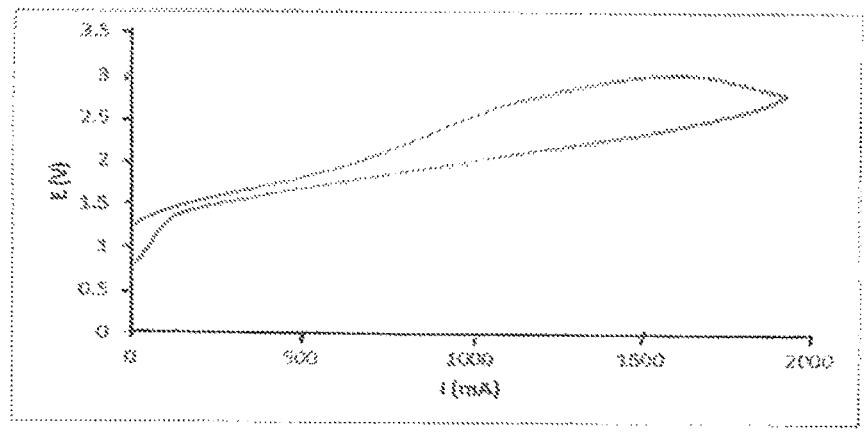
FIG. 14 shows galvanodynamic scan for membrane N966WX in 1 M NaCl.

Galvanostatic data for the N2050WX membrane in the two solution compositions are shown in FIG. 13 (0.5 M top line, 1.0 M bottom line). After an initial rise, the voltages remain nearly constant at ~3.0 V in 0.5 M NaCl and ~2.5 V in 1.0 M NaCl for the N2050WX membrane. Ohmic iR drop and electrode voltages account for most of the observed voltage (see below). Faradaic efficiencies in 0.5 M NaCl are 88% for NaOH and 70% for NaOCl; corresponding faradaic efficiencies in 1.0 M NaCl are 96% and 77%. The low values for hypochlorite faradaic efficiency can be explained by a fraction of the current going into water oxidation and by evaporation of chlorine. Anolyte solutions aged overnight in sealed bottles contain substantially lower concentrations of hypochlorite. FIG. 13 shows the galvanostatic plots of voltage vs time for the N2050WX membrane in two sets of solutions using a current of 1.936 A (80 mA/cm$^2$). Catholyte solution compositions are shown in the legend; the anolyte solutions also contain 0.2 M NaHCO$_3$. Specific energies in the 0.5 M NaCl solutions are 0.0883 kWh/mol of NaOH and 0.221 kWh/mol of NaOCl. Not surprisingly, they decrease in 1.0 M NaCl solutions due in part to the lower ohmic resistance: 0.0696 kWh/mol of NaOH and 0.173 kWh/mol of NaOCl. Galvanostatic experiments for the four membranes, namely N2100WX, N982WX, N2050WX, and N966WX, in two solutions, namely 0.5 M NaCl and 1.0 M NaCl were carried out. In all cases, the voltage is nearly constant after an initial rise. Three of the membranes, namely N2100WX, N982WX, and N2050WX, exhibit roughly equivalent voltages vs time. The N966WX membrane exhibits a two-stage voltage rise which may indicate the development of a depletion layer. This conclusion is based on the appearance of the galvanodynamic scan for membrane N966WX (FIG. 14). After an initial voltage rise, the voltage increases nearly linearly with current up to 1500 mA, and then shows an upward curvature. The voltage on the return scan is higher. This hysteresis in the voltage is not observed for the other three membranes and not in the membrane-free cells. Therefore it is not assigned to depletion layers forming at the anode or cathode or in the solutions next to the membrane. It is consistent with a depletion layer forming inside the membrane and then dissipating as the current decreases. Consequently, a lower current density would be better for the N966WX membrane. FIG. 8 shows galvanodynamic scan for membrane N966WX in 1 M NaCl. Scan from 0 to 1930 to 0 mA at 20 mA/s. Table 6 shows the results obtained for the four Chemours membranes.

TABLE 6

Chemours membranes results.

| Solution | Membrane | Ohmic Resistance (ohm cm$^2$) | Faradaic Efficiencies NaOH | Faradaic Efficiencies NaOCl | Specific Energies (kWh/mol) NaOH | Specific Energies (kWh/mol) NaOCl |
|---|---|---|---|---|---|---|
| 0.5 M NaCl | N2100WX | 11.1 | 93% | 70% | 0.0892 | 0.236 |
|  | N982WX | 10.2 | 83% | 70% | 0.0956 | 0.227 |
|  | N2050WX | 10.1 | 88% | 70% | 0.0883 | 0.221 |
|  | N966WX | 12.2 | 72% | 67% | 0.140 | 0.303 |
| 1.0 M NaCl | N2100WX | 7.7 | 97% | 77% | 0.0721 | 0.181 |
|  | N982WX | 7.0 | 87% | 77% | 0.0783 | 0.177 |
|  | N2050WX | 6.7 | 96% | 77% | 0.0696 | 0.173 |
|  | N966WX | 8.2 | 73% | 74% | 0.125 | 0.248 |

Ohmic resistances of the cell with each membrane are approximately the same with the exception of slightly higher values for the N966WX membrane (Table 6).

TABLE 7

Average cell ohmic resistance, membrane resistance and membrane voltage at 80 mA/cm$^2$.

| Solution | Membrane | Average cell Ohmic resistance (ohm cm$^2$) | R$_{mem}$ | V$_{mem}$ |
|---|---|---|---|---|
| 0.5M NaCl | N2100WX | 10.20 | 0.61 | 0.05 |
|  | N982WX | 11.11 | 1.52 | 0.12 |
|  | N2050WX | 10.18 | 0.59 | 0.05 |
|  | N966WX | 12.18 | 2.59 | 0.21 |
| 1.0M NaCl | N2100WX | 6.69 | 1.215 | 0.10 |
|  | N982WX | 7.71 | 2.23 | 0.18 |
|  | N2050WX | 7.01 | 1.53 | 0.12 |
|  | N966WX | 8.17 | 2.695 | 0.22 |

Faradaic efficiencies are roughly the same for both NaOH and NaOCl production for three of the membranes; N966WX again appears to be an outlier. The faradaic efficiencies for both NaOH and NaOCl production are significantly higher in the 1.0 M NaCl solution. Specific energies are similar for the N2100WX, N982WX and N2050WX membranes and are significantly higher for the N966WX membrane. Neglecting capital costs and other energy costs such as pumping, and using an estimated price of $0.15/kWh for distributed electricity (McGovern et al., Applied Energy 2016, 136, 649), specific energies can be converted to costs in $/kg (Table 7). The cost of sodium hydroxide is $0.26/kg to $0.53/kg. Bulk NaOH costs at least $1.50/kg and that does not include shipping and storage. It is harder to find a price for NaOCl powder; most suppliers offer solutions of NaOCl. One supplier quotes a price of $123 for 50 lbs (equivalent to $5/kg), well above the $0.35/kg-$0.61/kg in Table 8. The cell used in this study is a simple prototype, and the specific energies and costs per kilogram of future designs are likely to be lower.

TABLE 8

Estimated cost of production in $/kg for NaOH and NaOCl.

| Solution | Membrane | Estimated cost ($/kg) NaOH | Estimated cost ($/kg) NaOCl |
|---|---|---|---|
| 0.5M NaCl | N2100WX | $0.33 | $0.48 |
|  | N982WX | $0.36 | $0.46 |
|  | N2050WX | $0.33 | $0.44 |
|  | N966WX | $0.53 | $0.61 |
| 1.0M NaCl | N2100WX | $0.27 | $0.36 |
|  | N982WX | $0.29 | $0.36 |
|  | N2050WX | $0.26 | $0.35 |
|  | N966WX | $0.47 | $0.50 |

Three factors contribute to the voltage of the electrolysis cell: the ohmic resistance of the solutions, the potentials developed at the cathode and anode during current flow, and the membrane resistance. Measurements were made in the cell assembled without a membrane using all four solutions (0.5 NaCl with and without 0.2 M NaHCO$_3$, 1.0 M NaCl with and without 0.2 M NaHCO$_3$). From the ohmic resistance measurements using impedance spectroscopy and the measured conductivities of the stock solutions, the distance between the anode and cathode is calculated: 0.51+/−0.01 cm. Assuming that the membrane divides this distance equally, the solution resistances are calculated for the cell with the membrane present and 0.2 M NaHCO$_3$ present in the anolyte. From these values, the ohmic resistance at zero current for each membrane is determined (Table 2). Membrane resistances in 0.5 M NaCl solutions are lower (0.6 ohm cm$^2$) for N2050WX and N982WX, higher for N2100WX (1.5 ohm cm$^2$) and even higher for N966WX (2.6 ohm cm$^2$). The same pattern is obtained in 1.0 M NaCl solutions. However, the membrane resistances are consistently higher in 1.0 M NaCl than in 0.5 M NaCl. Currently, we do not have an explanation for this observation. From membrane resistances, estimates of the voltage across the membrane at a current density of 80 mA/cm2 are shown in the last column. These results suggest that the voltage across the membrane is small, ranging from 0.05 to 0.22 V. However, the actual values may not be accurate because the ohmic resistance of the membrane-free cell increases after current flow for unknown reasons. The main message of this study is that the voltages and hence the specific energies for the brine electrolysis cells are dominated by the voltages of the electrodes and the iR drop of the solutions for three of the four membranes.

Temperature control in the system is believed to be as follow. A higher temperature should lower specific energies, but the overall energy costs may increase because of the addition of the temperature control system. Some preliminary experiments at a lower current density (40 mA/cm$^2$) have demonstrated lower specific energies as expected (lower iR drop), but also lower faradaic efficiencies, so this variable is less promising in our design plans.

Task 7.0: Integration of Treatment Units

The treatment units developed in Tasks 2-6 will be integrated into a single, packaged prototype module in order to demonstrate overall treatment feasibility. The integrated module will be used to process a combined flow of PW and BD waters to produce an RO permeate flow in the range of 0.1-1 gpm. Given the different kinetics and capacities of the individual treatment units, an intermediate container will be used to hold the treated water as a flow equalizer between two units that have significantly different treatment capacities. The operating conditions of the treatment units developed in the previous tasks will be further optimized in this task. Energy and chemical footprints and manufacturing/capital costs of the integrated process will be documented and used in the techno-economic analysis (Task 8.0).

Task 8.0—Process Modeling and Simulations

Commercial software such as OLI Flowsheet (OLI Systems, Inc.) or Aspen Plus (Aspen Tech, Inc.) will be used to simulate the proposed process model. Specifically, condenser and cooling tower models will be simulated to estimate the water loss by evaporation and drift during different operating scenarios. These models will also be employed to calculate the blowdown and makeup water flowrates in order to maintain the appropriate concentration. Different scenarios will be considered for acquiring produced water. For example, one scenario would be to pay for transportation costs to truck the water from the well and have the produced water available at no cost. Another possible scenario would be to pay for water transportation, but also receive compensation for taking the water. For the proposed modular treatment process, the unit model will be developed using mass and energy balances based on available experimental data or first-principles models from the commercial software. Also, an economic model will be coupled with the process model to estimate the capital and operating costs based on economic assumptions and the Aspen Process Economic Analyzer tool (Aspen Tech, Inc.). With the proposed process and economic models, a MILP (mixed-integer linear programming) optimization problem will be formulated to determine the optimal configuration/number of RO (reverse osmosis) units needed and the optimal concentration of the RO reject stream to minimize capital and operating costs. The TEA will also consider addition of a 4th, higher-pressure RO unit that can handle higher TDS to further concentrate the RO concentrate from the three-stage RO treatment (Task 4.0). Disposal options and costs for the generated sludge materials including NORM, if detected, will be proposed and included in the TEA. To solve this optimization problem, MILP tools will be explored, such as the solvers available in the Optimization toolbox in MATLAB (Mathworks, Inc.) and GAMS (GAMS Development Corporation), if needed for higher complexity. In addition, based on the developed model and optimization algorithm, a TEA will be conducted to estimate the manufacturing cost and operating performance of the proposed modular unit with the ultimate goal of obtaining the most cost-effective modular design. Previously developed approaches for process optimization and techno-economic analysis of power plant and energy systems developed in the Recipient's research group will be leveraged in this effort. At the conclusion of this task, a summary report will be provided to the Project Manager as an appendix to the next quarterly research report.

Results and Discussion

The OLI Engine in Aspen Plus add on was purchased to model the water chemistry of the softening process of the water treatment plant. This included modeling the mixing of blowdown and produced water sources, $Mg^{2+}$ removal using sodium hydroxide (NaOH), and other 2+ ions' removal using sodium carbonate ($Na_2CO_3$). Additionally, modeling work began on the reverse osmosis (RO) unit using Dow DuPont's Water Application Value Engine (WAVE) software for generating simulated data.

Figure 15:
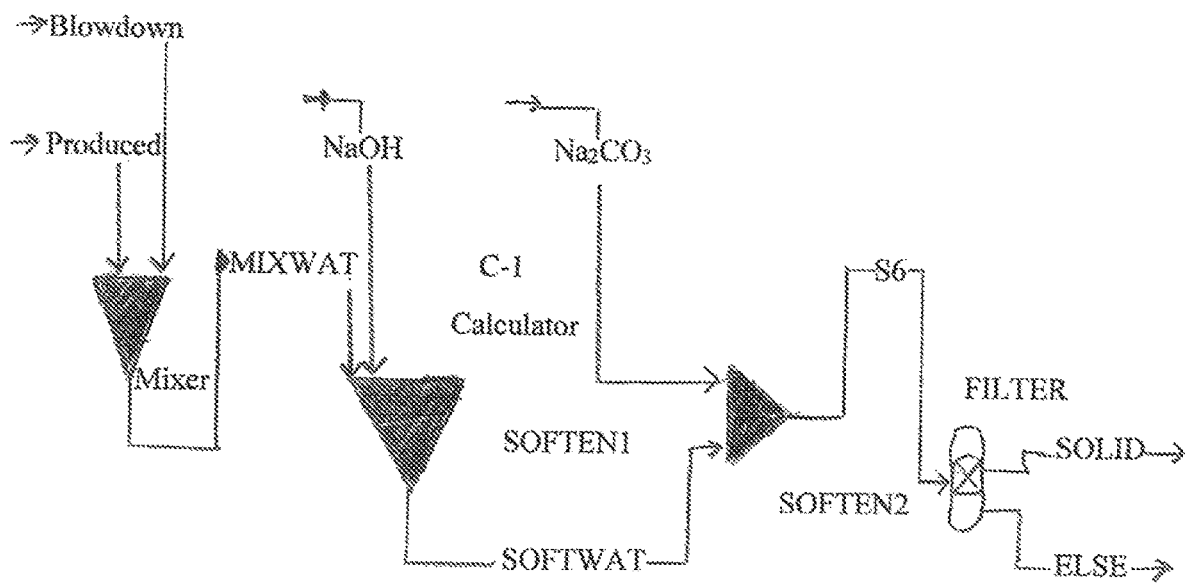
FIG. 15 shows the Aspen flowsheet for softening and filtering units.

For the water softening model development in Aspen Plus, experimental data for the blowdown water and produced water compositions were provided by Dr. Lin's lab. To remediate any charge balance issues present in the experimental data, WAVE is used to balance the cation and anion concentrations in these water sources to maintain a neutral charge balance. These water sources are blended together using a mixer in Aspen Plus and fed directly into the softening process as shown in FIG. 15. By using two independent feeds, a sensitivity study is carried out to vary the ratio of blowdown to produced water from 1:1 to 10:1. The goal of this study is to examine how the effectiveness of this process changes as a function of this mixing ratio. FIG. 15 shows the Aspen flowsheet for softening and filtering units. Throughout this softening process $Mg^{2+}$, $Ca^{2+}$, $Sr^{2+}$, and $Ba^{2+}$ ions are removed by adding NaOH and $Na_2CO_3$ species. In the first part of the softening unit, NaOH is added to the mixed water stream. NaOH specifically binds to the $Mg^{2+}$ and results in the precipitation of solid $Mg(OH)_2$ salt as shown in Equation 1.

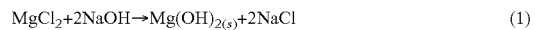

$$MgCl_2 + 2NaOH \rightarrow Mg(OH)_{2(s)} + 2NaCl \quad (1)$$

The NaOH flowrate is specified using a design spec to require the pH of the effluent stream (SOFTWAT stream in FIG. 15) to have a value of 12. By introducing this design spec, the NaOH flowrate can change as the sensitivity study is conducted to vary the blowdown to produced water ratio. This specific pH value was used in the simulation to reproduce the procedure carried out in the experimental part of the project. The resulting $Mg^{2+}$ deficient stream is further softened downstream by adding $Na_2CO_3$, forming solid $CaCO_3$, $SrCO_3$, and $BaCO_3$ salts as shown in Equations 2, 3, and 4.

$$CaCl_2 + Na_2CO_3 \rightarrow CaCO_{3(s)} + 2NaCl \quad (2)$$

$$SrCl_2 + Na_2CO_3 \rightarrow SrCO_{3(s)} + 2NaCl \quad (3)$$

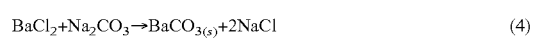

$$BaCl_2 + Na_2CO_3 \rightarrow BaCO_{3(s)} + 2NaCl \quad (4)$$

The amount of $Na_2CO_3$ used is specified employing a calculator block in Aspen Plus. The calculator block sums the molar flowrates of $Mg^{2+}$, $Ca^{2+}$, $Sr^{2+}$, and $Ba^{2+}$ ions in the entering stream and sets the $Na_2CO_3$ molar flowrate equal to the ion molar flowrate to maintain a 1:1 molar feeding ratio. This allows most 2+ ions to be precipitated out of the stream while preventing carbonate ions ($CO_3^{2-}$) from building up in the softened water. At the end of this process the solid salts are filtered out. This filtration is modeled in Aspen by using a basic component separator where the solids leave the process in the SOLID stream and the softened water leaves in the ELSE stream (see corresponding streams in FIG. 15). Currently this model assumes that no softened water is discharged in the SOLID stream. In most industrial processes, some portion of the softened water is discharged along with the solid salts. Research will need to be conducted to estimate what percent of the softened water will be lost in the softening process. Any softened water that is not lost during the filtering process will be sent directly into the downstream RO unit.

Figure 16:
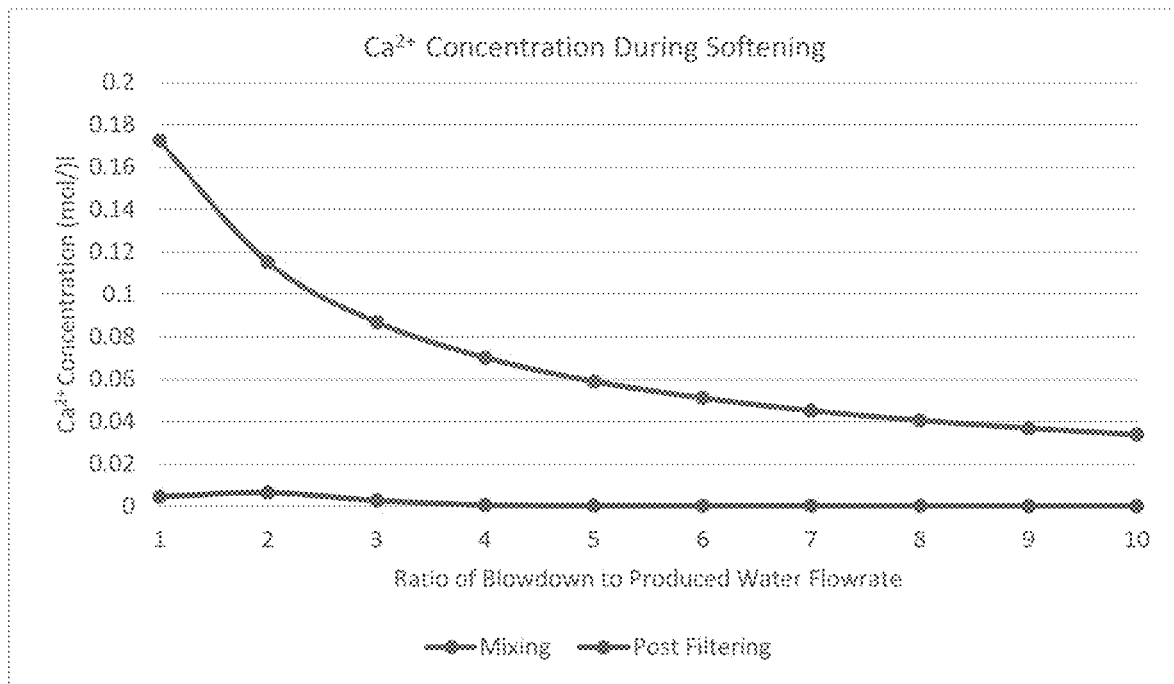
FIG. 16 shows the $Ca^{2+}$ concentration before and after softening for a variety of water mixing ratios.
Figure 17:
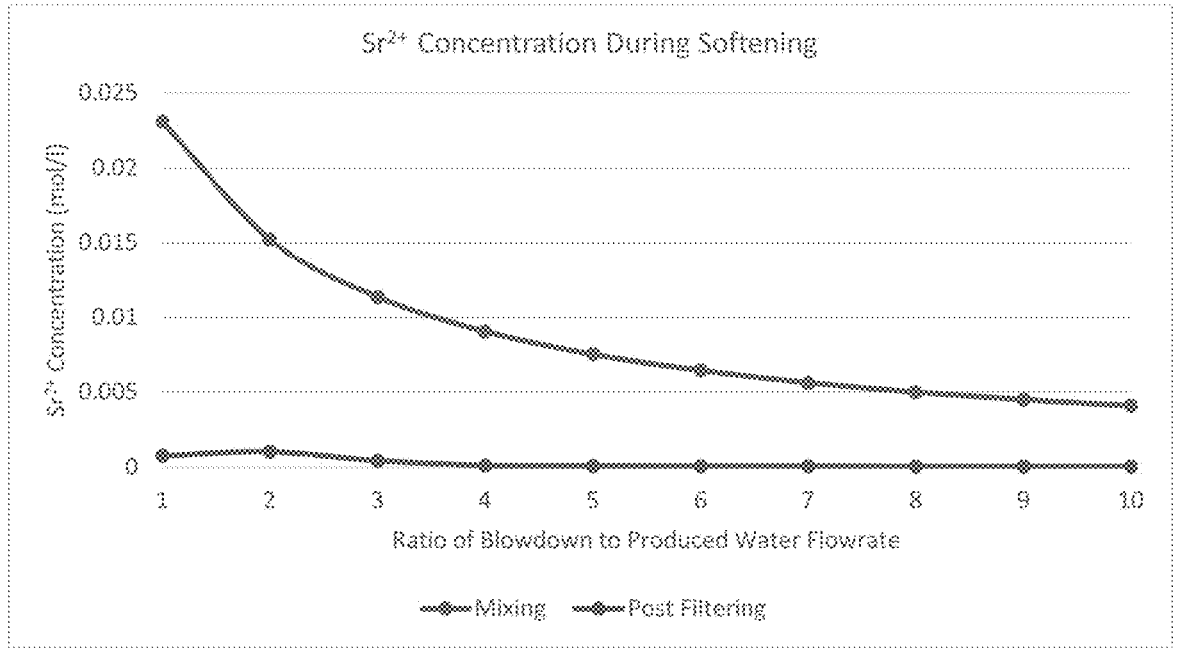
FIG. 17 shows $Sr^{2+}$ concentration as a function of blowdown to produced water ratio at different steps in the softening process.
Figure 18:
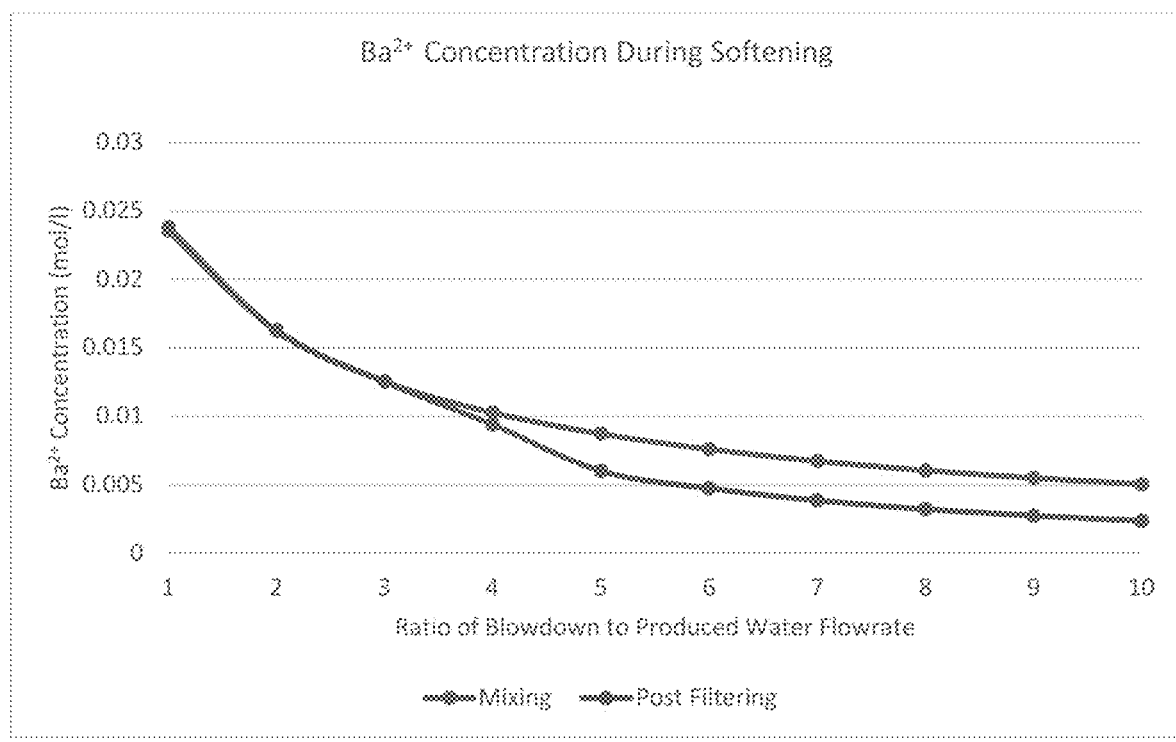
FIG. 18 shows $Ba^{2+}$ concentration as a function of blowdown to produced water ratio at different steps in the softening process.
Figure 19:
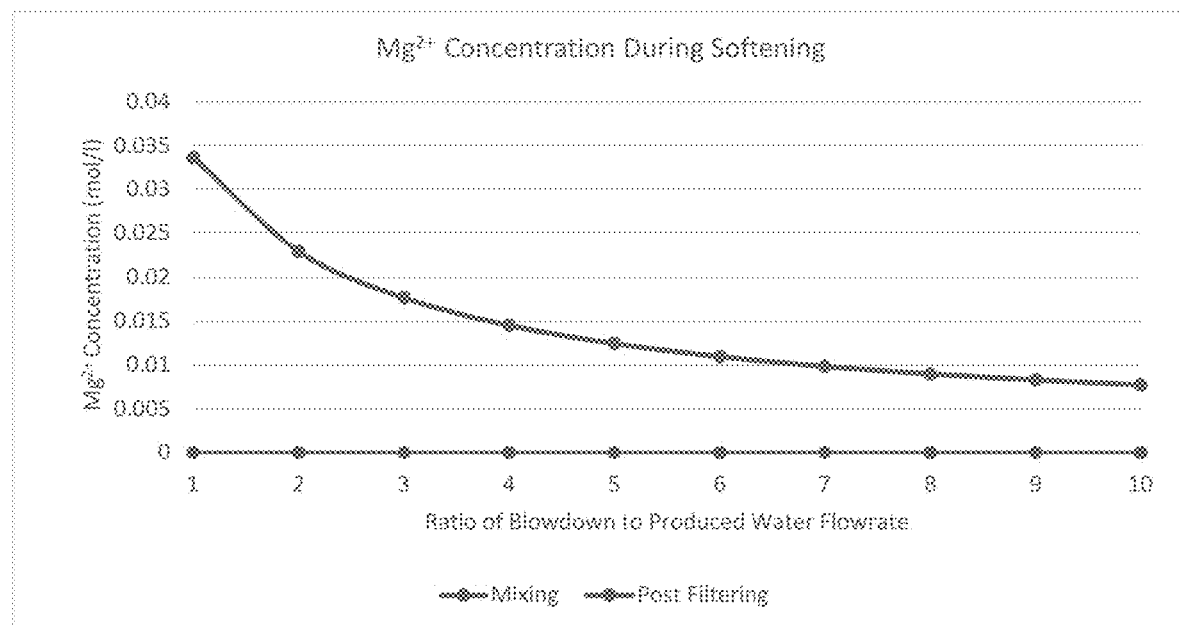
FIG. 19 shows $Mg^{2+}$ concentration as a function of blowdown to produced water ratio at different steps in the softening process.

When running the sensitivity study described above, ion concentrations are recorded at the blowdown and produced water mixing point and at the discharge of the filter in the ELSE stream. These ion concentrations are tracked to ensure the softening process can remove the 2+ ions. For all the sensitivity studies, the highest ion concentrations are found at the 1:1 blowdown to produced water ratio due to it having the highest TDS. The blowdown water has a TDS of approximately 2 g/L while the produced water stream exceeds 180 g/L. FIG. 16 shows the $Ca^{2+}$ concentration before and after softening for a variety of water mixing ratios. FIG. 16 shows $Ca^{2+}$ concentration as a function of blowdown to produced water ratio at different steps in the softening process (top line "Mixing", bottom line "Post Filtering"). When examining the sensitivity study results for $Ca^{2+}$ depicted in FIG. 16, it is clear that the softening process can effectively remove these ions regardless of the water mixing ratio tested. The mixing data for FIG. 16 refers to the point in the softening process where the blowdown and produced water are blended together. An effective softening process should decrease this concentration to as close to zero as possible. The post filtering data is collected at the very end of the softening and filtering processes and can be used as a metric to determine how effective the process was. Overall, this process was effective because the $Ca^{2+}$ concentration in the post filtering stream approaches zero. However, at lower ratios there is an increase in the $Ca^{2+}$ concentration in the filtering stream. The specific cause of this behavior is currently unknown and will be investigated further. This behavior is also present for the $Sr^{2+}$ concentration data shown in FIG. 17. FIG. 17 shows $Sr^{2+}$ concentration as a function of blowdown to produced water ratio at different steps in the softening process ("Mixing" top line, "Post Filtering" bottom line). Once again, after softening the concentration of $Sr^{2+}$ shown in FIG. 17 decreases to approximately zero for most of the ratios tested in the sensitivity study. At ratios lower than 3, low concentrations of $Sr^{2+}$ ions remain in the water after softening. However, this concentration is low enough that it should not cause any issues to the RO unit. Unlike $Sr^{2+}$ and $Ca^{2+}$, $Ba^{2+}$ ions appear to remain in solution until higher mixing ratios are used as shown in FIG. 18. FIG. 18 shows $Ba^{2+}$ concentration as a function of blowdown to produced water ratio at different steps in the softening process ("Mixing" top line, "Post Filtering" bottom line). As depicted in FIG. 18, at low mixing ratios, the $Ba^{2+}$ concentration after filtering is the same as the concentration at the mixing point. This indicates that these ions were not removed from the softening unit. However, at ratios of 5 or greater these ions begin to get removed from the water throughout the softening process and gradually begins to decrease from its mixing concentration. Unlike $Ba^{2+}$, $Mg^{2+}$ is removed from the water at all ratios tested. (see FIG. 19). FIG. 19 shows $Mg^{2+}$ concentration as a function of blowdown to produced water ratio at different steps in the softening process ("Mixing" top line, "Post Filtering" bottom line). Regardless of the mixing ratio, the $Mg^{2+}$ concentration after softening is essentially zero as shown in FIG. 19. This is likely due to the ability for $Mg^{2+}$ to precipitate out at two separate points during the softening process. Overall, by using the OLI Engine in Aspen Plus, positive softening results were able to be achieved for a variety of blowdown to produced water flowrates.

To address challenges in modeling the reverse osmosis process, Dow DuPont's Water Application Value Engine (WAVE Version 1.72) was used. WAVE is a free software that allows users to model pre-treatment technologies such as ultrafiltration (UF), demineralization technologies such as RO and ion exchange (IX) and ion polishing units. Although the primary use of this software is for the design of low TDS water treatment plants, several seawater desalination RO membranes are available for use in the software. Even though the produced water source considered in this model has a TDS exceeding 180 g/L, it is diluted to a TDS of approximately 30 g/L with a 5:1 blowdown to produced water mixing ratio. At this dilution ratio, the TDS of the RO feed is very similar to the 30 g/L TDS found in many seawater sources (Voutchkov, 2018). As the ratio of blowdown water to produced water increases, the inlet TDS to the RO unit will continue to decrease making the water recovery easier.

The inlet TDS concentration is a very important factor that must be considered when designing an effective RO unit. As the inlet TDS increases, the water recovery percentage will drop and the specific energy usage to recover water will increase due to the increase in hydraulic pressure required to oppose the osmotic pressure gradient. This relationship is characterized below in Equation 5 (Boussouga & Lhassani, 2017).

$$J_v = L_p(\Delta P - \sigma \Delta \pi) \quad (5)$$

in which, Jv is the water flux rate in the feed solution, Lp is the hydraulic permeability, $\Delta P$ is the hydraulic pressure, $\sigma$ is the coefficient of reflection and $\Delta \pi$ is the osmotic pressure. The osmotic pressure is a challenging parameter to estimate but can approximated using Equation 6 for explaining the relationship between TDS and osmotic pressure (Bartholomew et al., 2017)

$$\pi = i\varphi CRT \quad (6)$$

in which, $\varphi$ is the osmotic coefficient and typically has a value of 1 for ideal systems, R is the gas constant, and T is the temperature. C is the solute concentration and is the main factor that influences the effectiveness of the RO. Finally, i is the number of disassociating ions (Bartholomew et al., 2017).

When the hydraulic pressure exceeds the osmotic pressure, very low TDS water permeates through the RO membrane wall. This permeation increases the feed side TDS, raising the osmotic pressure and decreasing the permeation. Typically, this reducing effectiveness is addressed via staging several RO units and increasing the hydraulic pressure for the next stage. Eventually, a limit is reached where the hydraulic pressure approaches the burst pressure of the RO and cannot be exceeded without damaging the membrane. For this project, only commercial RO units are being considered. These commercial units often lack the ability to concentrate the feed stream to a TDS beyond 75 g/L (Bartholomew et al., 2018).

Due to this upper limit, any ratio less than 1.4 of blowdown water to produced water flowrate results in the inability of using RO. As a result, the water in this scenario must be sent directly to the downstream thermal desalination unit. Ratios close to 1.4 are unlikely to benefit from a RO unit due to the low water recovery percentage and high capital cost. The breakeven point where the use of RO becomes economically advantageous will need to be found when conducting the techno-economic analysis (TEA) later.

In terms of the current simulation work, case studies were carried out using the softening results from the 5:1 and 3:1 water mixing ratios only. The post filtering concentrations for these ratios were manually entered into WAVE to conduct the case studies. For these case studies, a 10 m$^3$/hr flowrate of softened water was considered using the SW30-4040 RO membrane available in WAVE. This particular membrane was selected as it is similar to the membrane being used by Dr. Lin's group in their facilities as this one has a salt rejection of 99.7%, a max operating pressure of 69 bar and is designed for seawater with a NaCl concentration of 32,000 ppm (32 g/L) (Lenntech). For reference, the membrane being used is an AMI M-S2514A with a stabilized salt rejection of 99.6%, a max operating pressure of 69 bar and was designed for seawater applications (AMI Membranes, 2019). The main difference between these membranes is the water recovery percentage per element and size, but this can be addressed by increasing the number of membrane elements. This difference will not affect the achievable water recovery percentage.

Figure 20:
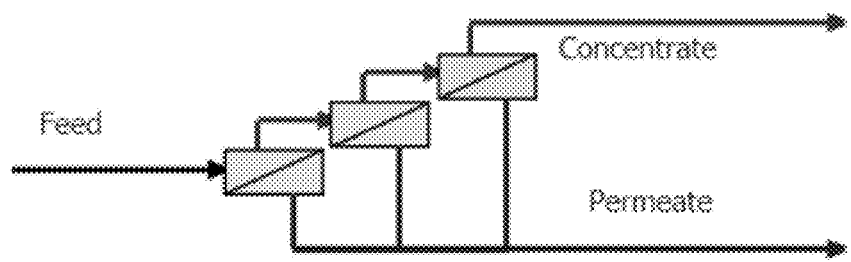
FIG. 20 shows the WAVE schematic for 3 stage RO process.
Figure 21:
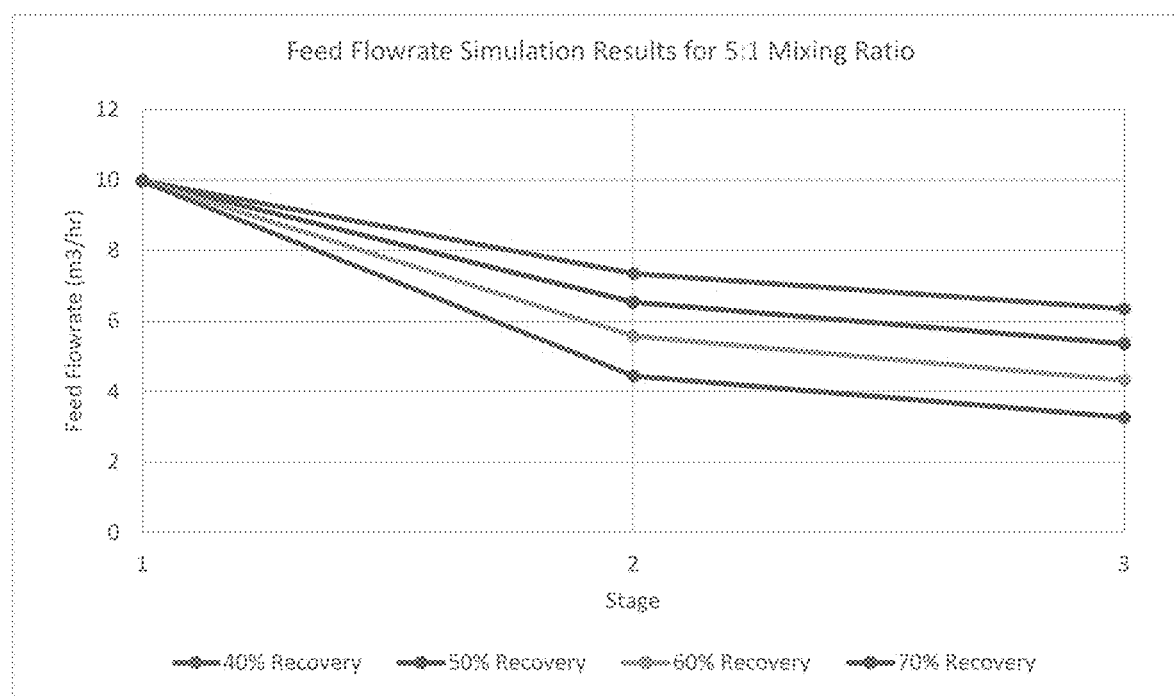
FIG. 21 shows the effect of water recovery percentage on feed flowrate to each stage for a 5:1 water ratio.
Figure 22:
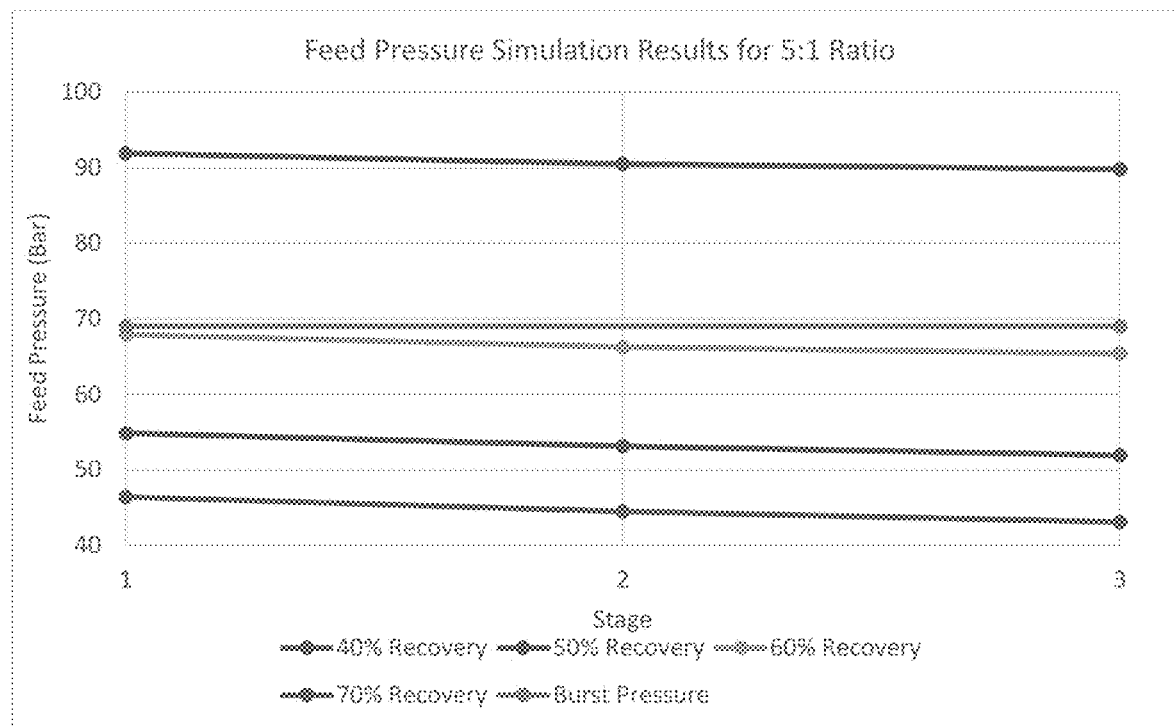
FIG. 22 shows the effect of water recovery percentage on feed pressure to each stage for a 5:1 water ratio.
Figure 23:
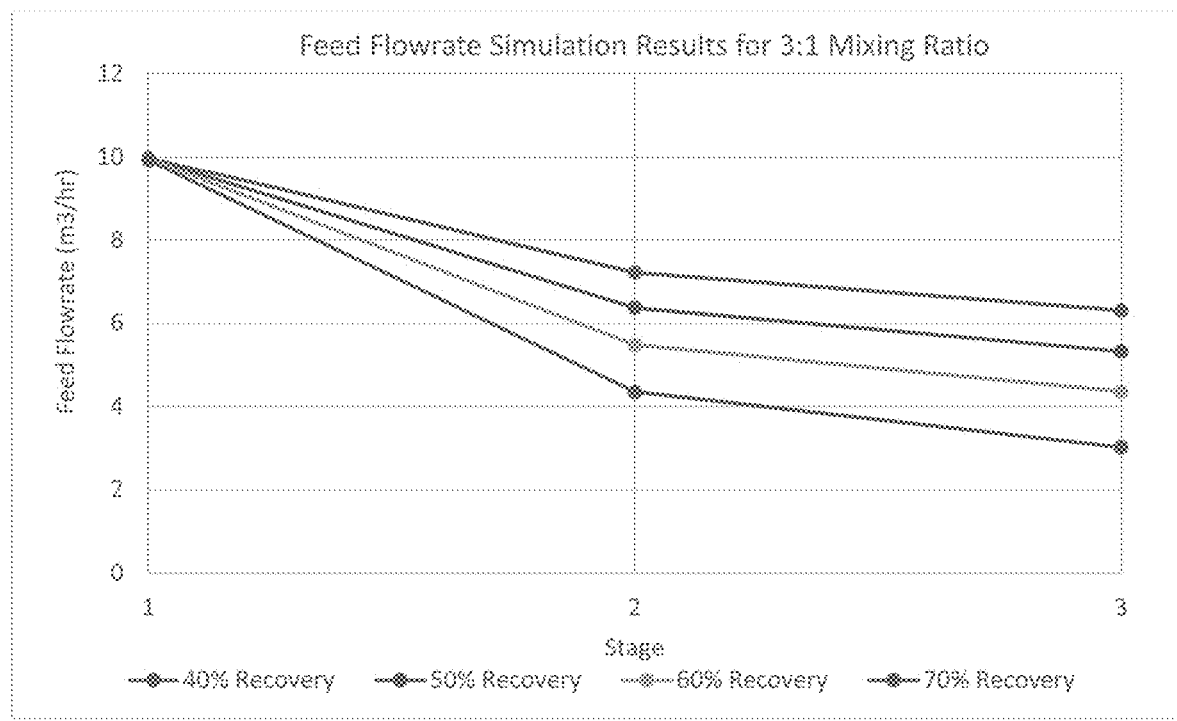
FIG. 23 shows the effect of water recovery percentage on feed pressure to each stage for a 3:1 water ratio.
Figure 24:
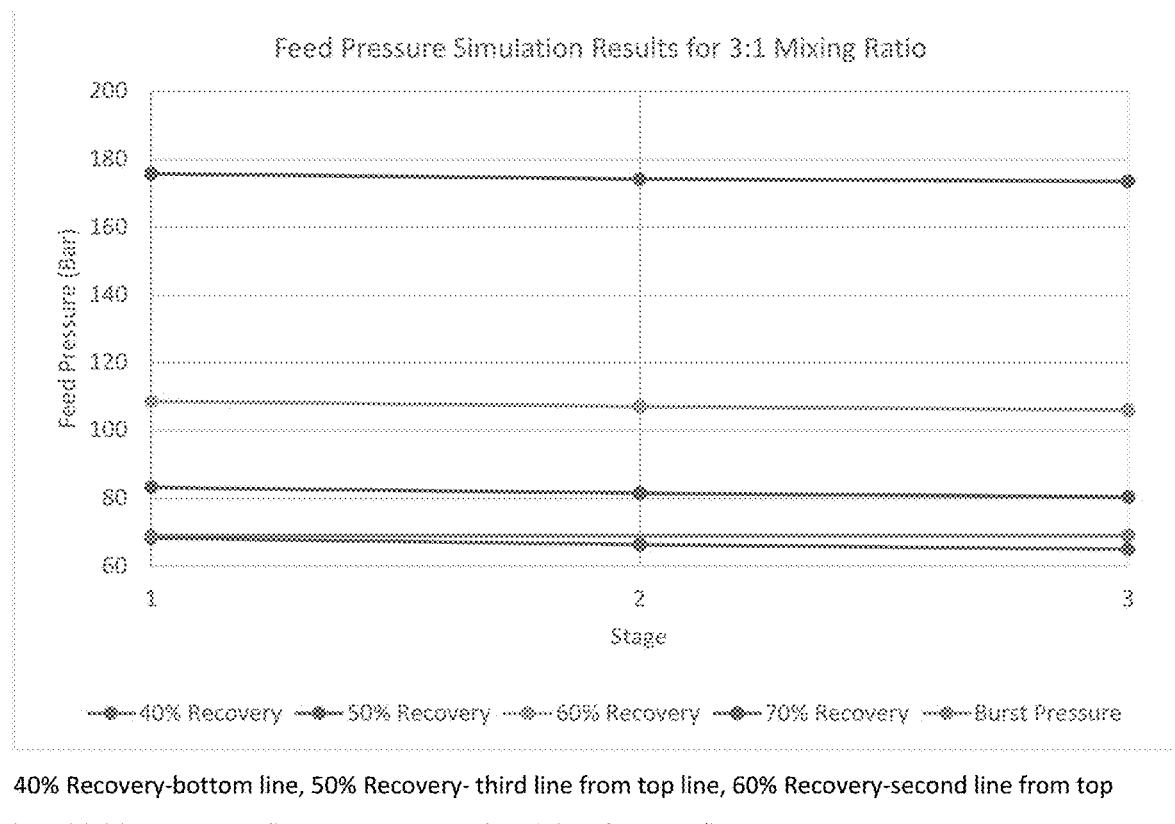
FIG. 24 shows the effect of water recovery percentage on feed pressure to each stage for a 3:1 water ratio.

In addition to the membrane model being fixed, only a 3 stage RO unit, 3 pressure vessel (PV) per stage, 6 element per vessel design was considered initially. A 3 PV per stage configuration is required to effectively treat the 10 m$^3$/hr flowrate being used. FIG. 20 shows the WAVE schematic for 3 stage RO process. When the feed enters stage 1 (bottom box, FIG. 20) it concentrates the feed and discharges the concentrated stream into the next stage (middle box, FIG. 20). This is continued until stage 3 (top box, FIG. 20) is reached, where the concentrated stream is sent to the thermal desalination unit (that will be modeled outside of WAVE). At each stage, the permeated water is collected and simply combined. This permeate water has a very low TDS and can be disposed or sold off as fresh water. In this current simulation, there is no boost pressure in between the RO stages. Boost pressure settings will be examined during the next quarter to find optimal stage pressures to minimize the operating cost of the RO membrane. The current results for the 5:1 mixing ratio is shown below in FIGS. 21 and 22. FIG. 21 shows the effect of water recovery percentage on feed flowrate to each stage for a 5:1 water ratio. FIG. 22 shows the effect of water recovery percentage on feed pressure to each stage for a 5:1 water ratio. FIG. 21 shows that in all cases start at a flowrate of 10 m$^3$/hr which decrease at stages 2 and 3 due to water entering the permeation stream. As the water recovery percentage increases, the rate of change in the feed flowrates increases between stages. This happens due to the increasing hydraulic pressure as the water recovery percentage increases as shown above in FIG. 22. The hydraulic pressure decreases as the stage number increases due to frictional losses associated with the fluid moving through the pressure vessel. For this 5:1 ratio case, the maximum achievable water recovery percentage is only 60% as it approaches the maximum operating pressure of the SW30-4040 membrane. Any water recovery percentage above this point will require a larger hydraulic pressure, thus exceeding the burst pressure. That is why the 70% recovery percentage is infeasible at this mixing ratio. The results for the 3:1 mixing ratio are show below in FIGS. 23 and 24. FIG. 23 shows the effect of water recovery percentage on feed pressure to each stage for a 3:1 water ratio. FIG. 24 shows the effect of water recovery percentage on feed pressure to each stage for a 3:1 water ratio. In FIG. 23, all the case studies begin at an inlet feed flowrate of 10 m$^3$/hr which decrease as the number of stages increase. Once again, to achieve higher water recovery percentages larger hydraulic pressures are required. However, when compared to the 5:1 ratio result, only a 40% recovery is achievable as shown in FIG. 20. At 40% the required hydraulic pressure is approximately 68 bar which is approaching the 69 bar burst pressure of the membrane. The 50%, 60% and 70% water recovery percentages are not achievable as they require hydraulic pressures greater than 69 bar. Although this water percentage recovery is lower than the maximum water percentage recovery in the 5:1 ratio, TEA of the entire plant would have to be performed to determine the optimum feeding ratio.

Overall, the results from WAVE are promising and more case studies will be conducted with the software to generate more data. Variables such as number of stages, temperature, boost pressure, and number of PV per stage will be introduced in the study. The goal for this unit is to generate large amounts of data and develop a model that can be introduced into Aspen Plus to combine the softening and RO unit operations into a single simulation. This combined simulation will then be useful during the optimization portion of this work as it will allow for a more comprehensive optimization analysis.

Summary III:

The present invention provides a cooling tower blowdown (BD) water treatment process utilizing produced water (PW) and low-grade heat to maximize water reuse and saleable by-product generation while reducing chemical and energy footprints of the treatment. In this quarter, the research team made progresses in Tasks 1, 4, 6, and 8. Specifically, we continued the reverse osmosis (RO) treatment work with three membrane operating pressures for total dissolved solids (TDS) (Task 4). BD/PW mixture after the softening and activated carbon (AC) filtration was treated in an RO unit at an pressure of 55.2 bar (800 psi), and the treatment resulted in a TDS concentration of 40 g/L in the RO reject, equivalent to 98.7% salt rejection. The 20-min RO treatment led to 55% water recovery and TDS of 0.37 g/L in the permeate. The team continued brine electrolysis (Task 6) and tested 80 or 110 g/L concentration of sodium chloride (NaCl) solution using a PCCell unit with 20 anion-exchange/cation exchange pairs, each with an effective area of 60 cm$^2$ (total area 1.2 m$^2$). Parameters tested include measurement of desalination coulombic efficiency, water recovery, water co-transport with salt, and specific energies (kWh/kg of NaCl, kWh/m$^3$ of product water). Faradaic efficiency is near 80%, approximately 14-18 moles of water are transferred per mole of NaCl transferred, and specific energies hover near 0.3 kWh per kg NaCl transferred and 15-20 kWh per cubic meter of dilute product. The water softening part of the project flowsheet was modeled in Aspen Plus using Dow DuPont's Water Application Value Engine (WAVE) add-on (Task 8). In the WAVE simulations, RO parameters such as number of RO stages, number of pressure vessels (PV) per stage, boost pressure, temperature, flow factor, and water recovery percentage were varied for blowdown BD:PW ratios from 1:1 to 10:1. The generated hundreds of WAVE simulation results were imported into MATLAB for parameter regressions of the RO model.

Task 2.0—Produced Water-Aided Blowdown Water Treatment with Caustic Soda from Brine Electrolysis This invention provides a water-aided blowdown water treatment with softening. A range of volumetric mixing ratios of the PW and BD water samples will be subjected to Jar tests to measure pH changes and the removal efficiency of scale-forming constituents. The NaOH solution used to raise to the pH of the PW-BD water mixtures to different end points for further removal of scale-forming constituents. The softening treatment will also be conducted with soda ash ($Na_2CO_3$) addition for comparison. The softened effluent will be analyzed, and the softening efficiency will be quantified as a function of pH end points of the mixture. The softening treatment will be conducted in both batch and continuous modes. Settling characteristics of the chemical precipitates will be examined for designing a continuous softening unit.

Results and Discussion

By introducing PW to BD, without any chemical addition, high sulfate content of BD formed precipitates with Ba and resulted in 100% Ba removal at ratio BD:PW=10:1. This volumetric ratio was selected for further downstream activated carbon filtration and RO membrane desalination. The softening treatment to further remove scale-forming ions (e.g., Ca and Mg) was conducted by increasing pH of the solution to pH~12 using NaOH (5M) or NaOH from brine electrolysis (~0.1M at volumetric ratio of NaOH:sample=1:1) and adding sodium carbonate (sodium carbonate: sample total hardness molar ratio=1:1). The results showed >90% removal of metals was achieved by the softening of PW-BD mixture and BD alone.

Task 3.0—Removal of Organics and Suspended Solids Using Filtration

An activated carbon (AC) filtration unit was used in this task to remove residual organics and SS from the softening treated effluent. Total organic carbon (TOC), SS, TDS, and scale-forming constituents were measured to quantify the treatment efficiency. These measurements were used to determine if the filtered effluent meet the criteria for RO treatment (e.g., silt density index, pH).

Results and Discussion

The results showed >90% TOC removal after 7 cycles for treatment, and 5 cycles of filtration for treatment train. The SEM micrographs showed more particles attached to the surface of probably carbon particles after softening. According to EDS analysis, an increased abundance of Mg after softening is highly significant.

Task 4.0: Product Water and Brine Generation Using Reverse Osmosis

Figure 25:
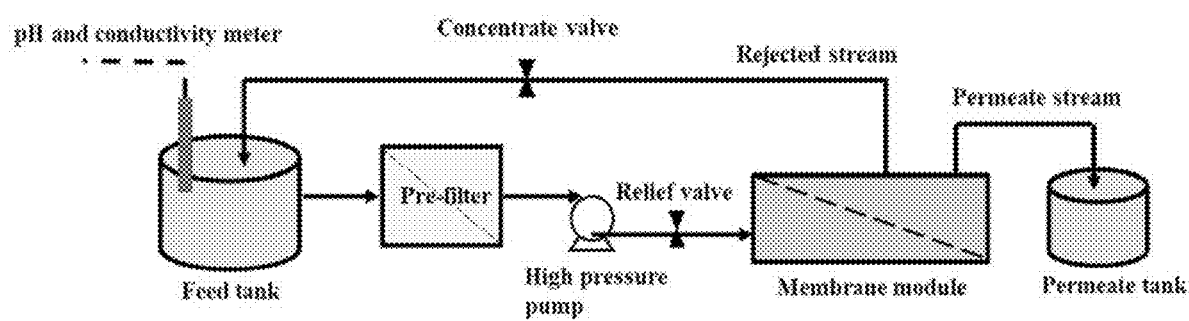
FIG. 25 shows a schematic diagram of RO treatment system.

A lab-scale cross-flow flat sheet RO unit was used to recover water and concentrate TDS (FIG. 25). A commercial high rejection seawater desalination RO (SWRO) membrane (Applied Membrane, Inc, Model No. M-S2514A) was used in this study. The RO treatment system consisted of a high-pressure pump (Pentair Hypro 2220B-P), cartridge filter, pressure relief valve, membrane cell, membrane cell holder, high-pressure concentrate control valve, pressure indicator, feed tank, permeate collection tank, and connections/tubings. The required pressure in the membrane cell was adjusted by the concentrate control valve. Three membrane operating pressures were tested including 27.5 bar (400 psi), 41.3 bar (600 psi), and 55.2 bar (800 psi). The RO treatment was operated in a recirculating mode in which the concentrate stream was returned to the feed tank. Permeate was collected in the permeate tank thus, the TDS concentration in the feed tank gradually increased during the operation due to the concentration effect and decrease in the volume of the feed tank. The duration of each RO test was 20 min. The conductivity and pH of the feed tank were measured every 5 min. At the end of the treatment, final conductivity and pH of concentrate and permeate streams as well as their volumes were measured and the overall mass balance on TDS was calculated.

Results and Discussion

Figure 26:
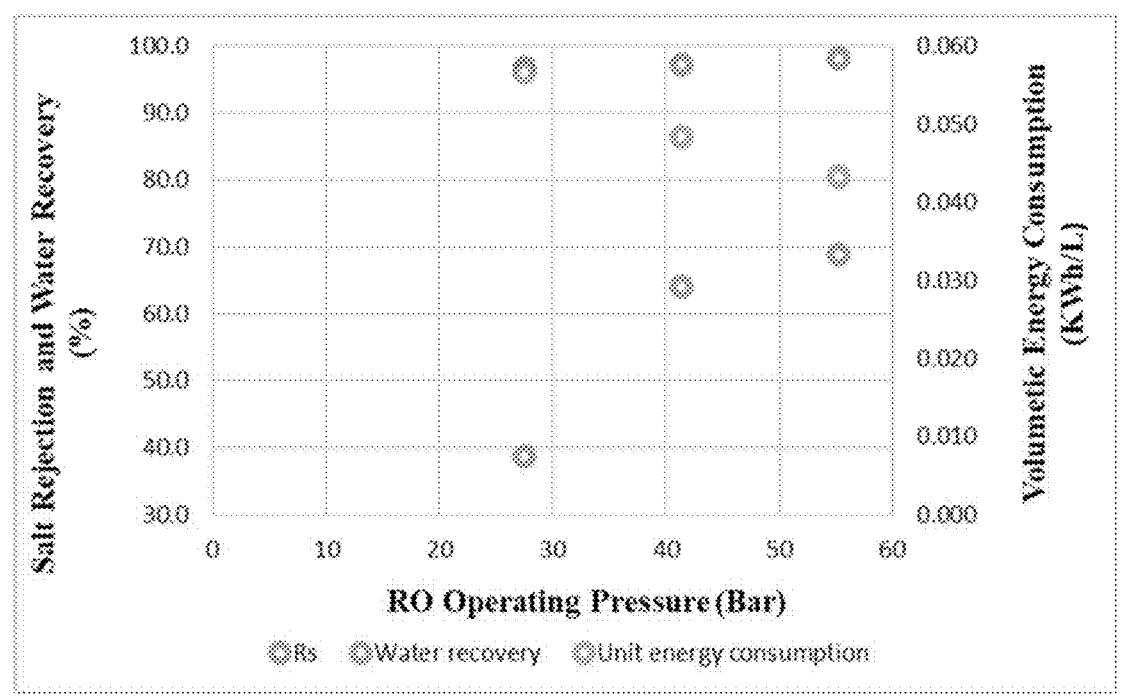
FIG. 26 shows a salt rejection, water recovery, and energy consumption from 20-min RO treatments.

Experiments were conducted with the RO system using sodium chloride solution with a TDS concentration of 20 g/L. FIG. 26 lists the salt rejection (Rs), water recovery, and energy consumption during 20-min RO operations under different pressures. The final TDS concentrations of the rejected streams were 26, 32, and 42 g/L with applied pressures of 27.5 bar (400 psi), 41.3 bar (600 psi), and 55.2 bar (800 psi), respectively. Water recovery and concentration factor increased with the applied operating pressure while the volumetric energy consumption (kW-h/L) decreased. The RO treatment of the BD/PW mixture after the softening and AC filtration at the applied pressure of 55.2 bar (800 psi) resulted in a TDS concentration of 40 g/L in the RO reject, equivalent to 98.7% salt rejection. The 20-min RO treatment resulted in 55% water recovery and TDS of 0.37 g/L in the permeate. No detectable quantifies of multivalent ions and organics were found in the product water (Table 8, below). Since the TDS concentration and consequently the osmotic pressure in the feed tank gradually increased as the concentrate stream was recirculated to the feed tank, the permeate flow rate decreased gradually from 0.54 L/min to 0.40 L/min during the operation. At the applied pressure of 55.2 bar (800 psi), the power consumption of the pump was 1.24 KW and equivalent to volumetric energy consumption 0.045 KW-h/L permeate water during the 20-min treatment (FIG. 26). FIG. 26 shows salt rejection, water recovery, and energy consumption from 20-min RO treatments.

TABLE 9

Characteristics of the concentrate and permeate streams from the RO treatment.

| Parameters | Concentrate Stream | Permeate Stream |
|---|---|---|
| pH | 10.1 | 10.7 |
| TDS (g/L) | 40 | 0.37 |
| TOC (mg/L) | <1.0 | <1.0 |
| Sulfate ($SO_4^{2-}$, mg/L) | 600 | <0.007 |
| Silica ($SiO_2$, mg/L) | 14.0 | 0.32 |
| Calcium ($Ca^{2+}$, mg/L) | <0.001 | <0.007 |
| Magnesium ($Mg^{2+}$, mg/L) | <0.001 | <0.001 |
| Barium ($Ba^{2+}$, mg/L) | 0.019 | 0.007 |
| Strontium ($Sr^{2+}$, mg/L) | 0.21 | 0.004 |
| Iron (Fe, mg/L) | 0.13 | 0.14 |

Figures 27A, 27B:
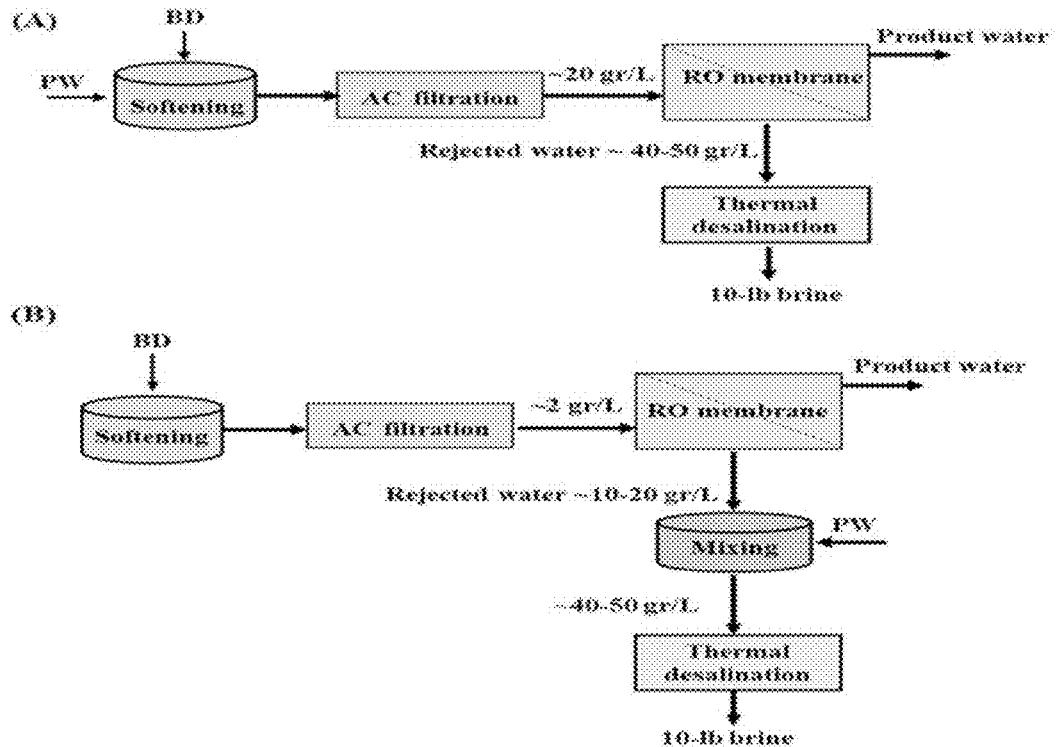
FIG. 27A shows treatment trains to be compared for their chemical and energy footprints, including PW-BD mixture treatment.
FIG. 27B shows treatment trains to be compared for their chemical and energy footprints, including BD alone treatment before downstream mixing with PW and thermal desalination.

Evaluation of a second treatment configuration (FIG. 27 B) where BD alone is treated in the softening unit followed by activated carbon and RO treatment, followed by mixing of the RO reject with PW for water conditioning, shall be undertaken. Effects of feedwater pH, operating pressure, and treatment time on TDS rejection will be evaluated to optimize RO energy consumption for the both treatment configurations (i.e., pre-RO and post-RO mixing of BD and PW). FIG. 27 (A) shows the treatment trains to be compared for their chemical and energy footprints, including PW-BD mixture treatment, and FIG. 27 (B) shows BD alone treatment before downstream mixing with PW and thermal desalination. Comparison of two treatment trains in terms of chemical and energy footprints, as well as the production of permeate, and brine solution to maximize water reuse and saleable by-product generation. The cost analysis shown in Table 10 is incomplete at the present juncture.

Experimental Details

Initial compositions of dilute and concentrate solutions are identical. Electrode rinse solution is 42 g/L $NaHCO_3$

TABLE 10

Cost analysis of treatment trains A) PW-BD mixture treatment, B) BD alone treatment before downstream mixing with PD water and thermal desalination.

| Chemical consumption | Treatment layout | | | | | |
|---|---|---|---|---|---|---|
| | A | | | B | | |
| | Amount (kg/L) | Unit price ($/kg) | Cost ($/L) | Amount (kg/L) | Unit price ($/kg) | Cost ($/L) |
| Sodium carbonate (99.5%) | 0.006 | 72.40 | 0.432 | 0.0006 | 72.40 | 0.043 |
| | Amount (L/L) | Unit price ($/L) | Cost ($/L) | Amount (L/L) | Unit price ($/L) | Cost ($/L) |
| Sodium hydroxide (5M) | 0.01 | 0.056 | 0.0006 | 0.0045 | 0.056 | 0.00025 |
| Total cost | | | 0.43 | | | 0.043 |

| | Treatment layout | | | | | |
|---|---|---|---|---|---|---|
| | A | | | B | | |
| Energy consumption | Energy consumption (Kw.hr/L) | Energy Unit price ($/Kw.hr) | Cost($/L) | Energy consumption (Kw.hr/L) | Energy Unit price ($/Kw.hr) | Cost($/L) |
| RO Unite Total cost | | | | | | |

| | Treatment layout | |
|---|---|---|
| | A | B |
| Transportation | 0.1 L PW for 1-liter of BD | 5-10-liter PW for 1 L BD |

Task 5.0: Waste Heat-Aided Thermal Desalination to Generate 10-Lb Brine

This task will design and fabricate a bench-scale two-stage MED unit to evaporate the liquid water in the RO reject to generate 10-lb brine. Specifically, key customized components (e.g., MED system housing, heat exchangers, condensers, connectors and valves) will be designed at this task. Low-pressure steam will be generated by a commercial electrical steam generator. The two-stage system will be equipped with waste energy recovery mechanisms to improve the energy efficiency of the treatment. Specifically, the steam produced in the $1^{st}$ stage will be used to evaporate water in the $2^{nd}$ stage at a lower temperature. This will recover the majority of the thermal energy consumed in the $1^{st}$ stage. The vapor formed in the $2^{nd}$ stage will be recovered to heat the RO reject before entering the $1^{st}$ stage.

Task 6.0—Brine Electrolysis for Caustic Soda and Chlorine Production

Electrodialysis (ED) can be used to recover more water while minimizing the thermal energy requirements to produced 10-lb brine. The ED system is a PC Cell unit with 20 anion-exchange/cation exchange pairs, each with an effective area of 60 $cm^2$ (total area 1.2 $m^2$). The metrics of performance for partial desalination of concentrated brine solutions have been determined. Parameters tested during this quarter include measurement of desalination coulombic efficiency, water recovery, water co-transport with salt, and specific energies (kWh/kg of NaCl, kWh/$m^3$ of product water) for NaCl solutions containing 80 or 110 g/L. For the 80 g/L solution, the ratio of initial volumes of concentrate to dilute have been explored.

plus sufficient $NaSO_3NH_2$ to achieve the same concentration of ions as in the dilute and concentrate solutions. The PCCell system is pre-soaked in the solutions to equilibrate the membranes and the solutions are replaced for the electrolysis. Initial volume of the dilute is near 500 mL; the ratio of initial volumes of concentrate to dilute are shown in Table 10. Electrolysis is performed at constant current (25 or 20 mA/$cm^2$) and is stopped at a time designed to retain 75-80% of the dilute volume. Electrochemical impedance spectroscopy is used to determine the cell ohmic resistance at open circuit before and after electrolysis. In general, the ohmic resistance was smaller after the electrolysis, indicating that the expected resistance increase of the dilute is not a major part of the cell resistance. Faradaic efficiencies are calculated assuming that 1 mole of NaCl should be transferred from dilute to concentrate per mole of electrons passed through the cell. Specific energies are calculated in kilowatt hours per kilogram of NaCl transferred or cubic meter of dilute solution recovered.

Results and Discussion:

The conditions are chosen to avoid any significant concentration polarization in the membranes or in the solutions contacting the membranes. For most experiments, faradaic efficiency is near 80%, approximately 14-18 moles of water are transferred per mole of NaCl transferred, and specific energies hover near 0.3 kWh per kg NaCl transferred and 15-20 kWh per cubic meter of dilute product. The goal of reducing the volume ratio is to minimize the amount of concentrated brine while maximizing its NaCl concentration. Surprisingly, the faradaic efficiency dropped significantly.

TABLE 11

Metrics for partial desalination of 110 g/L NaCl solutions.

| Metric | units | | | | | | |
|---|---|---|---|---|---|---|---|
| Initial [NaCl] | g/L | 110 | 80 | 80 | 80 | 80 | 80 |
| Initial dilute volume | mL | 465 | 465 | 490 | 485 | 485 | 485 |
| Initial volume ratio | | 0.63 | 0.63 | 0.61 | 0.61 | 0.51 | 0.51 |
| Current | A | 1.5 | 1.2 | 1.2 | 1.2 | 1.2 | 1.2 |
| Time | s | 1600 | 2000 | 2100 | 2100 | 2100 | 2100 |
| Final dilute [NaCl] | g/L | 78 | 38 | 42 | 36 | 48 | 48 |
| Final concentrate [NaCl] | g/L | 141 | 112 | 115 | 114 | 106 | 107 |
| % dilute recovered | | 79% | 75% | 76% | 75% | 76% | 76% |
| % faradaic efficiency | | 77% | 80% | 77% | 83% | 68% | 69% |
| moles H2O/mol NaCl | | 14.2 | 16.1 | 15.8 | 15.6 | 18.3 | 18.1 |
| Specific energy-mass NaCl | kWh/kg | 0.32 | 0.271 | 0.315 | 0.245 | 0.276 | 0.271 |
| Specific energy-volume dilute | kWh/m$^3$ | 19.6 | 18.0 | 19.9 | 17.1 | 15.6 | 15.4 |

Task 7.0: Integration of Treatment Units

The treatment units are integrated into a single, packaged prototype module in order to demonstrate overall treatment feasibility. The integrated module will be used to process a combined flow of PW and BD waters to produce an RO permeate flow in the range of 0.1-1 gpm. Given the different kinetics and capacities of the individual treatment units, an intermediate container will be used to hold the treated water as a flow equalizer between two units that have significantly different treatment capacities. The operating conditions of the treatment units developed in the previous tasks will be further optimized in this task.

Task 8.0—Process Modeling and Simulations

Commercial software such as OLI Flowsheet (OLI Systems, Inc.) or Aspen Plus (Aspen Tech, Inc.) will be used to simulate the proposed process model. Specifically, condenser and cooling tower models will be simulated to estimate the water loss by evaporation and drift during different operating scenarios. These models will also be employed to calculate the blowdown and makeup water flowrates in order to maintain the appropriate concentration. Different scenarios will be considered for acquiring produced water. For example, one scenario would be to pay for transportation costs to truck the water from the well and have the produced water available at no cost. Another possible scenario would be to pay for water transportation, but also receive compensation for taking the water. For the proposed modular treatment process, the unit model will be developed using mass and energy balances based on available experimental data or first-principles models from the commercial software. Also, an economic model will be coupled with the process model to estimate the capital and operating costs based on economic assumptions and the Aspen Process Economic Analyzer tool (Aspen Tech, Inc.). With the proposed process and economic models, a MILP (mixed-integer linear programming) optimization problem will be formulated to determine the optimal configuration/number of RO (reverse osmosis) units needed and the optimal concentration of the RO reject stream to minimize capital and operating costs. The TEA will also consider addition of a 4th, higher-pressure RO unit that can handle higher TDS to further concentrate the RO concentrate from the three-stage RO treatment (Task 4.0). Disposal options and costs for the generated sludge materials including NORM, if detected, will be proposed and included in the TEA. To solve this optimization problem, MILT tools will be explored, such as the solvers available in the Optimization toolbox in MATLAB (Mathworks, Inc.) and GAMS (GAMS Development Corporation), if needed for higher complexity.

In addition, based on the developed model and optimization algorithm, a TEA will be conducted to estimate the manufacturing cost and operating performance of the proposed modular unit with the ultimate goal of obtaining the most cost-effective modular design.

Results and Discussion

Dow DuPont's Water Application Value Engine (WAVE, Version 1.72) continued to be used to generate simulated data for the RO unit. In particular, WAVE simulations were run considering one and three RO stages with varying BD:PW ratios from 1:1 to 10:1, varying number of pressure vessels (PV) per stage, temperature, flow factor, water recovery percentage, and boost pressure (applicable to the 3 stage RO design only). The simulations were performed using the SW30-4040 membrane available in WAVE. The simulation results from WAVE were saved as a CSV (comma separated value) file and imported into MATLAB for parameter regression.

For all WAVE simulations, the SW30-4040 membrane continued to be used as it exhibits a salt rejection of 99.7%, a max operating pressure of 69 bar, and is designed to treat seawater (Lenntech, n.d.). These characteristics closely match the RO membrane being used by Dr. Lin's group in their experimental setting. In addition to using the same membrane for all simulations, the feed flowrate was kept fixed at 10 m$^3$/hr for all simulations. Table 12 highlights the parameters that were varied when running the WAVE simulations for the 1 stage RO design and their respective ranges.

TABLE 12

Parameters and ranges for 1 stage RO WAVE simulations.

| | BD to PW Ratio | PV per stage | Water Recovery % | Temperature (° C.) | Flow Factor |
|---|---|---|---|---|---|
| Range | 1:1-10:1 | 2-6 | 40-65% | 10-40° C. | 0.6-1 |
| Increment | 1 | 1 | 5% | 10° C. | 0.1 |

Figure 28:
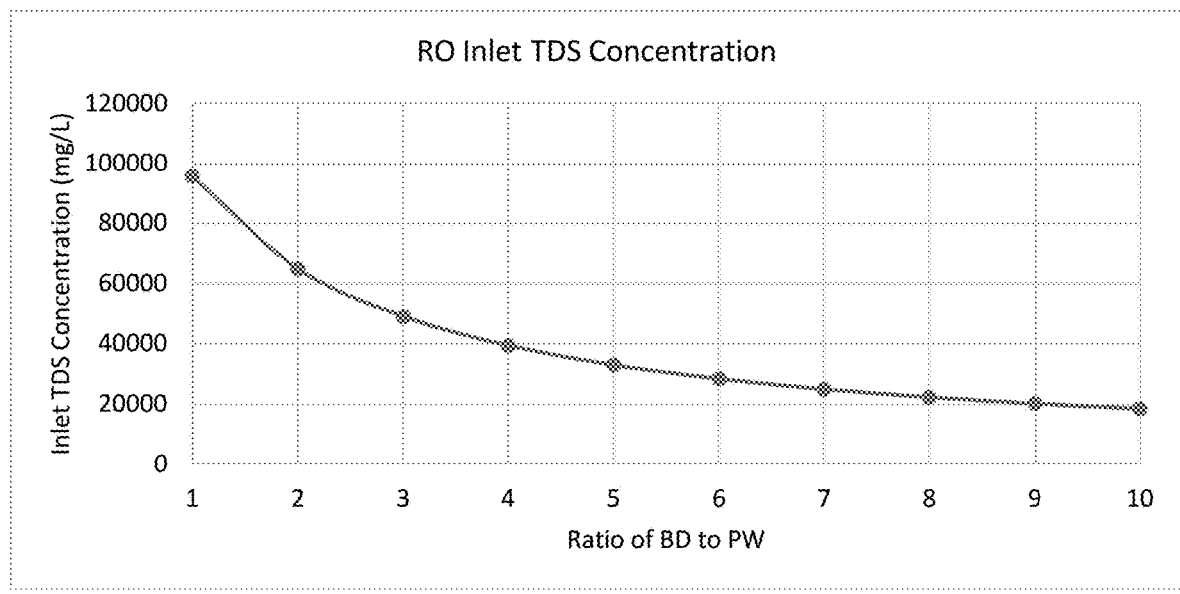
FIG. 28 shows inlet TDS concentrations as a function of blowdown to produced water ratios.

For the 1 stage RO design, WAVE automatically calculates the required hydraulic pressure to achieve the desired water recovery percentage (specified by the user) using the parameters and their ranges in Table 25 above. Low BD to PW ratios generate simulation results that are often infeasible as the required hydraulic pressure greatly exceeds the burst pressure of the membrane. This occurs due to the high inlet TDS concentration at low ratios as shown in FIG. 28. FIG. 28 shows the inlet TDS concentrations as a function of blowdown to produced water ratios.

Figure 29:
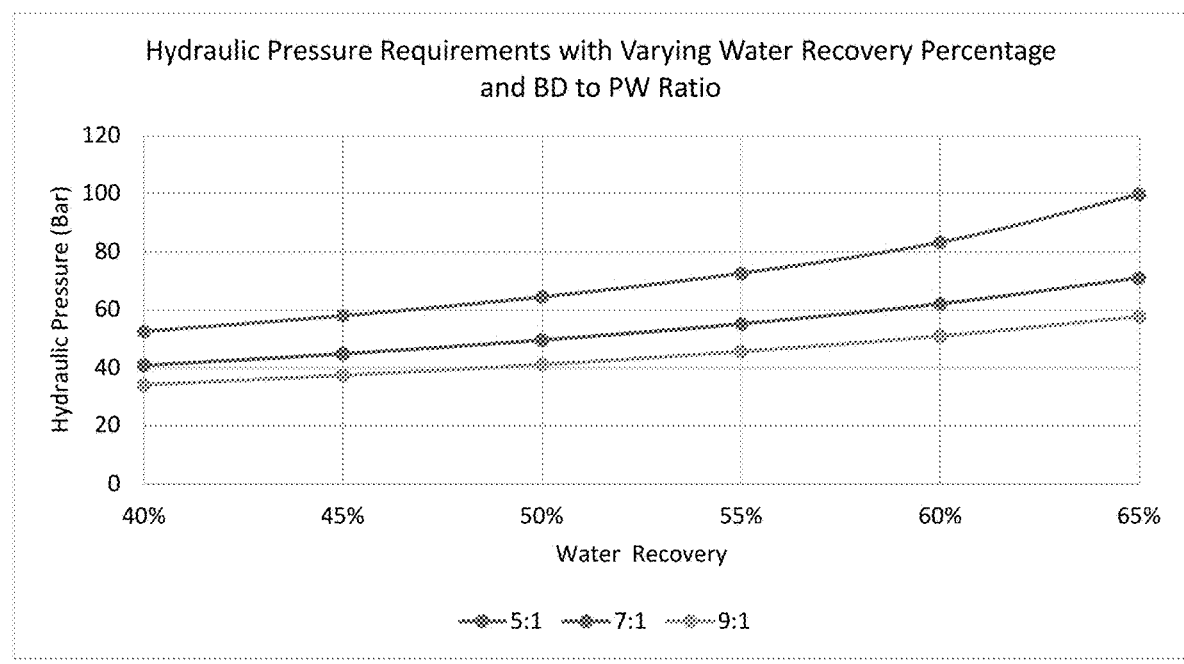
FIG. 29 shows the required hydraulic pressure for several different BD to PW ratios as a function of the water recovery percentage.

Although many factors influence the hydraulic pressure requirements, the most significant factor is the inlet TDS concentration as this directly increases the osmotic pressure generated from permeation of water through the membrane. To overcome this increase in osmotic pressure, more hydraulic pressure is required. FIG. 29 highlights the required hydraulic pressure for several different BD to PW ratios as a function of the water recovery percentage.

Figure 30:
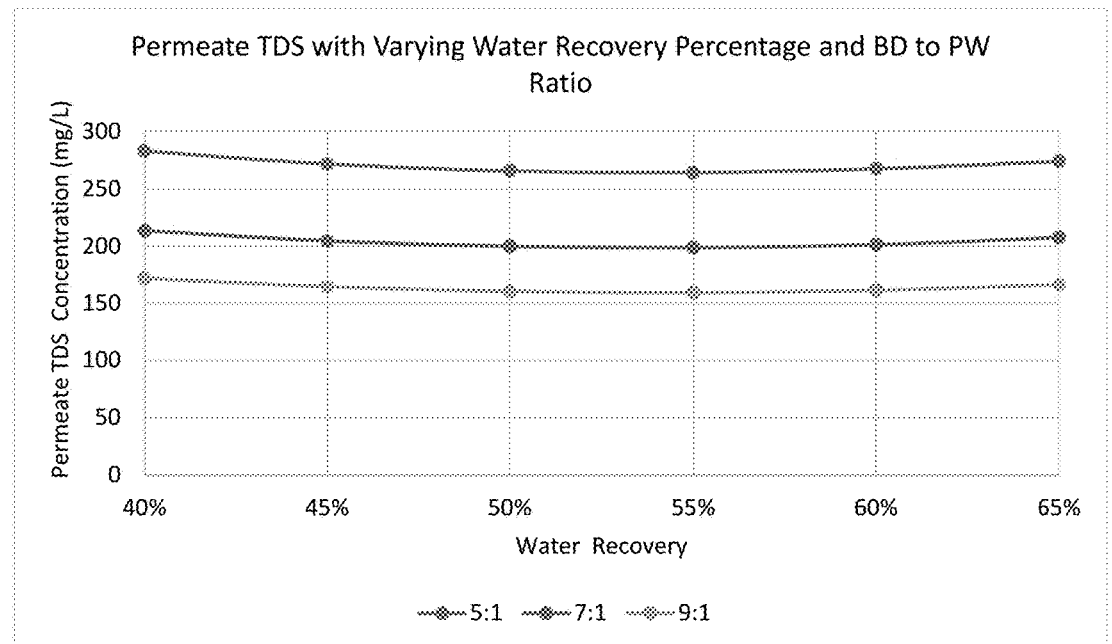
FIG. 30 shows tracking of the permeate TDS concentration as functions of the water recovery percentage and the BD to PW ratio.

FIG. 29 shows the hydraulic pressure requirements for 1 stage RO design as a function of water recovery percentages and BD to PW ratios. The results shown in FIG. 29 were generated using a 4 PV per stage design, a RO feed temperature of 30° C., and a flow factor of 1. These parameters were held constant to examine the effects of varying the water recovery percentage and the BD to PW ratios without interferences from varying the other parameters. Ultimately, with lower BD to PW ratios and higher water recovery percentages, an increase in the required hydraulic pressure is experienced. As higher recovery percentages are specified in WAVE, the retentate side becomes more concentrated (increasing the TDS concentration), ultimately resulting in a higher osmotic pressure. This higher osmotic pressure must be overcome by increasing the hydraulic pressure. In addition to identifying the hydraulic pressure requirements, the salt permeation through the membrane must also be tracked to ensure the permeate water is below the upper TDS limit. Currently, there is no specified limit for the permeate TDS concentration, but if this water is to be recycled back to the power plant or disposed, then the TDS concentration must be low. FIG. 30 shows tracking of the permeate TDS concentration as functions of the water recovery percentage and the BD to PW ratio. FIG. 30 shows the permeate TDS concentration for 1 stage RO design as a function of water recovery percentages and BD to PW ratios. The results shown in FIG. 30 were generated using the same design specifications as in FIG. 29 to directly examine the effects of the water recovery percentage and BD to PW ratio on the permeate TDS concentration. When reviewing FIG. 30, it appears that the water recovery percentage has little effect on the permeate TDS concentration as it is relatively constant for a specified BD to PW ratio. Instead, it appears that the permeate TDS concentration is a function of the BD to PW ratio with higher ratios leading to a lower permeate TDS concentration. This behavior likely occurs due to the higher inlet TDS concentrations at lower ratios as depicted in FIG. 28. Beyond varying the water recovery percentage and BD to PW ratio, the effects of varying the PV per stage and temperature are shown in FIGS. 31 and 32.

Figure 31:
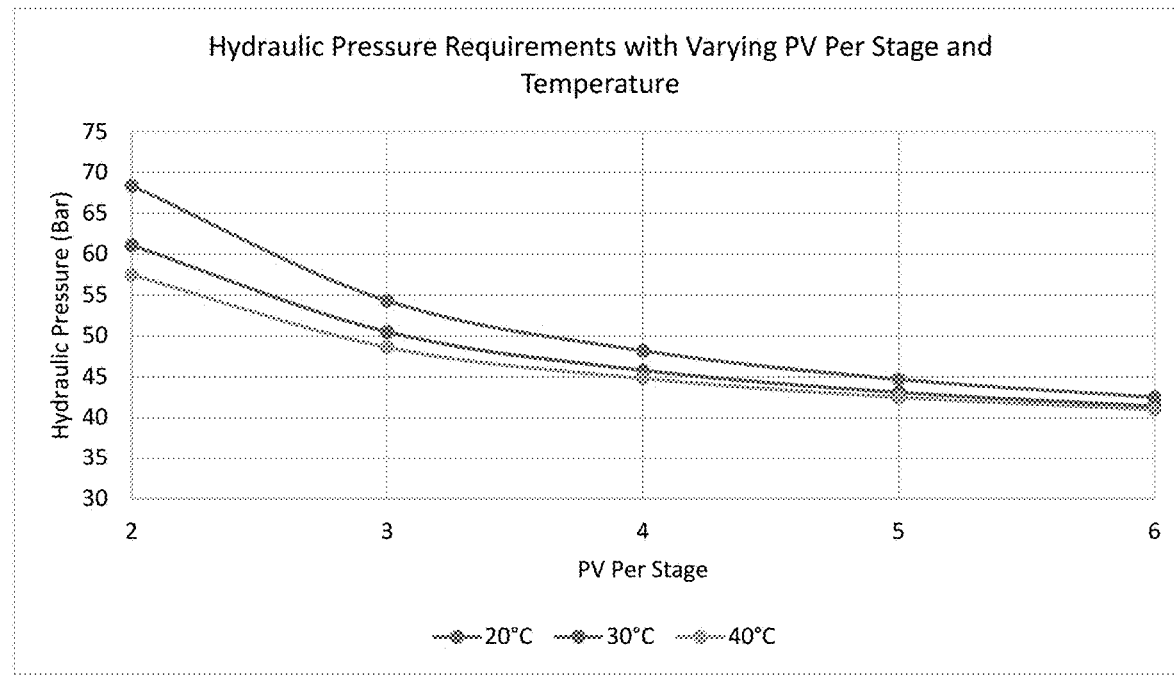
FIG. 31 shows hydraulic pressure requirements for 1 stage RO design as a function of PVs per stage and temperatures.

FIG. 31 shows hydraulic pressure requirements for 1 stage RO design as a function of PVs per stage and temperatures. The results shown in FIG. 31 were generated considering a BD to PW Ratio of 6:1, a water recovery percentage of 40%, and a flow factor of 1. These parameters were kept constant in order to isolate the effects of varying the PV per stage and temperature. Based upon FIG. 31, as the number of PV per stage increases there is decrease in the hydraulic pressure requirement. However, once 5 PV per stage is reached the effects of adding additional stages becomes minimal with only a few (3 or so) bar decrease for the 6 PV per stage case. This trend is to be expected as increasing the PV per stage results in an increase in the size of the effective membrane area which allows the average permeate flux to be lower. For example, the 20° C. case study at 4 PV per stage has an average permeate flux of 22.66 LMH (liters per hour per square meter) and at 5 PV per stage has an average permeate flux of 18.13 LMH. The effect of temperature on hydraulic pressure is mostly significant at lower PV per stage values as the difference between the 20° C., 30° C., and 40° C. data is minimal at 5 PV per stage and 6 PV per stage. Based upon the WAVE data, higher temperatures appear to be correlated to lower hydraulic pressure requirements for the membrane. The effect of varying PV per stage and temperature on the permeate TDS concentration is shown below in FIG. 32.

Figure 32:
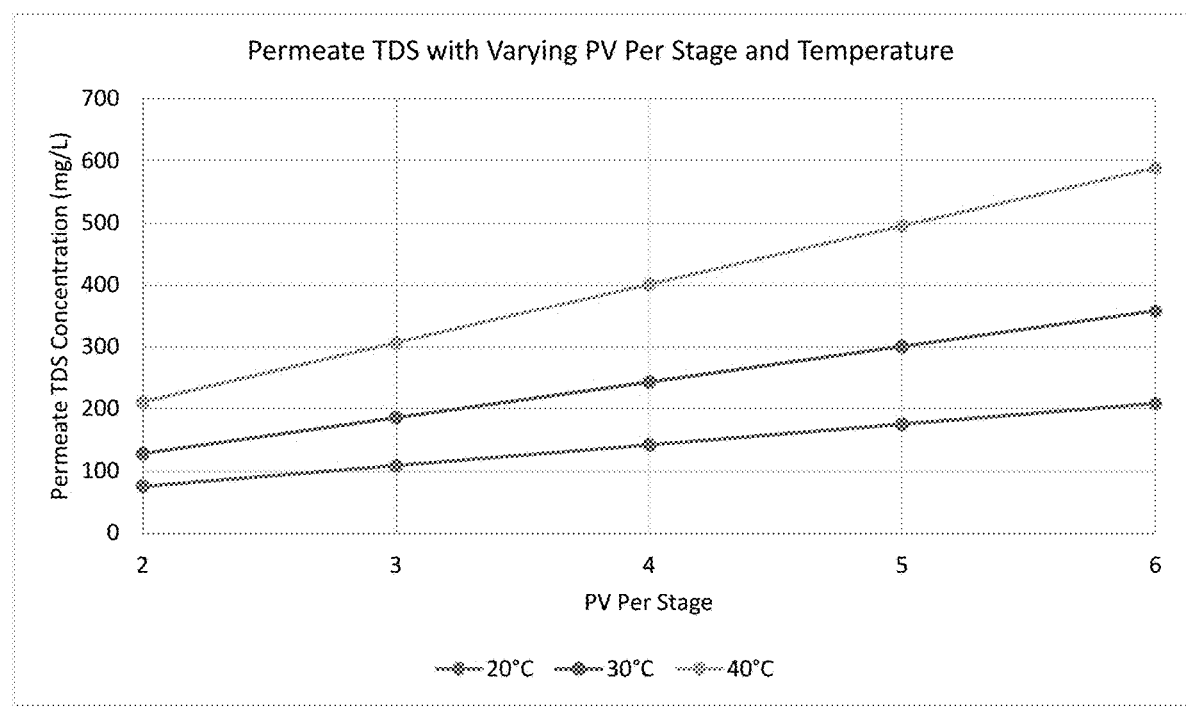
FIG. 32 shows FIG. 32 sows permeate side TDS concentration for 1 stage RO design as a function of PVs per stage and temperatures.

FIG. 32 shows permeate side TDS concentration for 1 stage RO design as a function of PVs per stage and temperatures. The results shown in FIG. 32 were generated using the same design specifications as in FIG. 31 but display the effects of varying temperature and PV per stage on the permeate TDS concentration. Based upon FIG. 32, as the PV per stage increases there is a corresponding increase in the permeate TDS. This is likely due to an increase in the membrane area which allows more salt to permeate through the membrane. However, this increase appears to be less significant than the effects of temperature. When increasing the temperature of the RO unit there is an increase in the permeate TDS, which is expected as higher temperatures often result in higher permeabilities. The final parameter considered in the 1 stage RO design is the flow factor and its effect is shown below in FIG. 33 and FIG. 34.

Figure 33:
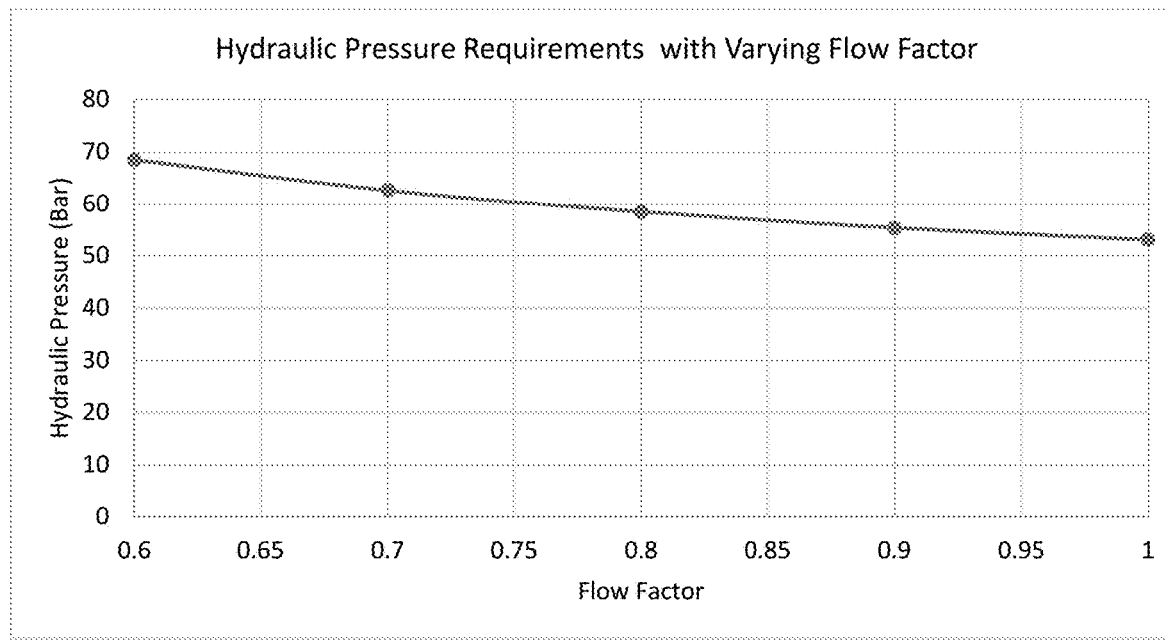
FIG. 33 shows hydraulic pressure requirements for 1 stage RO design as a function of flow factor.

FIG. 33 shows hydraulic pressure requirements for 1 stage RO design as a function of flow factor. The result shown in FIG. 33 was generated considering a PV per stage value of 4, BD to PW ratio of 6, a water recovery percentage of 40%, and a temperature of 10° C. When examining FIG. 33 it can be seen that as the flow factor decreases there is an increase in the hydraulic pressure requirements. The flow factor is a normalized efficiency factor for the membrane and accounts for inefficiencies in the membrane such as fouling overtime. When this occurs the only parameter that can counteract this inefficiency is an increase in the hydraulic pressure as shown in FIG. 33. The effect of the flow factor on the permeate TDS concentration is shown in FIG. 34.

Figure 34:
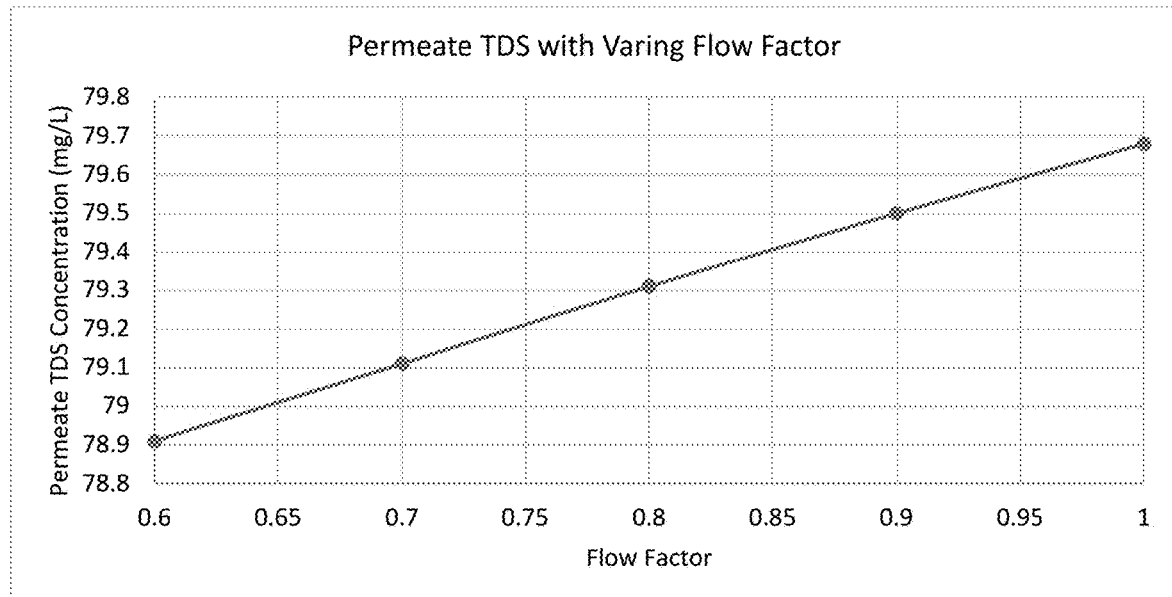
FIG. 34 shows permeate side TDS for 1 stage RO design as a function of flow factor.

FIG. 34 shows permeate side TDS for 1 stage RO design as a function of flow factor. The result shown above in FIG. 34 was created using the same simulation specifications as the ones used in FIG. 33. Although it appears the permeate TDS increases with a high flow factor there is less than a 1 mg/L TDS difference between the 0.6 and 1 flow factor cases. As a result, it can be assumed that the flow factor does not affect the permeate TDS concentration. The results set forth herein for the 1 stage RO design were compiled considering 5,500 case studies in WAVE when varying all the specified parameters. As a result of this large number of case studies, only selected results were included in FIGS. 28-34. Although WAVE simulations were carried out considering a 3 stage RO design, not enough results were generated to adequately span the parameter space. Furthermore, the 3 stage RO design introduces 2 boost pressure parameters in between the RO stages and ultimately produces a combinatorial challenge.

Regarding the RO parameter regression work, the 1 stage RO design case studies generated from WAVE were imported into MATLAB using the csvread function. Since only BD to PW ratios greater than 2 would benefit from using RO (due to membrane burst pressure constraints) only data sets with BD to PW ratios of 3 or greater were considered. To test the effectiveness of the MATLAB regression tools only data sets with a temperature of 20° C., a flow factor of 1, and a PV per stage value of 3, 4, or 5 were imported in this current iteration of the regression. As a result, the current regressed model does not have any temperature dependence or flow factor dependence.

After importing these specific data sets, the mass transfer coefficient (k), water permeability ($L_p$), coefficient of reflection ($\sigma$), and salt permeability ($P_s$) were regressed to fit the first-principles RO model to the WAVE data. Each one of these parameters were regressed for each individual data set as a function of the water recovery percentage. The mass transfer coefficient was regressed using Equation 1 with the fit function using poly/fitting model in MATLAB.

$$\ln\left(\frac{R(1-R_o)}{R_o(1-R)}\right)k = J_v \qquad (1)$$

In Equation 1, R denotes the real rejection fraction, $R_o$ is the observed rejection fraction, and $J_v$ is the water flux rate. By using this form of Equation 1, the mass transfer coefficient can be found as a function of R, $R_o$, and flux for each data set. Equations 2 and 3 were used to regress the coefficient of reflection and the water permeability once again using the fit function and the poly1 fitting model.

$$J_v = L_p(\Delta P - \sigma \Delta \pi) \qquad (2)$$

$$\pi = iCRT \qquad (3)$$

In Equation 2, $\Delta P$ denotes the hydraulic pressure and $\Delta \pi$ is the osmotic pressure which is calculated in Equation 3. In Equation 3, i denotes the number of disassociating ions, R is the ideal gas constant, C is the solute concentration and T is the temperature (Bartholomew et al., 2017). Equation 4 was used to regress the salt permeability and employs the fit function and the poly1 fitting model.

$$\ln\left(\frac{R}{\sigma} - \frac{1}{R} - 1\right) = -\frac{(1-\sigma)}{P_S}J_v \qquad (4)$$

This regression model is currently limited to regressing the parameters for each combination of PV per stage and BD to PW ratio independently but is being expanded to allow the BD to PW ratio to become part of the regression (like the water recovery percentage). Since the PV per stage value must be an integer, there is likely to be a specific regression conducted for each PV per stage value in future iterations. Once the BD to PW ratio is introduced as a parameter in the regression, the results will be validated against the WAVE data. Upon validation of this model, the temperature and flow factor will be introduced into the regression to increase the size of the regression problem.

The 3 stage RO simulations will be completed in WAVE and will be imported into MATLAB for parameter regression. For the regression, both temperature and flow factor dependencies will be introduced into the 1 and 3 stage RO models and the regression validated against WAVE data. Upon completing this task, Aspen Custom Modeler (ACM) will be used to convert the MATLAB model with regressed parameters into an Aspen Plus model to connect the previously developed models (e.g., for softening) to the RO model.

REFERENCES

Aspen Plus and Aspen Process Economic Analyzer, AspenTech, Inc., https://www.aspentech.com/.

Carrasco, J. C., Lima, F. V. An optimization-based operability framework for process design and intensification of modular natural gas utilization systems. *Comput. Chem. Eng.*, 105, 246-258, 2017.

Daems, N., Mills, S., Verbeke, R., Szymczyk, A., Pescarmona, P. P., Vankelecom, I. F. J. High-performance membranes with full pH-stability. *RSC Advances*. 8, 8813-8827. 2018.

EPRI, Water treatment for power plant cooling towers. *Electric Power Research Institute*, 2012.

Feeley, T. J. Water: A critical resource in the thermoelectric power industry. *Energy*, 33, 1-11, 2018.

GAMS, GAMS Development Corporation, https://www.gams.com/ (accessed February 2019).

Graves, M., Choffel, K. Economic siting factors for seawater desalination projects along the Texas Gulf-Coast. *Introduction and Need for Research*. Texas government, 2012.

Greenlee, L. F., Lawler, D. F., Freeman, B. D., Marrot, B., Moulin, P. Reverse osmosis desalination: water sources, technology, and today's challenges. *Water Research*, 43, 2317-2348, 2009.

Khajouei, G., Park, H. I., Finklea, H., Ziemkiewicz, P., Peltier, E. Produced water softening using high-pH catholyte from brine electrolysis: reducing chemical transportation and environmental footprint. *Chemosphere*, 2019.

Lima, F. V., Daoutidis, P., Tsapatsis, M. Modeling, optimization, and cost analysis of an IGCC plant with a membrane reactor for carbon capture. *AIChE Journal*, 62 (5), 1568-1580, 2016.

MATLAB, Mathworks, Inc., https://www.mathworks.com/ (accessed February 2019).

Matson, J. V., Harris, T. G. Zero discharge of cooling water by sidestream softening. *Water Pollution Control Federation*, 51 (11), 2602-2614, 1979.

Miller, J. E. Review of water resources and desalination technologies, SAND 2003-0800, Sandia National Laboratories, Albuquerque, 54, 2003.

OLI Flowsheet. OLI systems, Inc. Available at: https://www.olisystems.com/flowsheet-esp.

Rinker, G. Development of a mechanical vapor-compression distiller incorporating concentrated power. MS Thesis, West Virginia University. 2014.

Winter, T., Pannell, D. J., McCann, L, The economics of desalination and it's potential application to Australia. University of Western Australia. 2002.

Zhao, D., Xue, J., Li, S., Sun, H., Zhang, Q. Theoretical analyses of thermal and economical aspects of multi-effect distillation desalination dealing with high-salinity wastewater. *Desalination*, 273, 292-298, 2011.

Ziemkiewicz, P. F., He, Y. T. Evolution of water chemistry during Marcellus shale gas development: A case study in West Virginia. *Chemosphere*, 134, 224-231, 2015.

Zubot, W., MacKinnon, M. D., Chelme-Ayala, P., Smith, D. W., El-Din, M. G. Petroleum coke adsorption as a water management option for oil sands process-affected water. *Science of the Total Environment*, 427-428, 364-372, 2012.

Farahani, M. H. D. A., Borghei, S. M., Vatanpour, V. Recovery of cooling tower blowdown water for reuse: The investigation of different types of pretreatment prior nanofiltration and reverse osmosis. *J. Water Process Eng*, 10, 188-199, 2016.

Khajouei, G., Park, H. I., Finklea, H., Ziemkiewicz, P., Peltier, E. Produced water softening using high-pH catholyte from brine electrolysis: reducing chemical transportation and environmental footprint. *J. Environ. Sci.*, 2019.

Yu, X., Yang, H., Lei, H., Shapiro, A. Experimental evaluation on concentrating cooling tower blowdown water by direct contact membrane distillation. *Desalination*, 323, 134-141, 2013.

Zhang, J., Zeng, H., Ye, C., Chen, L., Yan, X. Polit test of UF pretreatment prior to RO for cooling tower blowdown reuse of power plant. *Desalination,* 222, 9-16, 2008.

Boussouga, Y. A, and A. Lhassani. Study of mass transfer mechanisms for reverse osmosis and nanofiltration membranes intended for desalination. *Journal of materials and Environmental Sciences* 8(3), 1128-1138, 2017.

Gekas, V., and B. Hallström. Mass transfer in the membrane concentration polarization layer under turbulent cross flow: I. Critical literature review and adaptation of existing sherwood correlations to membrane operations. *Journal of Membrane Sciences* 30, 153-170, 1987.

Schock, G., and A. Miguel. Mass transfer and pressure loss in spiral wound modules. *Desalination* 64, 339-352, 1987.

Sutzkover, I., Hasson, D., and R. Semiat. Simple technique for measuring the concentration polarization level in a reverse osmosis system. *Desalination* 131, 117-127, 2000.

AMI Membranes. (2019). *Seawater Desalination RO Membrane Elements.* Retrieved from Applied Membranes: https://www.appliedmembranes.com/media/wysiwyg/pdf/membranes/ami_seawater_deslination_ro_membranes.pdf.

Bartholomew, T., Mey, L., Arena, J., Siefert, N., Mauter, M. Osmotically assisted reverse osmosis for high salinity brine treatment. *Desalination,* 3-11, 2017.

Nartholomew, T., Siefert, N., Mauter, M. Cost optimization of osmotically assisted reverse osmosis. *Environmental Science and Technology,* 11813-11821, 2018.

Boussouga, Y. Lhassani, A. Study of mass transfer mechanisms for reverse osmosis and nanofiltration membranes intended for desalination. *Journal of Materials and Environmental Sciences,* 1128-1138, 2017.

Lenntech. (n.d.). FILMTEC SW30-4040 membranes. Retrieved from Lenntech: https://www.lenntech.com/Data-sheets/Dow-Filmtec-SW30-4040.pdf.

Voutchkov, N. Energy use for membrane seawater desalination—current status and trends. *Desalination,* 2-14. 2018.

What is claimed is:

1. A process for treating a mixture of produced water and blowdown water comprising:
    mixing an amount of produced water (PW) and an amount of blowdown water (BD) for forming a produced water and blowdown water mixture (PW-BD water mixture), optionally adjusting the pH of the PW-BD water mixture, subjecting said PW-BD water mixture to at least one softening agent to form a softened produced water and blowdown water mixture, subjecting said softened produced water and blowdown water mixture to an activated carbon filtration to form a filtered produced water and blowdown water mixture, and subjecting said filtered produced water and blowdown water mixture to a reverse osmosis membrane desalination to form a treated permeate product water and a reverse osmosis reject water 1 wherein said blowdown water (BD) is cooling tower blowdown water.

2. A process for treating a blowdown water comprising:
    subjecting a blowdown water to at least one softening agent to form a softened blowdown water, subjecting said softened blowdown water to an activated carbon filtration to form a filtered blowdown water, and subjecting said filtered blowdown water to a reverse osmosis membrane desalination to form a treated permeate as product water and a reverse osmosis reject water including mixing said reverse osmosis reject water with a produced water to form a reverse osmosis reject water and produced water mixture, and subjecting said reverse osmosis reject water and produced water mixture to a softening agent for forming a softened reverse osmosis reject water and produced water mixture, and subjecting said softened reverse osmosis reject water and produced water mixture to a thermal desalination to form a brine by-product.

3. A process for treating a blowdown water comprising:
    subjecting a blowdown water to a thermal desalination to produce a product water and a reject thermal desalination water, and mixing said thermal desalination reject water with a produced water to form a thermal desalination reject water and produced water mixture, and subjecting said thermal desalination reject water and produced water mixture to a softening agent to form a brine by-product.

4. The process of claim 1 including adjusting the pH of the PW-BD water by increasing the pH of said PW-BD water mixture for removal of at least one metal.

5. The process of claim 4 wherein said metal is one selected from the group consisting of sodium, calcium, magnesium, barium, strontium, boron, silicon, copper, aluminum, manganese, and iron.

6. The process of claim 5 wherein said metal is a metal by-product that is barium sulfate.

* * * * *